US012743396B1

(12) United States Patent
Villmow et al.

(10) Patent No.: US 12,743,396 B1
(45) Date of Patent: Sep. 22, 2026

(54) RECURSIVE GENERATION AND DISTRIBUTION OF COMMAND BUNDLES AT CORE ARRAY

(71) Applicant: OXMIQ Labs Inc., Campbell, CA (US)

(72) Inventors: Micah Villmow, Santa Clara, CA (US); Jiasheng Chen, Folsom, CA (US); Mark Leather, San Rafael, CA (US); Rajabali M. Koduri, San Francisco, CA (US)

(73) Assignee: OXMIQ Labs Inc., Campbell, CA (US)

( * ) Notice: Subject to any disclaimer, the term of this patent is extended or adjusted under 35 U.S.C. 154(b) by 0 days.

(21) Appl. No.: 18/916,648

(22) Filed: Oct. 15, 2024

Related U.S. Application Data

(60) Provisional application No. 63/574,855, filed on Apr. 4, 2024, provisional application No. 63/574,850, filed on Apr. 4, 2024.

(51) Int. Cl.
*G06F 15/80* (2006.01)
*G06F 8/41* (2018.01)
(Continued)

(52) U.S. Cl.
CPC .......... *G06F 15/8023* (2013.01); *G06F 8/443* (2013.01); *G06F 8/4436* (2013.01); *G06F 8/45* (2013.01); *G06F 8/451* (2013.01); *G06F 8/452* (2013.01); *G06F 8/453* (2013.01); *G06F 8/456* (2013.01); *G06F 8/457* (2013.01); *G06F 8/458* (2013.01); *G06F 9/3017* (2013.01); *G06F 9/3836* (2013.01); *G06F 9/3885* (2013.01); *G06F 9/3887* (2013.01); *G06F 9/45516* (2013.01); *G06F 9/5066* (2013.01);
(Continued)

(58) Field of Classification Search
None
See application file for complete search history.

(56) References Cited

U.S. PATENT DOCUMENTS 4,949,250 A 8/1990 Bhandarkar et al.
6,192,384 B1 * 2/2001 Dally .................... G06F 9/3885 712/E9.046

(Continued)

OTHER PUBLICATIONS

Author Unknown, "What is PyTorch, and How Does It Work: All You Need to Know," Simplilearn, Nov. 7, 2023, retrieved from https://semiwiki.com/semiconductor-manufacturers/tsmc/313540-inverse-lithography-technology-a-status-update/.

(Continued)

*Primary Examiner* — Shawn Doman
(74) *Attorney, Agent, or Firm* — ADELI LLP

(57) ABSTRACT

Some embodiments provide a method for a first processor core of a multi-core arrangement having multiple processor cores. From a queue of command bundles for execution by the processor cores, the method retrieves a first instance of a first command bundle to execute at the first processor core. Multiple cores of the multi-core array also retrieve other instances of the first command bundle to execute. The method executes a first command of the first command bundle instance at the first processor core. Based on a second command of the first command bundle instance, the method adds multiple instances of a second command bundle to the queue for execution by the processor cores.

18 Claims, 27 Drawing Sheets

(51) Int. Cl.

| | |
|---|---|
| ***G06F 9/30*** | (2018.01) |
| ***G06F 9/38*** | (2018.01) |
| ***G06F 9/455*** | (2018.01) |
| ***G06F 9/50*** | (2006.01) |
| ***G06F 9/52*** | (2006.01) |

(52) U.S. Cl.
CPC ................ *G06F 9/52* (2013.01); *G06F 15/80* (2013.01); *G06F 15/8053* (2013.01)

(56) References Cited

U.S. PATENT DOCUMENTS

| | | | | |
|---|---|---|---|---|
| 6,389,489 | B1 | 5/2002 | Stone et al. | |
| 6,624,818 | B1 | 9/2003 | Mantor et al. | |
| 6,708,331 | B1 * | 3/2004 | Schwartz | G06F 8/452 717/160 |
| 8,776,030 | B2 | 7/2014 | Grover et al. | |
| 8,842,122 | B2 | 9/2014 | Nordlund et al. | |
| 8,943,119 | B2 | 1/2015 | Hansen et al. | |
| 9,189,828 | B2 | 11/2015 | Gorchetchnikov et al. | |
| 9,483,318 | B2 | 11/2016 | Vajapeyam | |
| 9,710,748 | B2 | 7/2017 | Ross et al. | |
| 10,540,156 | B2 * | 1/2020 | Mineda | G06F 9/52 |
| 11,409,568 | B2 | 8/2022 | Jiang et al. | |
| 11,487,846 | B2 | 11/2022 | Mills et al. | |
| 11,893,392 | B2 | 2/2024 | Kim et al. | |
| 2005/0223199 | A1 * | 10/2005 | Grochowski | G06F 9/384 712/E9.032 |
| 2007/0283337 | A1 | 12/2007 | Kasahara et al. | |
| 2009/0083516 | A1 | 3/2009 | Saleem et al. | |
| 2009/0113404 | A1 * | 4/2009 | Takayama | G06F 8/452 717/149 |
| 2010/0023731 | A1 * | 1/2010 | Ito | G06F 8/456 712/216 |
| 2010/0146495 | A1 * | 6/2010 | Song | G06F 8/456 717/160 |
| 2010/0158408 | A1 | 6/2010 | El-Mahdy et al. | |
| 2012/0246654 | A1 * | 9/2012 | Eichenberger | G06F 9/5066 718/102 |
| 2013/0155080 | A1 * | 6/2013 | Nordlund | G06T 15/005 345/522 |
| 2013/0298133 | A1 * | 11/2013 | Jones | G06F 9/5027 718/104 |
| 2014/0130052 | A1 * | 5/2014 | Lin | G06F 9/522 718/102 |
| 2014/0181476 | A1 | 6/2014 | Srinivasan et al. | |
| 2014/0310467 | A1 * | 10/2014 | Shalf | G06F 12/0842 711/119 |
| 2015/0106596 | A1 | 4/2015 | Vorbach et al. | |
| 2015/0149745 | A1 * | 5/2015 | Eble | G06F 9/526 712/216 |
| 2015/0220369 | A1 | 8/2015 | Vajapeyam | |
| 2016/0283240 | A1 | 9/2016 | Mishra et al. | |
| 2016/0321048 | A1 * | 11/2016 | Matsuura | G06F 8/4442 |
| 2017/0083318 | A1 | 3/2017 | Burger et al. | |
| 2018/0181380 | A1 * | 6/2018 | Kasahara | G06F 8/425 |
| 2018/0301119 | A1 * | 10/2018 | Koker | G06F 1/3234 |
| 2018/0322381 | A1 | 11/2018 | Liu et al. | |
| 2018/0336456 | A1 * | 11/2018 | Norrie | G06F 9/3887 |
| 2019/0065150 | A1 | 2/2019 | Heddes et al. | |
| 2019/0146857 | A1 * | 5/2019 | LeBeane | G06F 9/542 719/313 |
| 2019/0347125 | A1 | 11/2019 | Sankaran et al. | |
| 2020/0026568 | A1 * | 1/2020 | Harris | G06F 9/5027 |
| 2020/0218540 | A1 | 7/2020 | Kesiraju et al. | |
| 2022/0012573 | A1 | 1/2022 | Nagendran et al. | |
| 2022/0114234 | A1 * | 4/2022 | George | G06F 7/5443 |
| 2022/0171631 | A1 * | 6/2022 | Kim | G06F 9/30036 |
| 2022/0197718 | A1 | 6/2022 | Drepper | |
| 2022/0405228 | A1 | 12/2022 | Tan et al. | |
| 2022/0413865 | A1 | 12/2022 | Masanamuthu Chinnathurai et al. | |
| 2022/0414052 | A1 | 12/2022 | Li et al. | |
| 2022/0414817 | A1 | 12/2022 | Zad Tootaghaj et al. | |
| 2023/0004393 | A1 | 1/2023 | Madduri et al. | |
| 2023/0029176 | A1 | 1/2023 | Ray et al. | |
| 2023/0090973 | A1 * | 3/2023 | Ray | G06F 13/1668 711/137 |
| 2023/0205692 | A1 * | 6/2023 | Nori | G06F 12/0842 |
| 2023/0229588 | A1 | 7/2023 | Aggarwal et al. | |
| 2023/0297643 | A1 | 9/2023 | Shivam et al. | |
| 2023/0342211 | A1 | 10/2023 | Kim | |
| 2024/0020119 | A1 | 1/2024 | Tran | |
| 2024/0037183 | A1 | 2/2024 | Du et al. | |
| 2024/0054081 | A1 | 2/2024 | Blixt | |
| 2024/0160448 | A1 | 5/2024 | Nagata et al. | |
| 2024/0220250 | A1 | 7/2024 | Wu | |
| 2024/0394117 | A1 | 11/2024 | Hu et al. | |
| 2024/0403013 | A1 * | 12/2024 | Gartmann | G06F 8/453 |
| 2025/0004861 | A1 | 1/2025 | Barik et al. | |
| 2025/0181551 | A1 | 6/2025 | Chakraborty et al. | |
| 2025/0298759 | A1 | 9/2025 | Guim Bernat et al. | |
| 2025/0307343 | A1 | 10/2025 | Garegrat | |

OTHER PUBLICATIONS

Diamant, Ron, et al., "Accelerate deep learning and innovate faster with AWS Trainium", Amazon Web Services, AWS re:Invent, Nov. 28-Dec. 2, 2022, Las Vegas, NV.
Gupta, Pradeep, "CUDA Refresher: The CUDA Programming Model", Nvidia, Jun. 26, 2020, retrieved from https://developer.nvidia.com/blog/cuda-refresher-cuda-programming-model/.
Hsu, Kuan-Chieh, et al., "Simultaneous and Heterogeneous Multithreading," MICRO '23: Proceedings of the 56th Annual IEEE/ACM International Symposium on Microarchitecture, Toronto, ON, CA, Oct. 28-Nov. 1, 2023, pp. 137-152, ACM.
Jiang, Lijuan, et al., "Towards Highly Efficient DGEMM on the Emerging SW26010 Many-core Processor," 46th International Conference on Parallel Processing, Bristol, UK, Aug. 14-17, 2017, pp. 422-431, IEEE.
Lam, Chester, "Hot Chips 2023: AMD's Phoenix SoC," Chips and Cheese, Sep. 16, 2023, retrieved from https://chipsandcheese.com/p/hot-chips-2023-amds-phoenix-soc.
Mcafee, David, "On-Chip AI Integration is the Future of PC Computing", AMD, Sep. 28, 2023, retrieved from https://www.amd.com/en/blogs/2023/on-chip-ai-integration-is-the-future-of-pc-computi.html.
Non-Published Commonly Owned U.S. Appl. No. 18/916,645, filed Oct. 15, 2024, 113 pages, OXMIQ Labs Inc.
Non-Published Commonly Owned U.S. Appl. No. 18/916,646, filed Oct. 15, 2024, 113 pages, OXMIQ Labs Inc.
Non-Published Commonly Owned U.S. Appl. No. 18/916,647, filed Oct. 15, 2024, 113 pages, OXMIQ Labs Inc.
Non-Published Commonly Owned U.S. Appl. No. 18/916,649, filed Oct. 15, 2024, 84 pages, OXMIQ Labs Inc.
Non-Published Commonly Owned U.S. Appl. No. 18/916,650, filed Oct. 15, 2024, 85 pages, OXMIQ Labs Inc.
Non-Published Commonly Owned U.S. Appl. No. 18/916,652, filed Oct. 15, 2024, 85 pages, OXMIQ Labs Inc.
Non-Published Commonly Owned U.S. Appl. No. 18/916,654, filed Oct. 15, 2024, 84 pages, OXMIQ Labs Inc.
Non-Published Commonly Owned U.S. Appl. No. 18/916,656, filed Oct. 15, 2024, 103 pages, OXMIQ Labs Inc.
Non-Published Commonly Owned U.S. Appl. No. 18/916,657, filed Oct. 15, 2024, 85 pages, OXMIQ Labs Inc.
Sathe, Tejas, "Tutorial: A quick overview of tensorflow2.0," Analytics Vidhya, Aug. 1, 2020, retrieved from https://medium.com/analytics-vidhya/tutorial-a-quick-overview-of-tensorflow2-0-b28e5c6906fa.
Screen captures from YouTube video clip entitled "Meteor Lake: AI Acceleration and NPU Explained", 4 pages, uploaded on Dec. 11, 2023 by Intel Technology. Retrieved from Internet: https://www.youtube.com/watch?v=QSzNoX0qpIE.

* cited by examiner

RECURSIVE GENERATION AND DISTRIBUTION OF COMMAND BUNDLES AT CORE ARRAY

This application claims the benefit of U.S. Provisional Patent Application 63/574,850 and U.S. Provisional Patent Application 63/574,855, both filed Apr. 4, 2024. U.S. Provisional Patent Applications 63/574,850 and 63/574,855 are both incorporated herein by reference.

BACKGROUND

Background

In recent years, there has been an exponential trajectory in the demand for efficient and large-scale computation to perform a variety of tasks. Examples of such tasks include the training of machine learning models, including convolutional neural networks for image and video analysis and large language models (LLMs) for natural language processing and generation, as well as the use of these models for inference. Not only are these computing tasks growing in size, but the popularity of machine learning models, especially compute-heavy models such as LLMs, has recently exploded. It is estimated that the world will need one million times more compute power, with dramatically improved memory integration and capacity, to meet the needs of the world in the near future.

In recent years, the popularity of graphics processing units (GPUs) has increased correspondingly, as these have been the best option for the vector processing used in many neural networks. Similarly, certain other processing units (e.g., tensor processing units (TPUs)) have recently been introduced in an attempt to compete with GPUs for this market. However, both GPUs and TPUs place the onus on developers to write code specific to the devices where that code will be executed. As such, for instance, a network training program written for GPUs is not necessarily easily portable to execution on TPUs. Given these issues, techniques for both (i) increasing code portability between processing unit types and (ii) increasing the processing ability for executing large parallel compute tasks are required to be developed.

BRIEF SUMMARY

Some embodiments provide a method for executing commands at a multi-core array of processor cores. In some embodiments, a leader core of the multi-core array receives a set of commands, executes a first subset of these commands, and based on a second subset of the commands, generates command bundles for worker cores of the core array to execute. Upon generating these command bundles, the leader core distributes the command bundles to the worker cores for the worker cores to retrieve and execute. In some embodiments, the leader core is also one of the worker cores that executes the command bundles.

In some embodiments, one of the cores of the multi-core array is designated as the leader core and executes software that does not run on any of the other worker cores of the array. This leader core software, in some embodiments, handles the generation of the command bundles (also referred to as work items) as well as the distribution of these command bundles to the worker cores. The generation of the command bundles may include dividing up certain operations into multiple command bundles as well as the specification of command bundle data structures for distribution to the worker cores. In addition, in some embodiments, the leader core software performs re-compilation operations to replace certain groups of commands in the received set of commands and/or the command bundles with more optimized groups of commands.

In some embodiments, the commands received by the leader core are virtual commands (e.g., virtual instruction set architecture (vISA) commands) while the generated instruction sets are physical commands (e.g., physical ISA (pISA) commands). That is, at least a subset of the received commands are hardware-agnostic commands in that these commands are not tied to specific characteristics (e.g., resources) of the worker cores. In generating the command bundles for the worker cores, the leader core converts the virtual commands into physical commands that take into account the specific hardware characteristics (e.g., resources) of the worker cores (e.g., the register size of the worker cores).

The worker cores (including the leader core, in some cases) are heterogeneous cores each of which includes multiple diverse types of processor sub-cores. For instance, in some embodiments, each of the cores in the core array is an SVM (scalar, vector, matrix) core that includes a scalar processor sub-core that is optimal for processing scalar computation commands, a vector processor sub-core that is optimal for processing vector computation commands, and a matrix processor sub-core that is optimal for processing matrix computation commands. In some such embodiments, the matrix sub-core is also optimal for processing higher-dimensional tensor computation commands (e.g., 3-D, 4-D, etc. tensors). In some embodiments, the sub-cores of each SVM core share at least one cache (e.g., an L1 or L2 cache).

The commands that the leader core converts into command bundles and distributes may include both (1) commands that specifically indicate how to parallelize the commands as multiple command bundles and (2) commands that the leader core identifies as parallelizable command bundles from which to generate work items, in some embodiments. In some embodiments, a subset of these commands are parallelized function calls. These parallelized function calls, in some embodiments, are a specific type of instruction defined within the command architecture and indicate (1) a function to call multiple times in parallel, (2) the number of instances of that function to call (number of command bundles to generate), and (3) the indexing for those command bundles. Upon reaching such a command in the set of commands, the leader core defines the command bundles based on the parallelized function call and distributes these command bundles to the worker cores. In some embodiments, the commands within these generated command bundles are specified as physical commands so that the worker cores can execute the commands in their hardware.

As noted, the worker cores of some embodiments include scalar, vector, and matrix sub-cores. In some embodiments, both the set of commands received by the leader core and the command bundles distributed to the worker cores include scalar computation commands (commands involving scalar computations), vector computation commands (commands involving vector computations), and/or matrix (and higher-dimensional tensor) computation commands (commands involving matrix and/or higher-dimensional tensor computations). Within the set of commands received by the leader core, in some embodiments the leader core executes individual scalar computation commands (subsequently referred to as scalar commands) itself (i.e., without parallelization). At least a subset of the vector and matrix (and higher-dimensional tensor) computation commands (subsequently referred to as vector instructions and matrix instructions), however, are identified as parallelizable by the leader core. The leader core divides these tensor computation commands (subsequently referred to as tensor commands) into command bundles for parallel computing in some embodiments.

In some embodiments, the leader core identifies these commands that specify tensor operations and divides the tensor operations based on the hardware characteristics of the worker cores. For instance, in some embodiments, the tensor operations utilize tensors (e.g., input tensors, intermediate tensors, and/or output tensors) that occupy more storage space than is available in the registers of any individual core. As such, as part of the conversion of commands from a virtual command set (e.g., the vISA) to a physical command set (e.g., the pISA), the leader core divides the tensor operations into operation slices based on at least the register size of the worker cores such that an operation slice can be performed as a single operation by one of the worker cores. The leader core generates work items based on these operation slices and distributes the work items to the worker cores.

In some embodiments, the multi-core array uses a pull distribution mechanism for the leader core to distribute the command bundles to the worker cores. In some such embodiments, after generating a set of command bundles, the leader core adds these command bundles to a queue (e.g., that is stored in memory shared between the cores of the multi-core array) and signals to the worker cores to retrieve command bundles from the queue. The worker cores then retrieve these command bundles (either individually or as blocks of command bundles) and execute the command bundles, signaling to the leader core upon completion of the command bundles (e.g., upon completion of each command bundle). When a worker core finishes its command bundle(s), the worker core then retrieves the next command bundle or group of command bundles. In some cases, even for command bundles having the same set of commands, different worker cores with the same hardware resources may require different amounts of time to complete the command bundles due to, e.g., different instruction branches and/or different memory latency for reading input data and/or writing output data.

In other embodiments, the multi-core array uses a push distribution mechanism to distribute the command bundles to the worker cores. In some such embodiments, the leader core assigns specific command bundles to specific worker cores and provides these cores with the data structures for the assigned command bundles. In this manner, the leader core may assign groups of related command bundles to the same core so as to minimize data transfer (e.g., enabling the same core to use the output of one command bundle as input to its next command bundle). For instance, a sequence of linked tensor operation slices can be assigned as a block to the same worker core.

Upon retrieving (or being assigned) a command bundle, a worker core executes the commands in the command bundle. A command bundle can include a single command or multiple commands; for instance, a parallelized function call might include numerous commands (to carry out the function) while a tensor operation slice could involve a single command or a small number of commands. In some embodiments, in order to execute a command bundle, a worker core retrieves the data required to execute the commands of the command bundle (e.g., tensor data that may be stored in a local cache, a cache shared with other worker cores of the core array, a local or remote memory, etc.). In some embodiments, the scalar sub-core of the worker core executes the scalar commands but hands off vector commands to the vector sub-core and matrix commands to the matrix sub-core.

In certain cases, a command bundle may instruct a worker core to spawn additional command bundles. For instance, the set of instructions within a command bundle may itself include a parallelized function call. In this case, the worker core of some embodiments generates recursive parallelized command bundles. The worker core generates the command bundles specified by the parallelized function call and adds these to the command bundle queue in some such embodiments. However, if a command bundle includes a tensor operation that is too large to be performed as a single operation by the vector or matrix sub-core, in some embodiments a control unit for the appropriate sub-core divides the operation into multiple segments that the sub-core performs serially. In some embodiments, the worker cores (unlike the leader core) either do not run the software for slicing these operations and generating multiple command bundles for the operations or run this software (because all of the cores in the core array are the same) but have the software turned off. In other embodiments, the tensor operation slicing software can be turned on the worker cores and thus the control unit does not need to segment these operations.

In some embodiments, the execution of the command bundles is asynchronous relative to the set of commands executed by the leader core. When a parallelized function or tensor operation is called asynchronously, the leader core continues execution of its set of commands until a sync point for that parallelized command is reached, at which point the leader core awaits signals that all of the command bundles generated for the command have been completed by the worker cores. In this case, the leader core may generate command bundles based on a second command while the command bundles for a first command are still awaiting completion. In some embodiments, synchronous execution is a specific case of asynchronous execution in which the sync point is inserted prior to the next command. In this case, the leader core pauses execution upon generating and distributing a set of command bundles, until the worker cores have signaled that all of the command bundles generated by a particular instruction are complete.

The core array of some embodiments is part of a system that includes a host device that provides the set of instructions to the leader core of the core array. In some embodiments, the host device is a CPU of a computer, and the core array is an accelerator core array of the computer (e.g., connected by a PCIE bus). In other embodiments, the host device (e.g., CPU) communicates with the core array via a network connection or is directly physically connected to the core array (e.g., on the same physical die as the core array). In still other embodiments, the host device and the leader core are the same (i.e., the host process operates on the leader core). Irrespective of the type of connection between the host and the core array, in some embodiments the host runs an interface (e.g., a queue interface for asynchronous pull-based distribution of sets of commands to the core array or an array-driver interface for push-based distribution of the sets of commands) to enable this communication. This interface, in some embodiments, is the only point of contact on the host side between the host device and the core array. On the core array, in some embodiments the leader core operates as the only point of contact. In some embodiments, the host device has no knowledge of any features of the core array (e.g., the number of worker cores), and simply hands off sets of instructions to the leader core for the core array to execute (in part by parallelizing the instructions).

In some embodiments, the host device executes a software program (a primary program) and launches sub-programs to the core array for acceleration via its communication with the leader core. The host (primary) program, in some embodiments, includes commands to be executed at the host as well as specific commands to launch sets of commands (sub-programs) to the core array. In general, most operations performed by the program will be launched to the leader core (e.g., enqueued for the leader core to retrieve), although the host typically performs certain flow control operations as well as commands requiring interaction with other devices (e.g., output operations and/or operations to receive input). For instance, for a program that handles real-time neural network inference, the host might perform operations to gather the real-time input data (e.g., video images, audio clips) and/or provide results to an external output device.

Each sub-program is encoded as a separate binary program that is data associated with the host program in some embodiments. When execution of the host program reaches a launch instruction for a particular one of these binary programs, the host device uses its interface with the core array to enqueue the binary program for the leader core to retrieve. Upon retrieval of the enqueued binary program, the leader core begins executing these commands as described above (e.g., by parallelizing command bundles across the worker cores of the core array). In some embodiments, these sub-programs are enqueued asynchronously, such that the host program continues executing until reaching a sync point for the sub-program. In other embodiments, the sub-programs are enqueued synchronously (i.e., with a sync point immediately after the launch and prior to execution of any other commands of the host program) such that the host program pauses execution upon launching the sub-program. Once the core array completes execution of the sub-program, the leader core sends a completion signal back to the host device so that the host device can continue (or complete) execution of the primary program from the sync point.

In other embodiments, however, the primary program is executed at the leader core (i.e., there is no host-side execution). In this case, there is no need to enqueue or launch sub-programs to the leader core, and the leader core directly generates the command bundles as the leader core encounters commands that should be parallelized during execution.

The core array, in some embodiments, is part of a larger arrangement of worker cores that may include multiple core arrays and even multiple groups of core arrays. In some embodiments, each core array group or each core array has one core that is designated as a leader core. However, only one of these leader cores is a primary leader core that communicates with the host device to receive sets of commands for acceleration by the core arrangement, while the other leader cores only handle the distribution of command bundles to worker cores.

When a core arrangement includes multiple core arrays, if only one leader core is designated, then all of the worker cores (in all of the core arrays) retrieve command bundles from the same queue or receive command bundles assigned by the single leader core. However, in an arrangement with separate (secondary) leader cores, some embodiments use these secondary leader cores to distribute the command bundles to the worker cores. For instance, in the pull distribution case, in some embodiments the primary leader core generates the command bundles and places the command bundles in the queue as described. The worker cores on the same core array or group of core arrays as the primary leader core retrieve command bundles from this queue. In addition, each leader core retrieves blocks of command bundles from the queue and distributes these command bundles to their respective worker cores, either by assigning command bundles to their worker cores or by placing the command bundles in a separate (local) queue for the worker cores to retrieve.

In some embodiments, at time of bootup of the device, the primary leader core software establishes communication with the host so that the driver interface on the host launches sub-programs for acceleration to the primary leader core. Additional leader cores register with this primary leader core so that the primary leader core knows the overall capability of the core arrangement and can distribute command bundles to the secondary leader cores. In addition, during runtime, new core arrays (e.g., a new physical group of core arrays) may be added to the core arrangement and any secondary leader cores of these new core arrays can register with the primary leader core in order to receive command bundles for execution.

As noted above, in some embodiments memory is shared between the cores of a core arrangement. In some embodiments, the entire core arrangement uses a unified memory system. While each core and/or core array has its own physically local memory and/or cache, the use of a unified memory system means that any core has the ability to access (i.e., read from and/or write to) all of the memory in the system (or at least a subset of the memory that is physically local to other cores). Thus, although scheduling compute operations in cores that are physically adjacent to the memory blocks storing the data needed for those operations may be optimal, any core in the core arrangement can perform any compute operations because the data required for those compute operations is accessible to the core. As an example, the weights for a particular convolutional layer of a neural network may be stored local to a first core array but be needed by cores of multiple different core arrays that execute the convolutions using those weights.

In some embodiments, it should be noted, at least a subset of the memories in the accelerator system are only accessible to a subset of the cores rather than every core having access to every memory in the system. For instance, in some embodiments, a subset of the cores of a compute block may only have access to locally adjacent memory resources and/or a subset of memory resources are only accessible to cores of their locally adjacent compute blocks.

Some embodiments use a global memory address space to access this unified memory, such that all of the cores use the same memory address space to access all of the memory. However, some embodiments use a partitioned global address space (PGAS), in which at least a subset of each core array's physically adjacent memory resources is designated as local memory for the compute block. In some embodiments, the cores of a core array and/or the processes executing on those cores therefore have an affinity for their local memory and have faster access to their local memory (e.g., due to the local proximity and/or differences in memory addressing). In some such embodiments, the memory addressing for each compute block's local memory is different than the global memory addressing (e.g., using fewer bits).

The generation of the command bundles is part of the compilation capability of the leader core, in some embodiments, which is one of multiple points of code transformation in the system. The system, in some embodiments, provides a virtualization layer that performs at least two different levels of compilation in translating a program written in source code (e.g., Python, C/C++, CUDA, etc.) into the sets of commands executed by the leader and worker cores. As indicated above, in some embodiments, a first compilation of the code transforms this source code into a set of commands (or multiple sets of commands) specified according to a virtual command set (e.g., a vISA), while a second compilation of the code transforms a virtual command set into a set of commands (or numerous parallelized command bundles) specified according to the physical command architecture (e.g., a pISA).

In some embodiments, the first compilation converts a first set of commands (e.g., source code) that are not necessarily optimized for parallel computation into a second set of commands (e.g., virtual commands) that are optimized for parallel computation but are not specific to any particular parallel computing hardware. In some embodiments, the source code that can be compiled includes code specifically written for various different types of processors. For instance, the source code can include a combination of CPU code (e.g., standard C or Python code), GPU code (e.g., CUDA code), and/or hardware accelerator (e.g., tensor processing unit) code.

The initial compiler of some embodiments transforms this source code into a combination of machine code and intermediate representations. The intermediate representations, in some embodiments, are not machine-executable commands or instructions but represent operations specified in the source code that are to be executed by the accelerator (and may be divided by the leader core into multiple command bundles). For example, in some embodiments, individual scalar operations are specified as machine code in the virtual command set (e.g., as RISC-V hardware instructions) while the parallelizable function calls and tensor (vector, matrix, or higher-dimensional tensor) operations are specified as intermediate representations.

As noted above, these intermediate representations (e.g., tensor operations as represented in the virtual command set) are hardware-agnostic commands that do not require any specific underlying hardware for execution. For instance, while optimized for parallelization (e.g., by including sliceable tensor operations and/or parallelizable function calls), the intermediate representations of some embodiments do not actually require any particular number of cores (in fact, all of the commands could be executed on a single core if needed) or any particular specific core characteristics (e.g., register sizes).

The first compiler operation, in some embodiments, performs certain types of analysis on the source code in order to generate the virtual commands. As noted, the source code does not necessarily need to be optimized for parallel computing. The compiler of some embodiments identifies certain code structures and transforms these into instructions for parallel computing. For instance, code might include certain loops that can be parallelized. As one such example, a for loop in which subsequent iterations do not rely on earlier iterations can be transformed into a parallelized function call that calls a specified number of instances of the instructions within the for loop. Thus, a loop for performing vector addition that adds the values at each index of two different vectors and outputs a third vector could be parallelized, but a loop that adds each value of a vector at each subsequent index to a total could not be parallelized (or, at the very least, could not be easily parallelized by generating a command bundle for each index).

The first compiler operation also identifies blocks of commands to be launched to the core array from the host (and thus also which commands should remain for execution at the host). In some embodiments, any sections of the commands that include tensor operations and/or parallelized function calls are assigned to be launched to the host. The first compiler generates each of these sections as a separate binary in some embodiments and inserts launch commands in the primary program to be executed by the host. As noted, in some embodiments the majority of the commands in the program are included in one of these blocks to be launched to the leader core, with only certain types of commands (e.g., flow control, peripheral device interaction) remaining for execution at the host.

The second compilation operation of some embodiments converts the commands optimized for parallel computing (the virtual commands, e.g., vISA commands) into multiple instances of command bundles for parallel computing by the multiple worker cores. These command bundles, in some embodiments, are also converted to be specific to the particular parallel computing hardware (i.e., the hardware of the worker cores). For instance, in some embodiments these physical architecture commands limit the operation size to the maximum register size available in the worker cores and may also be based in part on the number of cores available in the core arrangement. Whereas the first compilation operation generates sets of commands with no knowledge of the underlying core array (i.e., how many cores are available, the capability of each of the cores, etc.), the second compilation operation uses information about the physical core arrangement and the worker core specifics to generate the command bundles.

For instance, whereas the virtual tensor instructions may specify operations of any size, in some embodiments the slicing of these tensor instructions is based on the capability of the worker cores. When slicing a tensor operation, in some embodiments the leader core uses the maximum resources (e.g., register size) of a core and then ensures that one or more of the input and output tensors (as well as any intermediate tensors) for an operation slice will fit within these resources. In some embodiments, the leader core slices the tensors such that the operations use tensors that are as large as possible while fitting within the resources. When the tensors are large enough that parallelization is useful but small enough that maximizing the tensor size within the register capacity leads to less than all of the cores being used, some embodiments account for the number of available cores and divide the tensor operation so as to use as many of the cores as possible.

The second compilation operation also generates command bundles for the parallelized function calls, which as described above explicitly indicate how they should be parallelized. In some embodiments, the compiler operations of the leader core translate the function call to a set of physical commands (using a function library stored at the leader core), which may include machine code instructions. Furthermore, in some embodiments, the scalar commands (in addition to the tensor and parallelized function call commands) require translation from virtual commands to physical commands (e.g., to account for the resources available to the scalar sub-core of the worker cores).

The leader core, in some embodiments, also performs a separate re-compilation process during execution of its sub-programs. This re-compilation process replaces a set of commands that the leader core identifies as being sub-optimal for the resources of the core array or sub-optimal in general with another set of commands that are deemed to be more optimal for the resources of the core array or more optimal in general. For instance, in some embodiments the leader core tracks the command stream and, if a sequence of commands is common enough (e.g., is encountered at least a threshold number of times), then the re-compiler optimizes that section of code. When the sequence of commands is next encountered, the re-compiler replaces that sequence with the new, optimized sequence of commands. These optimizations can include, among other operations, code reordering and/or splitting, optimizations to register usage or local data flow, etc.

The first level of compilation is performed by the host, in some embodiments, but it should be understood that this compilation may also occur elsewhere prior to execution of the host program on the host device. In addition, this first level of compilation may be performed ahead of time or at runtime in different embodiments. The second level of compilation (as well as re-compilation), meanwhile, is performed by the leader core during runtime in some embodiments. Other embodiments perform both levels of compilation at one location (e.g., the host, the leader core, a separate server, etc.).

While the above description relates primarily to the execution of commands on a host and accelerator core array, some embodiments provide a generalized virtualization layer for translating different types of code for execution on a variety of different types of processors. This virtualization layer receives commands in one format (e.g., for execution on a first type of processing units) and converts the commands into a second format (e.g., for execution on a second type of processing units). For instance, a compiler of such a virtualization layer can convert code written for a first type of GPU into physical commands (e.g., machine code) for execution by a second, different type of GPU in some embodiments. A computer or datacenter might include multiple different types of processors, and the virtualization layer receives code and identifies an efficient way to execute that code on the available processing resources. In the case of translating code written for a first type of GPU, if a second type of GPU has more resource capacity in the datacenter (e.g., because the first type of GPU has a greater cost), then the virtualization layer translates as much of the code as can be executed on the second type of GPU into physical commands (e.g., machine instructions) for that second type of GPU. For code that can only be executed on the first type of GPU, the virtualization layer compiles this code into physical commands (e.g., machine instructions) for execution on the first type of GPU.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for executing commands at a multi-core array of processor cores. In some embodiments, a leader core of the multi-core array receives a set of commands, executes a first subset of these commands, and based on a second subset of the commands, generates command bundles for worker cores of the core array to execute. Upon generating these command bundles, the leader core distributes the command bundles to the worker cores for the worker cores to retrieve and execute. In some embodiments, the leader core is also one of the worker cores that executes the command bundles.

In some embodiments, one of the cores of the multi-core array is designated as the leader core and executes software that does not run on any of the other worker cores of the array. This leader core software, in some embodiments, handles the generation of the command bundles (also referred to as work items) as well as the distribution of these command bundles to the worker cores. The generation of the command bundles may include dividing up certain operations into multiple command bundles as well as the specification of command bundle data structures for distribution to the worker cores. In addition, in some embodiments, the leader core software performs re-compilation operations to replace certain groups of commands in the received set of commands and/or the command bundles with more optimized groups of commands.

Figure 1:
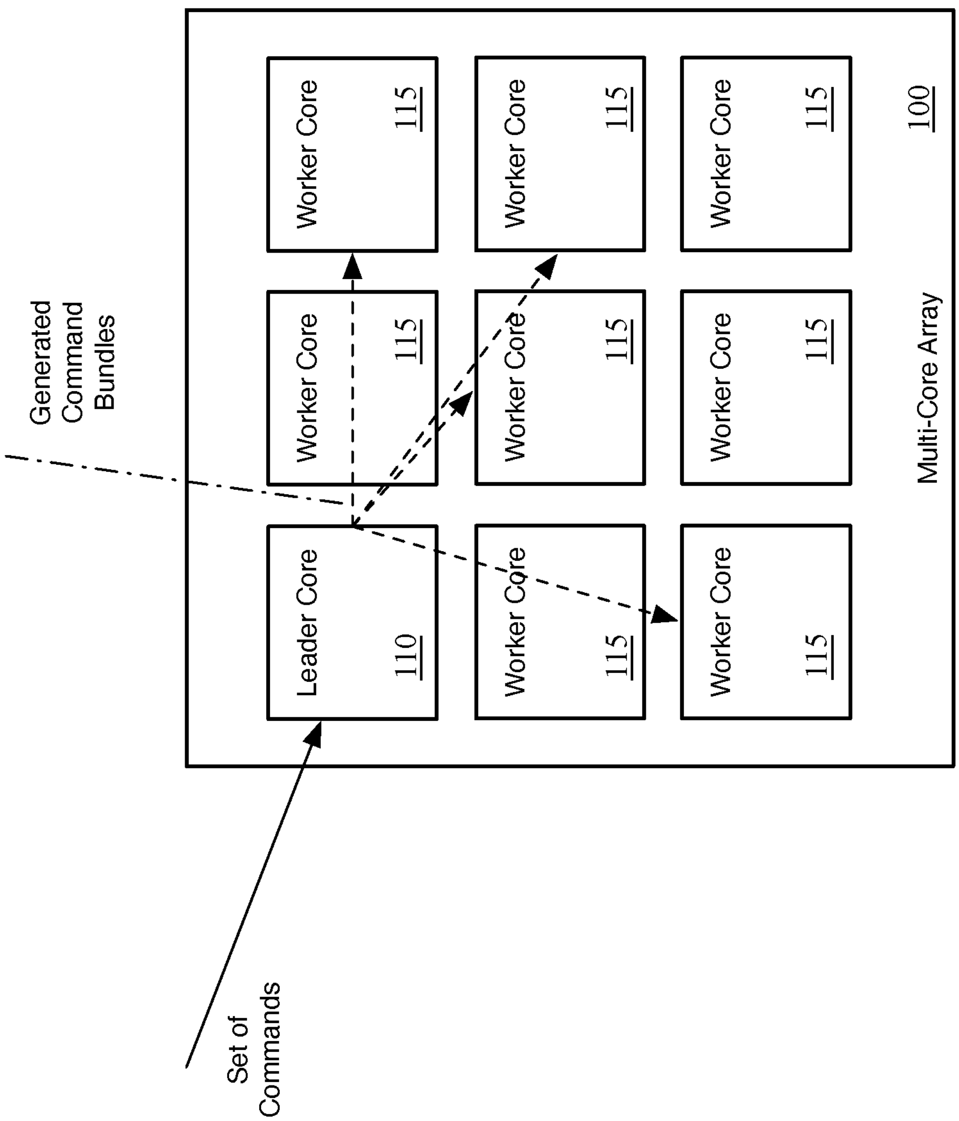
FIG. 1 conceptually illustrates a core array with a leader core and several worker cores.

FIG. 1 conceptually illustrates such a core array 100, with a leader core 110 and several worker cores 115. While this core array is a 3×3 array of cores, it should be understood that the core arrays of different embodiments may have any number of cores. As shown, the leader core 110 receives a set of commands (e.g., from another processing unit, not shown in this figure) and, at least in part based on these instructions, generates multiple command bundles (work items). The leader core 110 distributes these command bundles to the worker cores 115 for execution by the worker cores 115.

In some embodiments, the commands received by the leader core 110 are virtual commands (e.g., virtual instruction set architecture (vISA) commands) while the generated work items distributed to the worker cores 115 are physical commands (e.g., physical ISA (pISA) commands). That is, at least a subset of the received commands are hardware-agnostic commands in that these commands are not tied to specific characteristics (e.g., resources) of the worker cores 115. In generating the command bundles for the worker cores 115, the leader core 110 converts the virtual commands into physical commands that take into account the specific hardware characteristics (e.g., resources) of the worker cores 115 (e.g., the register size of the worker cores).

The worker cores 115 (and the leader core 110, in some cases) are heterogeneous cores each of which includes multiple diverse types of processor sub-cores. As described further below by reference to FIG. 6, in some embodiments each of the cores 110 and 115 in the core array 100 is an SVM (scalar, vector, matrix) core that includes a scalar processor sub-core that is optimal for processing scalar computation commands (commands involving scalar computations), a vector processor sub-core that is optimal for processing vector computation commands (commands involving vector computations), and a matrix processor sub-core that is optimal for processing matrix computation commands (commands involving matrix computations). In some such embodiments, the matrix sub-core is also optimal for processing higher-dimensional tensor computation commands (e.g., 3-D, 4-D, etc. tensors). In some embodiments, the sub-cores of each SVM core share at least one cache (e.g., an L1 or L2 cache).

Figure 2:
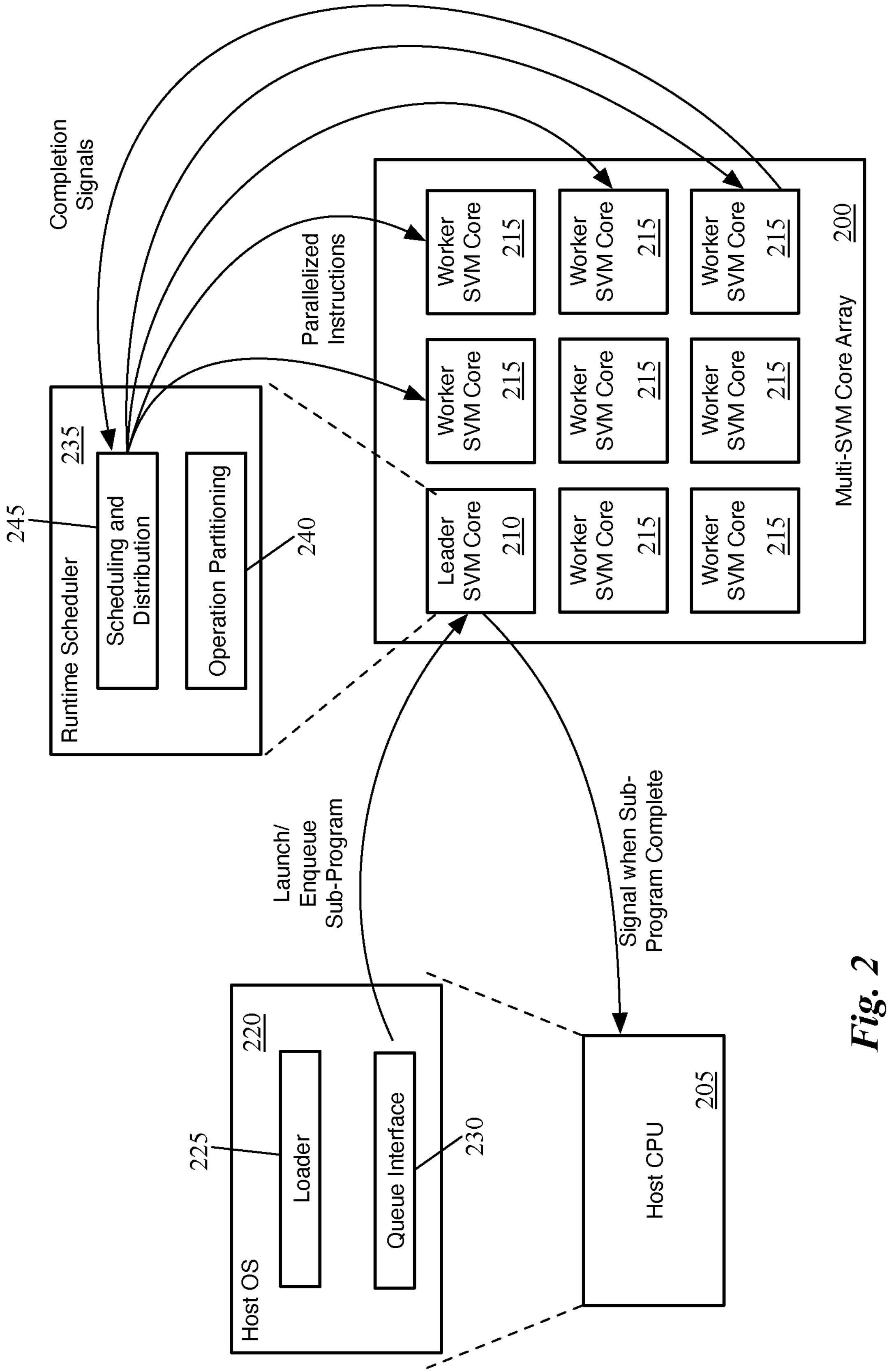
FIG. 2 conceptually illustrates a parallel execution system of some embodiments.

The core array of some embodiments is part of a system that includes a host device that provides the set of commands to the leader core of the core array. FIG. 2 conceptually illustrates a parallel execution system of some embodiments. As shown, this system includes a host CPU 205 (e.g., a chip with at least a CPU and memory) and a multi-core array 200 (accelerator array). The multi-core array 200 includes one leader core 210 as well as numerous (in this case eight) worker cores 215. The host CPU 205, in some embodiments, is part of the same computing device (e.g., on the same motherboard connected by a PCIE bus, or in the same chip) as the multi-core array 200. In other embodiments, the host CPU 205 communicates with the multi-core array 200 via a network connection. In yet other embodiments, the functions of the host CPU shown in this figure (i.e., compiling and/or executing a primary program) are actually performed by the leader core 210 of the multi-core array.

In some embodiments, the host CPU 205 executes a software program (a primary program) and launches sub-programs to the multi-core array 200 for acceleration. The host (primary) program, in some embodiments, includes commands to be executed at the host CPU 205 as well as specific commands to launch sets of commands (sub-programs) to the core array 200. In general, most operations performed by the program will be launched to the core array 200, although the host CPU 205 typically performs certain flow control operations as well as operations requiring interaction with other devices (e.g., output operations and/or operations to receive input). For instance, for a program that handles real-time neural network inference, the host CPU 205 might perform operations to gather the real-time input data (e.g., video images, audio clips) and/or provide results to an external output device.

As shown, the host CPU 205 executes an operating system (OS) 220 in some embodiments. This OS runs at least (1) a loader program 225 and (2) a queue interface 230. The host OS 220 may also run a compiler for either ahead-of-time (AOT) or just-in-time (JIT) compiling of the primary program in some embodiments. In other embodiments, an AOT compiler may compile the primary program elsewhere and simply provide the program as a binary (at least partially as machine code) to the host OS. The loader program 225 loads a primary program into memory (not shown) of the host CPU 205 so that the CPU 205 can execute the primary program.

The queue interface 230, in some embodiments, is responsible for handling communications between the host CPU 205 and the multi-core array 200, and is the only point of contact on the host side between the host CPU 205 and the multi-core array 200. In some embodiments, certain segments of the primary program executed at the CPU are handed off to the multi-core array 200 for accelerated execution. Specifically, in some embodiments the queue interface 230 asynchronously enqueues these program segments into a queue (not shown in this figure), from which the leader core 210 retrieves the program segments. Other embodiments use an array-driver interface that pushes the program segments to the core array 200 (e.g., asynchronously or synchronously).

In some embodiments, the program segments include highly parallelizable operations (e.g., vector, matrix, and higher-dimensional tensor operations such as large matrix multiplications). For instance, in some embodiments the primary program implements a neural network (e.g., to train the network or perform inference on real-world data) and individual layers of the network are handed off to the multi-core array 200 for execution. In some embodiments, the host CPU 205 has no knowledge of any features of the core array 200 (e.g., the number of worker cores), and simply hands off sets of commands to the leader core 210 for the core array to execute (in part by parallelizing the commands).

The queue interface 230, in different embodiments, may be a simple device driver, a more complex device driver, or a user space library. The simple device driver, in some embodiments, is a small kernel driver with exposed interfaces. Such a driver provides more efficient execution because there is less overhead in communication with the multi-core array 200, as well as better control over device resources from the OS kernel and more direct access to hardware resources for optimization. A more complex device driver handles more aspects of the multi-core array 200, enabling more optimized performance of device-specific operations and more centralized control, thereby simplifying management of the multi-core array 200. In some embodiments, the queue interface 230 is a user space library in which the majority of the driver code resides in the user space of the OS 220. This better isolates the driver code and makes the driver easier to update and maintain, in addition to increasing portability and user control of the code.

The multi-core array 200, as noted, has one leader core 210 and a number of worker cores 215. As described in more detail below, in some embodiments each of the cores 210 and 215 includes scalar, vector, and matrix sub-cores, and thus the cores may be referred to as SVM (scalar/vector/matrix) cores. While shown in this figure as a 3×3 array of cores, the multi-core arrays of different embodiments may be of various different sizes (e.g., 4×4, 8×8, etc.). In some embodiments, the various cores 210 and 215 share a cache (e.g., an L2 or L3 cache) and/or local memory. In addition, while the figure shows a single multi-core array, in some embodiments multiple such arrays are used. In some such embodiments, one core on each of the arrays acts as a leader core for that array. In other such embodiments, only one of the core arrays has a leader core, which then acts as the leader core for all of the core arrays. In still other embodiments, the multiple core arrays are grouped into nodes, with a single leader core for each node. These different arrangements, as well as the structure of the individual cores, are described in greater detail in concurrently filed U.S. patent application Ser. No. 18/916,649, entitled "Heterogeneous Cores", which is incorporated herein by reference.

The leader core 210, in some embodiments, is the only core of the multi-core array 200 that communicates with the host OS 220. In some embodiments, the leader core 210 has the same hardware structure as the worker cores 215 but executes additional software to (1) communicate with the host OS 220 and (2) manage execution, including additional compilation, of sub-programs launched to the multi-core array 200 for acceleration. In other embodiments, this additional software also executes on the worker cores 215 but is turned off on these worker cores 215. As shown, the leader core 210 executes a runtime scheduler program 235 which handles certain aspects of the execution of sub-programs launched from the host OS 220. It should be noted that even when multiple core arrays are used for acceleration, only a single leader core communicates with the host OS 220 in some embodiments.

The leader core 210 executes the sub-programs launched from the host OS 220 to the leader core 210 via the queue interface 230. As noted, in some embodiments the leader core 210 retrieves these sub-programs from a queue into which the queue interface 230 places the sub-programs. In some embodiments, the leader core 210 executes commands specified by these sub-programs, some of which specify parallelizable operations (e.g., function calls specified for parallelization and/or large tensor (vector, matrix, etc.) operations that the leader core partitions for parallelization). The runtime scheduler 235 generates instances of these parallelizable operations (also referred to as command bundle instances) and hands these off to the worker cores 215 for acceleration (e.g., by placing the command bundle instances in a queue from which the worker cores pull or by assigning the command bundle instances to the cores).

Figure 3:
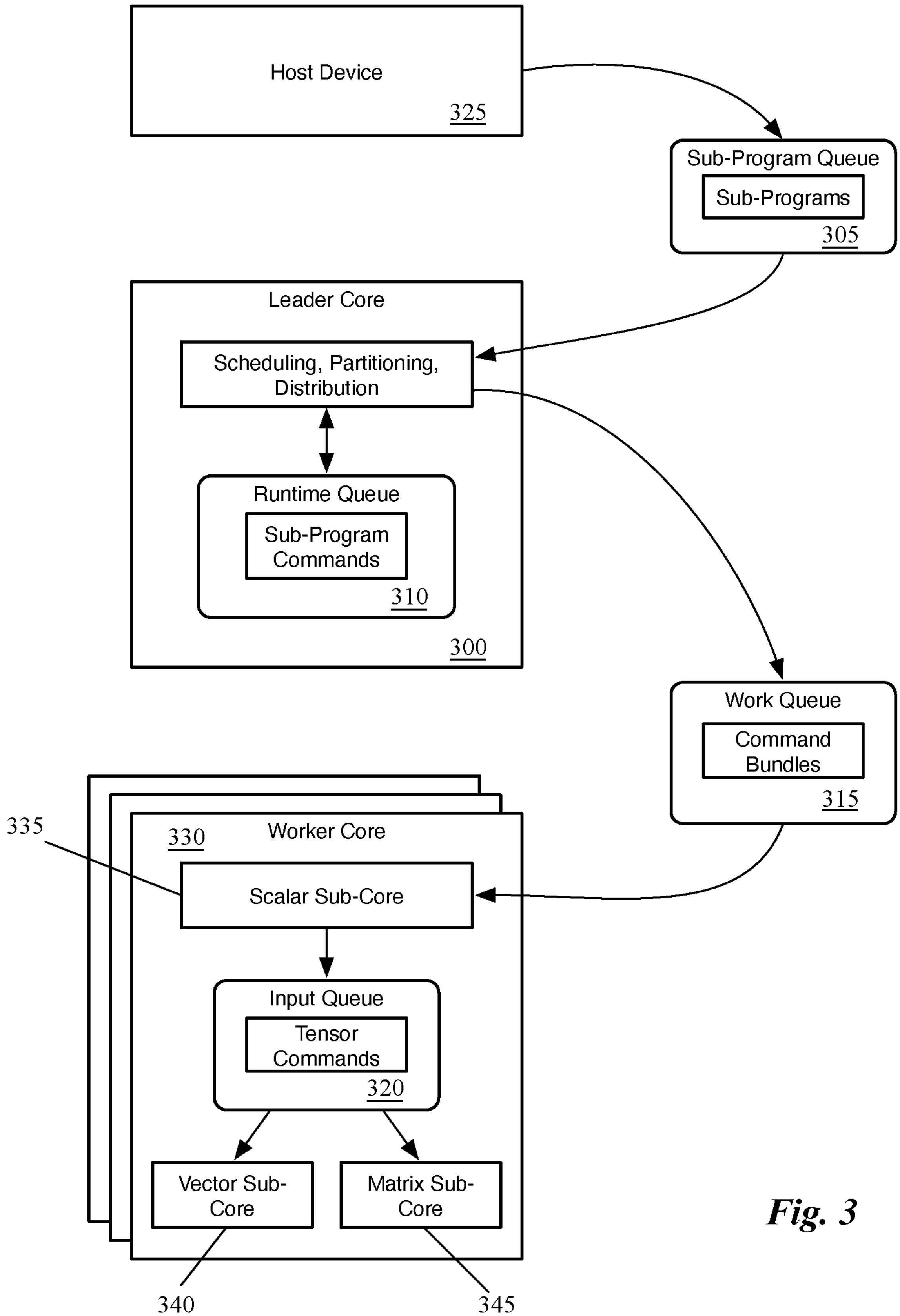
FIG. 3 conceptually illustrates the data flow through a set of queues in the parallelized execution system of some embodiments.

As shown, the runtime scheduler 235 of some embodiments includes an operation partitioning module 240 and a scheduling and distribution module 245. In some embodiments, the operation partitioning module 240 performs a level of compilation to partition certain types of operations (e.g., vector and matrix operations) into multiple operations, dependent on the underlying hardware of the worker cores 215. The scheduling and distribution module 245 handles the generation and distribution to the worker cores 215 of instruction set instances for these and other parallelizable operations. In addition, in some embodiments, the runtime scheduler 235 or another software entity executing on the leader core handles code optimization for repeated instructions or groups of instructions in the sub-program. In some embodiments, the leader core 210 also implements an internal queue for the commands in each sub-program, from which the leader core 210 retrieves commands to execute (i.e., either locally execute or generate parallelizable operations and enqueue for the worker cores). FIG. 3, described below, provides additional information regarding the various queues implemented in the parallel execution system of some embodiments.

FIG. 2 also illustrates the overall flow of execution of a program in the accelerated execution system of some embodiments. The loader 225 loads an executable binary of the primary program (e.g., as specified by a user) into memory of the host CPU 205, which begins executing that program. When the code specifies to launch a sub-program for acceleration, the queue interface 230 enqueues the specified sub-program for the multi-core array 200 to retrieve. Each sub-program is stored as a separate binary file that is data associated with the host program. When execution of the host program reaches a launch instruction for a particular one of these binary files, the host CPU 205 uses the queue interface 230 to send the binary file to the leader core 210, which then begins executing these commands.

In some embodiments, the sub-program launch is an asynchronous command, such that the host CPU 205 continues executing commands of the primary program until a sync point for the sub-program is reached. For instance, if the sub-program implements a convolutional layer of a neural network, then the CPU 205 might execute various flow control operations prior to reaching a sync point, which itself is prior to any operations that use the results (e.g., activation values) from that convolutional layer. In other embodiments, the sub-programs are launched synchronously such that the host CPU 205 pauses execution of the primary program upon launching the sub-program.

The leader core 210 then retrieves the sub-program from the sub-program queue and begins executing the commands of the sub-program. In some embodiments, some or all of the instructions are specified as virtual commands (e.g., according to a vISA) that are agnostic to the underlying hardware of the cores 210 and 215. For instance, in some embodiments vector and matrix computation commands are specified using an intermediate representation (IR), which needs to eventually be converted to hardware-specific machine code instructions. The runtime scheduler 235 converts these commands (while passing through other commands, e.g., scalar computation commands, without additional conversion), either to another intermediate representation (i.e., software command) or to machine code instructions.

Certain commands specify to launch a number of parallel instances of command bundles to the worker cores 215. In some embodiments, each command bundle instance specifies the same set of commands (e.g., the same function) but performed on different data (e.g., different portions of a matrix, different matrices, etc.). As an example, for a convolutional layer of a neural network, the same filter (i.e., set of weights) could be applied to different portions of an input tensor at different worker cores 215.

These commands that the leader core 210 converts into command bundles and distributes may include both (1) commands that specifically indicate how to parallelize the commands as multiple command bundles and (2) commands that the leader core 210 identifies as parallelizable command bundles from which to generate work items, in some embodiments. In some embodiments, a subset of these commands are parallelized function calls. These parallelized function calls, in some embodiments, are a specific type of instruction defined within the command architecture and indicate (1) a function to call multiple times in parallel, (2) the number of instances of that function to call (number of command bundles to generate), and (3) the indexing for those command bundles. Upon reaching such a command in the set of commands, the leader core defines the command bundles based on the parallelized function call and distributes these command bundles to the worker cores. In some embodiments, the commands within these generated command bundles are specified as physical commands so that the worker cores can execute the commands in their hardware.

As noted, the worker cores 215 of some embodiments include scalar, vector, and matrix sub-cores. In some embodiments, both the set of commands received by the leader core 210 and the command bundles distributed to the worker cores 215 include scalar computation commands (commands involving scalar computations), vector computation commands (commands involving vector computations), and/or matrix (and higher-dimensional tensor) computation commands (commands involving matrix and/or higher-dimensional tensor computations). Within the set of commands received by the leader core 210, in some embodiments the leader core 210 executes individual scalar computation commands (subsequently referred to as scalar commands) itself (i.e., without parallelization). At least a subset of the vector and matrix (and higher-dimensional tensor) computation commands (subsequently referred to as vector instructions and matrix instructions), however, are identified as parallelizable by the leader core 210. The leader core 210 divides these tensor computation commands (subsequently referred to as tensor commands) into command bundles for parallel computing in some embodiments.

In some embodiments, the leader core 210 identifies these commands that specify tensor operations and divides the tensor operations based on the hardware characteristics of the worker cores 215. For instance, in some embodiments, the tensor operations utilize tensors (e.g., input tensors, intermediate tensors, and/or output tensors) that occupy more storage space than is available in the registers of any individual core. As such, as part of the conversion of commands from a virtual command set (e.g., the vISA) to a physical command set (e.g., the pISA), the leader core 210 divides the tensor operations into operation slices based on at least the register size of the worker cores 215 such that an operation slice can be performed as a single operation by one of the worker cores. The leader core generates work items based on these operation slices and distributes the work items to the worker cores.

As shown in the figure, the leader core 210 distributes these command bundles to the worker cores 215 using the runtime scheduler 235. In different embodiments, this distribution may be carried out in a push manner (e.g., the runtime scheduler 235 assigns specific instances (or blocks of instances) to specific cores 215) or a pull manner (e.g., the runtime scheduler 235 adds the instances to a shared queue (e.g., in a shared cache or shared memory) from which the worker cores 215 pull. It should also be noted that, in some embodiments, the leader core 210 acts as a worker core to execute instances of the parallelized instruction set as well.

Upon retrieving (or being assigned) a command bundle, a worker core 215 executes the command in the command bundle. A command bundle can include a single command or multiple commands; for instance, a parallelized function call might include numerous commands (to carry out the function) while a tensor operation slice could involve a single command or a small number of commands. In some embodiments, in order to execute a command bundle, a worker core 215 retrieves the data required to execute the commands of the command bundle (e.g., tensor data that may be stored in a local cache, a cache shared with other worker cores of the core array, a local or remote memory, etc.). This data, in some embodiments, is stored in a global set of memory resources that is shared between the cores 210 and 215. In some embodiments, the scalar sub-core of the worker core executes the scalar commands but hands off vector commands to the vector sub-core and matrix commands (or higher-dimensional tensor commands) to the matrix sub-core.

In some embodiments, the parallelized command bundles are launched asynchronously such that the leader core 210 continues executing the sub-program commands after distributing the command bundle instances until reaching either the end of the sub-program or a sync point for the asynchronous parallelized command bundles. The subsequent commands could include one or more additional parallelizable commands in some cases, which (so long as the resultant command bundles are not dependent on the results of the previous parallelized command bundles) can also be distributed to the worker cores 215 for acceleration. When the worker cores 215 finish execution of command bundles, they signal this completion to the leader core 210. Once all of the command bundles for a given parallelized instruction have been completed (and any additional execution of the sub-program completes), the leader core 210 signals to the host CPU 205 (either directly through hardware or via the queue interface 230) of the completion of the sub-program. The host CPU 205 can then continue execution of the primary program (from the sync point for the sub-program).

As noted, FIG. 3 conceptually illustrates the data flow through a set of queues 305-320 in the parallelized execution system of some embodiments. These queues include (i) a sub-program queue 305 into which a host device 325 enqueues sub-programs for execution by the core array, (ii) a runtime queue 310 for sub-program commands within the leader core 300, (iii) a work queue 315 into which the leader core enqueues command bundles, and (iv) an input queue 320 within each worker core 330 into which the scalar sub-core 335 enqueues tensor commands for the vector sub-core 340 and/or matrix sub-core 345.

When the host device 325 reaches a command in its primary program that specifies to launch a sub-program to the core array, the host device 325 (e.g., the queue interface executing at the host device) asynchronously enqueues the sub-program into the sub-program queue 305 (also referred to as a "language queue"). The leader core 300 (e.g., a specific thread executing on the scalar sub-core of the leader core 300) retrieves a sub-program from the sub-program queue 305. The commands of this sub-program are then enqueued into the runtime queue 310. As noted, in some embodiments these commands are virtual commands that are not tied to the hardware. In some embodiments, the sub-program queue 305 may be implemented as multiple queues (e.g., multiple per-process or per-runtime queues) that are merged and combined.

In some embodiments, the scheduling, partitioning, and distribution operations executing on the leader core 300 each execute as their own thread (or set of threads) on one or more scalar sub-cores of the leader core 300 (in addition to other threads, such as the JIT compiler). The scheduling thread, in some embodiments, schedules the sub-program commands in the runtime queue 310 for execution at the leader core 300. As described, this execution of sub-program commands may include actual execution of scalar commands (which may either be machine instructions at this point or are converted to machine instructions at the scalar core prior to their execution). In addition, the execution of sub-program commands can include partitioning operations, which are performed by a separate partitioning thread in some embodiments. These partitioning operations, in addition to defining multiple command bundles for a given command (e.g., a tensor command or a parallelizable function call), convert the virtual sub-program commands to bundles of physical commands (or at least a lower-level set of virtual commands). As described in more detail below, the command bundles may include scalar commands (which may be machine instructions in some cases) as well as tensor commands that are at least partially based on the leader core's understanding of the worker core resources.

In some embodiments, the runtime queue 310 is actually implemented as multiple queues. For instance, the runtime queue 310 may be implemented as a separate scheduling queue (i.e., a queue of sub-program commands to be scheduled for execution on the leader core 300), segmenting queue (i.e., a queue of sub-program commands that the scalar core has identified for partitioning), and/or distribution queue (e.g., a queue of command bundles to be distributed (e.g., into the work queue 315). Some embodiments also include a JIT queue for JIT compiling, which is described further below.

The distribution operation (e.g., a distribution thread) executing on the leader core 300 asynchronously enqueues command bundles generated by the leader core into the work queue 315. The operation of the work queue 315 and the execution of the command bundles by the worker cores 330 are described in more detail below. As shown, the worker cores 330 retrieve command bundles from the work queue 315 and execute these command bundles. The details of this execution are described further below and in concurrently filed U.S. patent application Ser. No. 18/916,649, entitled "Heterogeneous Cores", which is incorporated by reference above. The scalar sub-core 335 of a worker core 330 executes scalar commands from a command bundle (e.g., as machine instructions) and asynchronously enqueues tensor commands from the command bundle into an input queue 320 for the vector sub-core 340 and matrix sub-core 345 (which may represent a single input queue shared between the two tensor sub-cores or separate sub-queues for each of the tensor sub-cores 340 and 345. The vector and matrix sub-cores 340 and 345, in some embodiments, execute these vector, matrix, and/or higher-dimensional tensor commands (e.g., by a control unit converting the commands into machine instructions for the sub-cores to execute).

The generation of the command bundles is part of the compilation capability of the leader core, in some embodiments, which is one of multiple points of code transformation in the system. The system, in some embodiments, provides a virtualization layer that performs at least two different levels of compilation in translating a program written in source code (e.g., Python, C/C++, CUDA, etc.) into the sets of commands executed by the leader and worker cores. As indicated above, in some embodiments, a first compilation of the code transforms this source code into a set of commands (or multiple sets of commands) specified according to a virtual command set (e.g., a vISA), while a second compilation of the code transforms a virtual command set into a set of commands (or numerous parallelized command bundles) specified according to the physical command architecture (e.g., a pISA).

The code provided to the accelerated execution system for compilation, in some embodiments, may include code for various different types of processors. However, irrespective of the type of code provided to this system, the compilers (e.g., the initial compiler on the host as well as any compiler operating within the runtime scheduler on the leader core) define commands that can be executed by the heterogeneous cores of the core array(s). In some embodiments, the execution system operates as a virtualization layer to translate various types of source code into instructions specified according to a common instruction set architecture (ISA).

Figure 4:
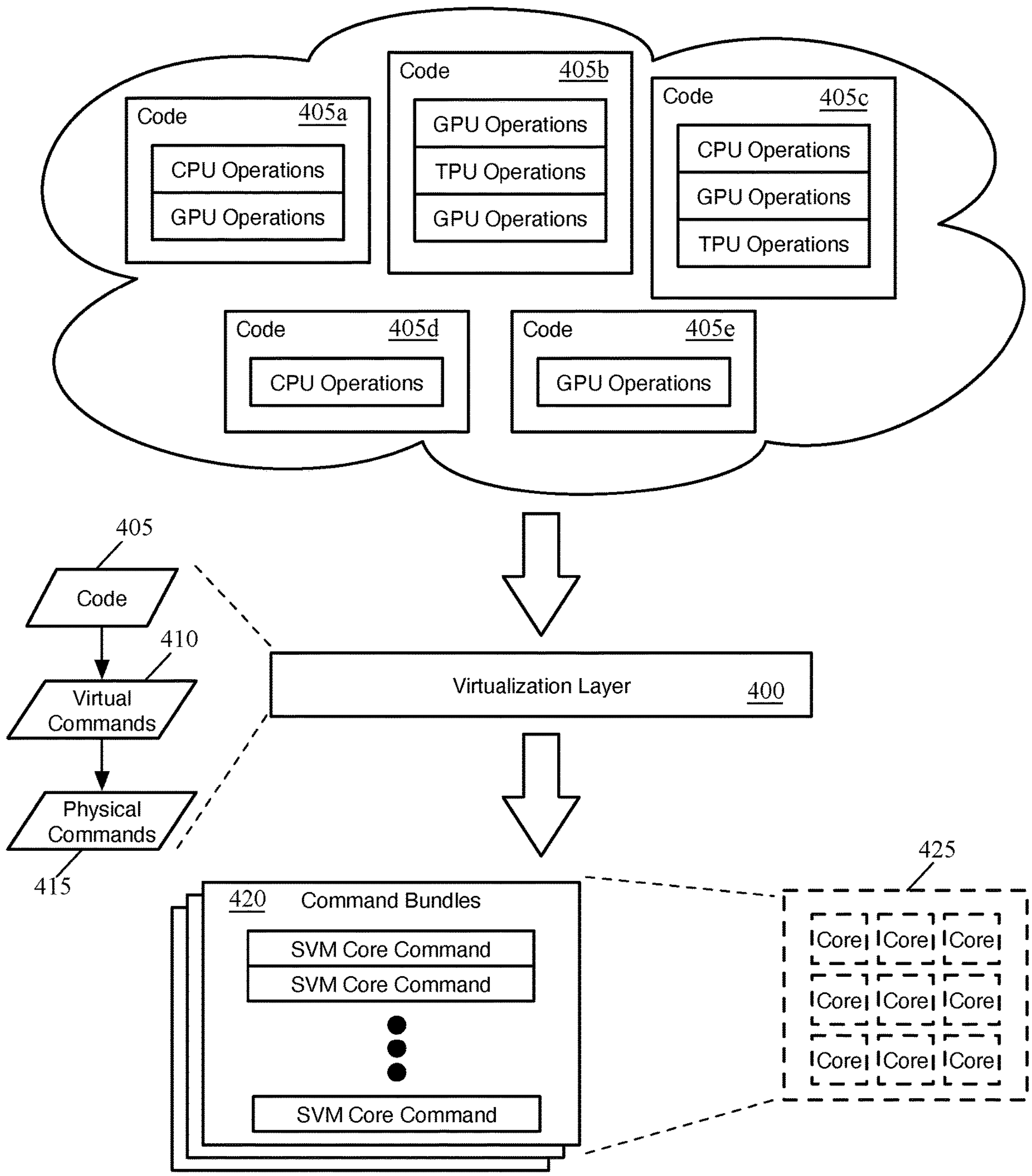
FIG. 4 conceptually illustrates a virtualization layer of some embodiments that translates various different types of code into an instruction set architecture (ISA) that can be executed by the underlying hardware.

FIG. 4 conceptually illustrates a virtualization layer 400 of some embodiments that translates various different types of code (e.g., source code, assembly code, etc.) into an instruction set architecture (ISA) that can be executed by the underlying hardware. The virtualization layer 400 enables a user (e.g., an application developer) to write source code without specific knowledge about the underlying hardware on which the code will be executed. As shown in the figure, a user can define various different programs 405*a-e* which include a combination of central processing unit (CPU)

operations, graphics processing unit (GPU) operations, and tensor processing unit (TPU) operations. For instance, the source code can include a combination of CPU code (e.g., standard C or Python code), GPU code (e.g., CUDA code), and/or hardware accelerator code. These programs may include a single category of operations (as with programs 405*d* and 405*e*) or multiple categories of operations (as with programs 405*a*, 405*b*, and 405*c*). As a generalization, CPUs tend to be most efficient for scalar operations, GPUs tend to be most efficient for vector operations, and TPUs tend to be most efficient for matrix or higher-level tensor operations. However, users can also write code for CPUs to perform vector and/or matrix operations, GPUs to perform scalar and/or matrix operations, or TPUs to perform scalar and/or vector operations.

Any of these various types of programs 405 can be converted by the virtualization into sets of commands to be executed by different types of hardware (e.g., the combination of a CPU and core array shown in FIG. 2). In some embodiments, the virtualization layer 400 actually includes two layers for converting the code. As shown, the virtualization layer receives source code 405 and first translates that source code into virtual commands 410 specified according to a virtual command architecture or virtual command set (e.g., a vISA).

The vISA (or other virtual command set), in some embodiments, is a hardware-agnostic command set. That is, the commands in the virtual ISA (or at least a subset of the commands) are abstracted from the hardware that will execute the commands. In some embodiments, the virtual ISA includes both machine code and intermediate representations. In some embodiments, the machine code is physical commands for scalar operations while the intermediate representations are virtual commands for tensor operations, though in other embodiments the machine code can include physical commands for tensor operations and intermediate representations (virtual commands) for scalar operations. Intermediate representations, in some embodiments, can be used to represent certain types of operations in a manner that is independent of both (1) the source code language and (2) the target hardware. As an example, in some embodiments the virtual ISA includes both individual scalar operations specified as machine code (e.g., as RISC-V hardware instructions) and parallelizable function calls and tensor (vector, matrix, or higher-dimensional tensor) operations are specified as intermediate representations.

This enables a first level compiler of the virtualization layer 400 to compile the source code into commands that can be executed irrespective of the specifics of the underlying hardware (e.g., number and types of cores in the core array, whether a CPU will execute a portion of the commands, etc.). In some embodiments, this first compilation converts a first set of commands (e.g., source code) that are not necessarily optimized for parallel computation into a second set of commands (e.g., the vISA commands) that are optimized for parallel computation but are not specific to any particular parallel computing hardware. In some embodiments, this first level compiler of the virtualization layer 400 executes on the host CPU (e.g., as an AOT compiler or JIT compiler). In other embodiments, the first level compiler executes on a separate computer (e.g., a separate server).

These intermediate representations (e.g., tensor operations as represented in the virtual ISA) are hardware-agnostic instructions that do not require any specific underlying hardware for execution in some embodiments. For instance, while optimized for parallelization (e.g., by including sliceable tensor operations and/or parallelizable function calls), the intermediate representations of some embodiments do not actually require any particular number of cores (in fact, all of the commands could be executed on a single core if needed) or any particular specific core characteristics (e.g., register sizes).

A second-level compiler of the virtualization layer 400, in some embodiments, converts the commands optimized for parallel computing (virtual commands 410) into multiple instances of command bundles (physical instructions 415) for parallel computing by the multiple worker cores. The physical commands 415 can include hardware-specific commands and, in some embodiments, are at least partially tailored to the specifics of the underlying hardware that executes the commands. For instance, in some embodiments, the virtual commands do not make any assumptions about hardware register size, vector length (or matrix size) capability of vector and/or matrix ALUs, etc. On the other hand, the physical commands include references to register specifics and may partition large vector and/or matrix operations into separate operations that a single core is capable of executing. Whereas the first compilation operation generates sets of commands with no knowledge of the underlying core array (i.e., how many cores are available, the capability of each of the cores, etc.), the second compilation uses information about the physical core arrangement and the worker core specifics to generate the second set of commands.

Referring again to FIG. 2, in some embodiments the virtualization layer is implemented by the host CPU 205 (e.g., if the first level compilation is performed on the host) as well as the runtime scheduler 235 on the leader core 210 of the core array 200. For instance, in some embodiments the first level compilation (to translate the source code to virtual commands, such as vISA commands) occurs at the host while the second level compilation (to translate the virtual commands to physical commands, such as pISA commands) occurs at the leader core. In other embodiments, the leader core implements the entirety of the virtualization layer (i.e., performing both levels of compilation). In still other embodiments, the host or a separate server implements the entirety of the virtualization layer. In these latter cases, the host and/or leader core only perform execution of the primary program and the distribution of the parallelizable instruction sets to the cores of the core array.

Irrespective of where the virtualization layer is implemented, the output for a given program 405 is a set of physical command bundles specified according to the physical command set (e.g., the pISA), which can include machine code in some embodiments. Each physical command bundle is a set of commands 420 at least partially tailored to the specifics of the underlying hardware that will execute the code. In this example, the hardware is a multi-core arrangement 425 (e.g., a core array) that includes numerous cores. In some embodiments, these cores are heterogeneous SVM cores that include separate scalar, vector, and matrix sub-cores. However, the virtualization layer 400 of some embodiments can also convert code into instructions to be executed on combinations of CPUs, GPUs, and/or other types of hardware accelerators.

While this description relates primarily to the execution of commands on a host and accelerator core array, some embodiments provide a generalized virtualization layer for translating different types of code for execution on a variety of different types of processors. This virtualization layer receives sets of commands in one format (e.g., for execution on a first type of processing units) and converts the command sets into a second format (e.g., for execution on a second type of processing units). For instance, a compiler of such a virtualization layer can convert code written for a first type of GPU into machine code for execution by a second, different type of GPU in some embodiments. A computer or datacenter might include multiple different types of processors, and the virtualization layer receives code and identifies an efficient way to execute that code on the available processing resources. In the case of translating code written for a first type of GPU, if a second type of GPU has more resource capacity in the datacenter (e.g., because the first type of GPU has a greater cost), then the virtualization layer translates as much of the code as can be executed on the second type of GPU into commands (e.g., machine instructions) for that second type of GPU. For code that can only be executed on the first type of GPU, the virtualization layer compiles this code into commands (e.g., machine instructions) for execution on the first type of GPU.

Figure 5:
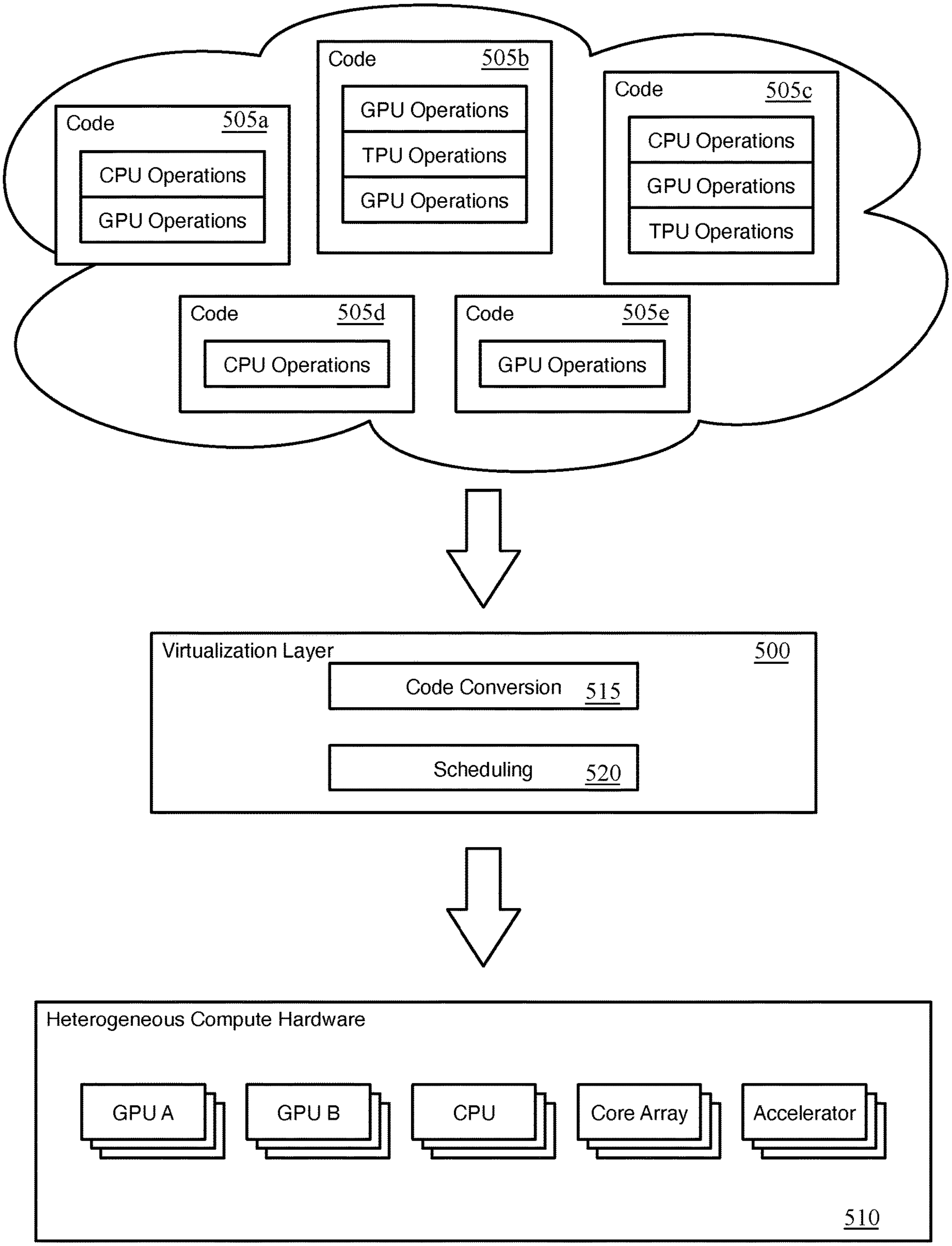
FIG. 5 conceptually illustrates a virtualization layer of some embodiments that translates various types of code into instructions to be executed on a heterogeneous combination of underlying hardware.

FIG. 5 conceptually illustrates such a virtualization layer 500 of some embodiments that translates various types of code into commands to be executed on a heterogeneous combination of underlying hardware 510. As in the previous figure, a user can define various different programs 505*a-e* which include a combination of central processing unit (CPU) operations, graphics processing unit (GPU) operations, and tensor processing unit (TPU) operations. The code may be source code, assembly code, etc. The underlying hardware 510 may include different types of GPUs (e.g., GPUs designed and/or made by different companies), CPUs, core arrays (such as the core array shown in FIG. 2), and other accelerator units (e.g., TPUs), as well as other compute hardware. In different embodiments, the virtualization layer 500 converts code for various different combinations of underlying compute hardware. The virtualization layer 500 of some embodiments executes within a cloud datacenter with various types of hardware available.

In some embodiments, the virtualization layer 500 includes a code conversion (or compatibility) layer 515 and a scheduling layer 520. The code conversion layer 515 of some embodiments performs at least the first level compilation described above in some embodiments. The purpose of the code conversion layer 515 is to translate the different types of code 505 into commands that can be executed on one or more of the different types of heterogeneous compute hardware available. That is, the code conversion layer 515 at least performs a code to virtual command set (e.g., vISA) conversion. In some embodiments, the code conversion layer 515 also performs the second level of compilation to translate the virtual command set commands into physical command set (e.g., pISA) commands for the different available hardware.

The scheduling layer 500 of some embodiments assigns different commands to the different types of compute hardware 510 in some embodiments. For instance, certain types of code may only be executable on one type of GPUs while other types of code are more generic and can be executed by any of multiple different types of hardware. The scheduling layer 500, in some embodiments, identifies the optimal hardware for different code portions (e.g., least expensive, fastest, etc., depending on the user's preferences) and assigns the code portions to that optimal hardware. In some embodiments, the scheduling layer 520 performs the second level of compilation to translate the virtual commands into physical commands based on the hardware to which the commands will be assigned.

Figure 6:
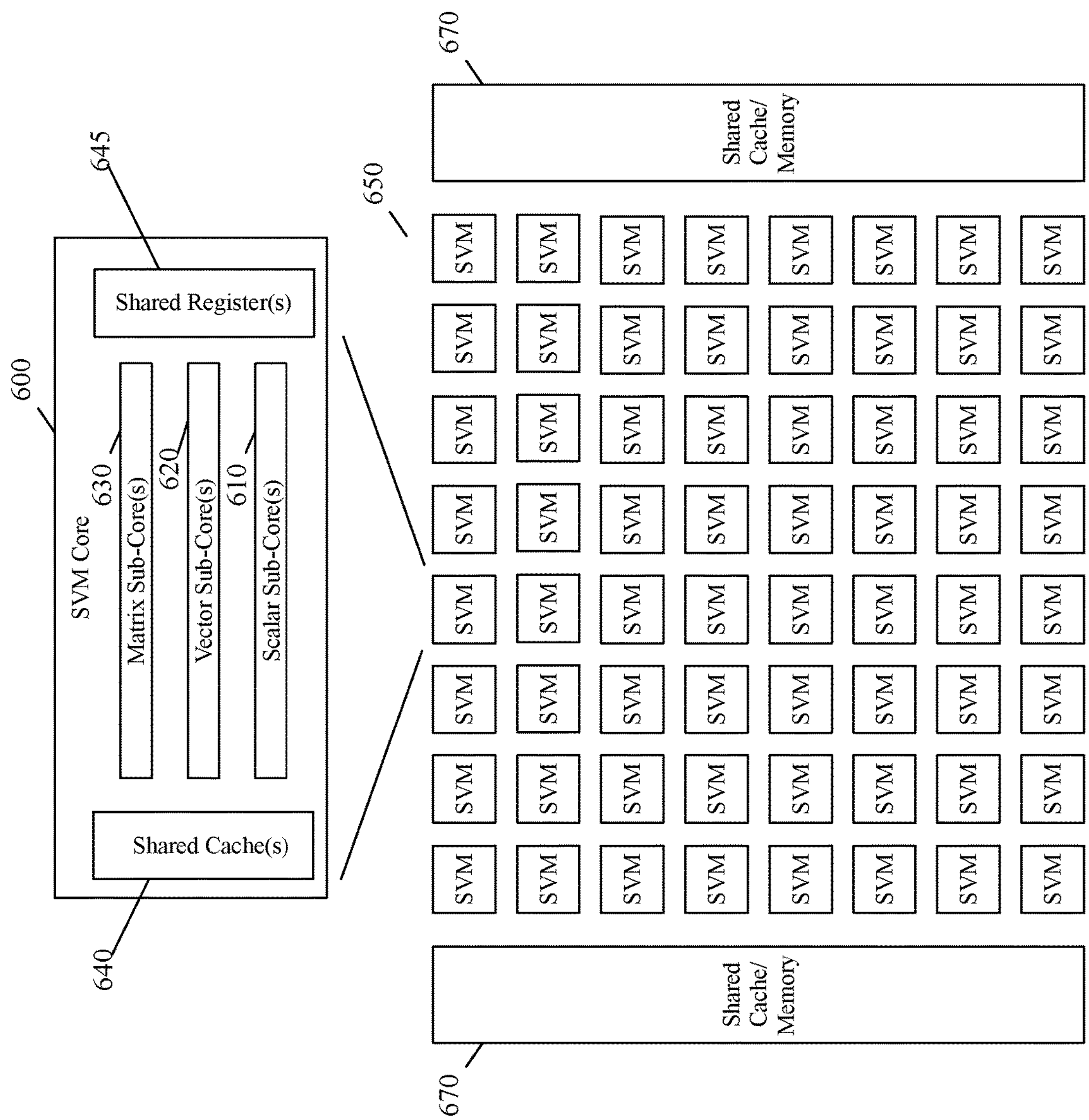
FIG. 6 conceptually illustrates an example of a processor core array that includes the heterogenous cores of some embodiments.

Before describing the execution process introduced in FIG. 2 in greater detail, the hardware of the SVM cores and core arrays of some embodiments will be described further. FIG. 6 conceptually illustrates an example of a processor core array 600 that includes the novel heterogenous processor cores of some embodiments. In this example, the array is an 8×8 array that is formed by 64 identical SVM cores 600 arranged in eight rows and eight columns. In other embodiments, the SVM cores in the SVM cores are not identical. Also, in other embodiments, the SVM core array can have any arbitrary dimensions, e.g., can be any N×M array, with N and M as two integer values that are equal or different.

Each SVM core 600 in the processor core array 650 includes three different types of sub-cores. Specifically, each SVM core 600 includes one or more scalar sub-cores 610, one or more vector sub-cores 620, and one or more matrix sub-cores 630. Each SVM core 600 also includes one or more shared caches 640 and one or more shared registers 645. Also, the different SVM cores 600 in the array 650 in some embodiments share cache and/or memory units.

In some embodiments, the different sub-cores 610-630 of each SVM core 600 are optimal for executing different types of commands. For instance, in some embodiments, the scalar sub-core 610 is optimal for executing scalar-based commands (i.e., commands that involve operations, e.g., computations, on scalar data, also called scalar operands), the vector sub-core 620 is optimal for executing vector-based commands (i.e., commands that involve operations, e.g., computations, on vector data, also called vector operands), and the matrix sub-core 630 is optimal for executing matrix-based commands (i.e., commands that involve operations, e.g., computations, on matrix data, also called matrix operands).

In some embodiments, each of the sub-cores 610-630 includes at least a control unit, an Arithmetic Logic Unit (ALU), and one or more other components, such as program counters, registers, etc. In some embodiments, the control units of the scalar, vector, and matrix sub-cores decode commands that respectively specify scalar, vector, and matrix operations. The control unit of each sub-core in some embodiments decodes the commands that the sub-core has to execute.

In some embodiments, each sub-core's ALU performs one or more types of ALU operations that are needed to effectuate execution of the command decoded by its associated control unit. Examples of these operations include arithmetic operations (e.g., add, subtract, multiply, divide, etc.), logic operations (e.g., bitwise logic operations such as "AND" operations and "OR" operations), and/or bit shift operations. The ALUs of the scalar, vector, and matrix sub-cores 610-630 in some embodiments can respectively perform scalar, vector, and matrix operations on respectively scalar, vector, and matrix data in one clock cycle (e.g., for performing computations on scalar, vector, and matrix operands in one clock cycle).

A control unit of a sub-core in some embodiments is responsible for directing the operations of its sub-core. In some embodiments, a control unit controls the execution of one command (e.g., one hardware instruction) by fetching the command, decoding the command to produce one or more control signals, fetching any required data needed for the execution of the decoded command, and directing (via the produced control signals) the ALU of its sub-core to execute the command. A control unit of a sub-core can be a hardware control unit or a software control unit (e.g., a microcode engine executed by a scalar processor, such as a small RISC-V core).

In some embodiments, the vector and matrix sub-cores 620-630 of one SVM core 600 share one control unit (while having different ALUs). This shared control unit can be employed within one of the sub-cores 620-630 or external to the sub-cores 620-630 but still part of the SVM core 600. Alternatively, in some embodiments, the vector and matrix sub-cores 620-630 have their own separate control units. In some embodiment, the scalar sub-core 610 of an SVM core 600 has its own control unit for directing the execution of scalar commands.

In some embodiments, the control unit of the scalar sub-core 610 also dispatches commands to execute to the vector and matrix sub-cores 620-630 of its SVM core 600. As further described below, these dispatched commands are in some embodiments stored in one or more command input queues from which they are retrieved by the control unit of the vector sub-core 620 or the matrix sub-core 630. The control unit of the vector sub-core 620 or the matrix sub-core 630 has a load/store (LD/ST) engine in some embodiments that retrieves any data needed for execution of the commands in the input queue. In other embodiments, this LD/ST engine is not part of the control unit of the vector sub-core 620 or the matrix sub-core 630.

In some embodiments, the scalar ALU not having specialty vector or matrix components does not prevent the scalar ALU from performing vector or matrix operations (e.g., computations), but rather just prevents the scalar ALU from performing these operations as efficiently (e.g., as quickly) as the vector and matrix ALUs. Similarly, in some embodiments, the vector ALU not having specialty matrix components does not prevent the vector ALU from performing matrix operations (e.g., computations), but rather just prevents the vector ALU from performing these operations as efficiently (e.g., as quickly) as the matrix ALUs.

The different sub-cores 610-630 of one SVM core 600 in some embodiments operate asynchronously. In such embodiments, the scalar sub-core 610 is able to continue performing operations (e.g., executing scalar commands and/or dispatching vector/matrix commands to the vector/matrix sub-cores 620-630, etc.) without waiting for the vector and/or matrix sub-cores 620-630 to finish executing earlier dispatched operations (e.g., earlier dispatched instructions). In some embodiments, the scalar sub-core 610 enqueues operations for the vector and/or matrix sub-cores in a set of input queues for the vector and matrix sub-cores 620-630 (e.g., a shared input queue or a set of separate input queues for the sub-cores), and the vector and/or matrix sub-cores 620-630 retrieve these operations from the set of input queues in order to execute these operations asynchronously. This asynchronous execution allows for even higher performance and greater efficiency of the SVM core 600 and the array 650.

As mentioned, two or more sub-cores of an SVM core 600 in some embodiments share a set of registers. For instance, in some embodiments, the vector and matrix sub-cores 620 and 630 share a set of registers 645 to store data while executing vector and matrix commands. Alternatively, in other embodiments, all three sub-cores 610-630 share the registers 645 to use while executing scalar, vector, and matrix instructions. In addition to the shared registers, one or more of the sub-cores 610, 620, and 630 of one SVM core 600 in some embodiments have their own set of dedicated registers that they do not share with the other sub-cores of the SVM core.

As mentioned above, two or more sub-cores of an SVM core 600 in some embodiments share one or more caches 640. In some embodiments, the shared cache 640 is shared among all three sub-cores 610-630 of the SVM core 600, while in other embodiments the shared cache 640 is shared among only two of the sub-cores 610-630 of the SVM core 600 and not the other sub-core (e.g., only shared between the vector and matrix sub-cores 620 and 630). The shared cache 640 can be an L1 or an L2 cache for storing data used for instructions executed by the sub-cores 610-630 or produced through the execution of these instructions.

In some embodiments, one or more memory block and one or more cache blocks are also shared among two or more different SVM cores 600 of the core array 650. In some embodiments, the cache blocks shared among the different SVM cores are L2 cache blocks, while in other embodiments they are L3 cache blocks. In some embodiments, the memory block(s) shared among the SVM cores of the core array include one or more volatile memory blocks, such as Random Access Memory (RAM) blocks.

In different embodiments, the host may execute a previously compiled application or execute code in an interpreter. In some embodiments, when the host executes code in an interpreter, that interpreter takes a segment of code, either via JIT compilation or a tracing mechanism, and launches that code to the multi-core array via the ADI. In some embodiments, if the interpreter is either unable to JIT compile the code or unable to infer or validate types in the code, then the resulting bytecode is instead executed on the host. In other embodiments, as mentioned, the code is compiled prior to execution. This code is compiled, in some embodiments, specifically for a system such as that shown in FIG. 2, in which the host that executes the program communicates with an array of hardware cores for accelerated computing.

Figure 7:
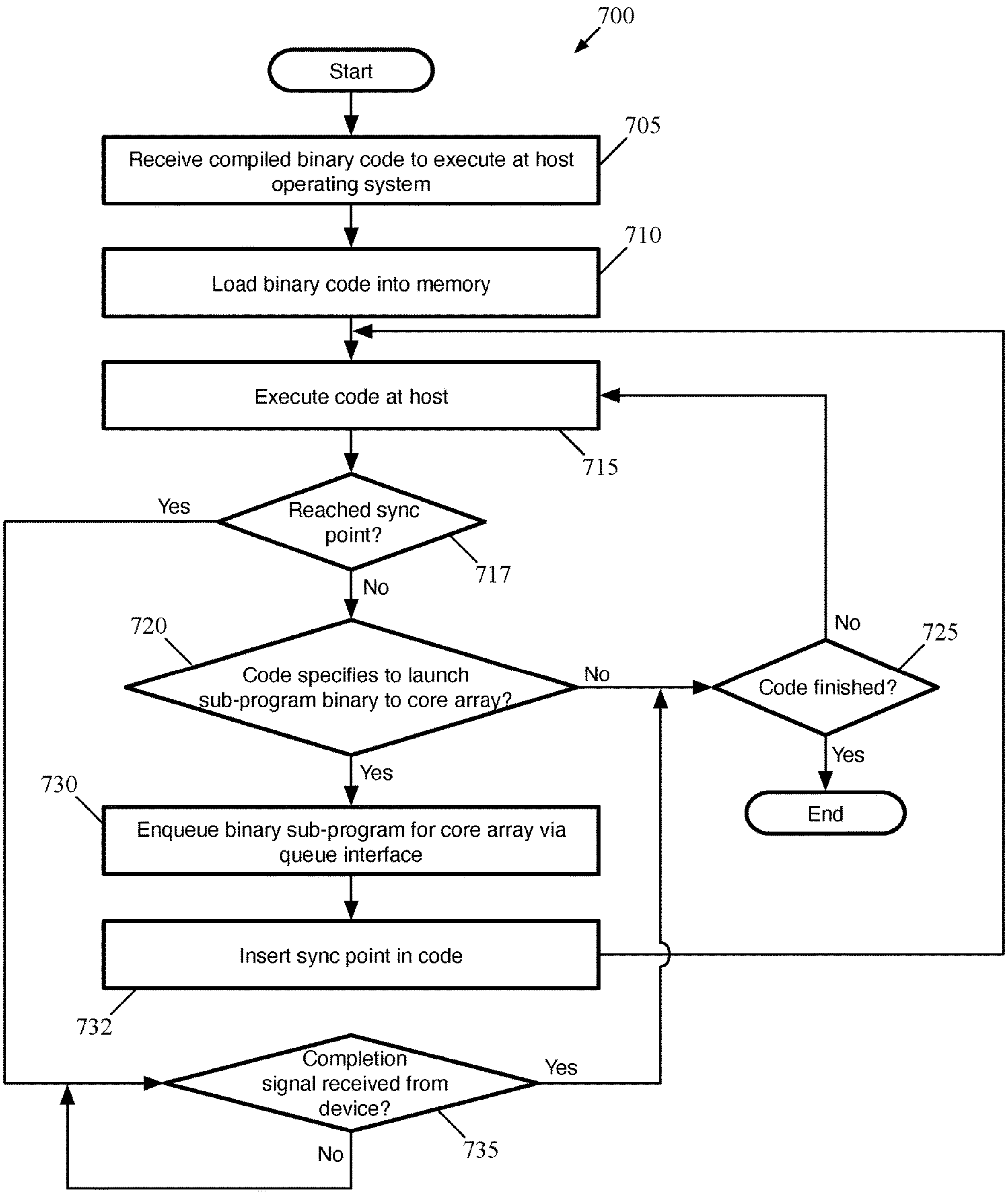
FIG. 7 conceptually illustrates a process of some embodiments for executing a primary program at a host CPU that offloads certain portions of the program to a core array for acceleration.

FIG. 7 conceptually illustrates a process 700 of some embodiments for executing a primary program at a host CPU that offloads certain portions of the program to a core array (or other accelerator hardware) for acceleration. In some embodiments, the process 700 may be performed separately for multiple different programs at once by a host CPU that manages multiple different core arrays (either physical or logical core arrays), so long as the CPU can execute multiple threads at once. The process 700 will be described in part by reference to FIG. 8, which conceptually illustrates the structure of a primary (host) program of some embodiments. It should be noted that, in other embodiments, the initial level of execution occurs on the leader core of the core array. In this case, there is no need to launch sub-programs to the core array and thus the program is flattened (the leader core of the core array may nevertheless distribute parallelized instruction set instances to the worker cores of the core array).

As shown, the process 700 begins by receiving (at 705) compiled binary code to execute at the host operating system (i.e., on the host CPU). This process 700 assumes that the code is pre-compiled rather than executed by an interpreter at the host that JIT compiles the source code at execution time. However, in other embodiments in which the code is executed by an interpreter, many of the same operations are performed at the host (e.g., sub-programs are launched in the same manner). It should also be noted that in some embodiments the compiled commands executed at the host are received as machine code (i.e., rather than intermediate representations that require further compilation). However, the sub-programs launched from the host CPU to the core array are specified as virtual commands (e.g., according to the vISA) in some embodiments.

Figure 8:
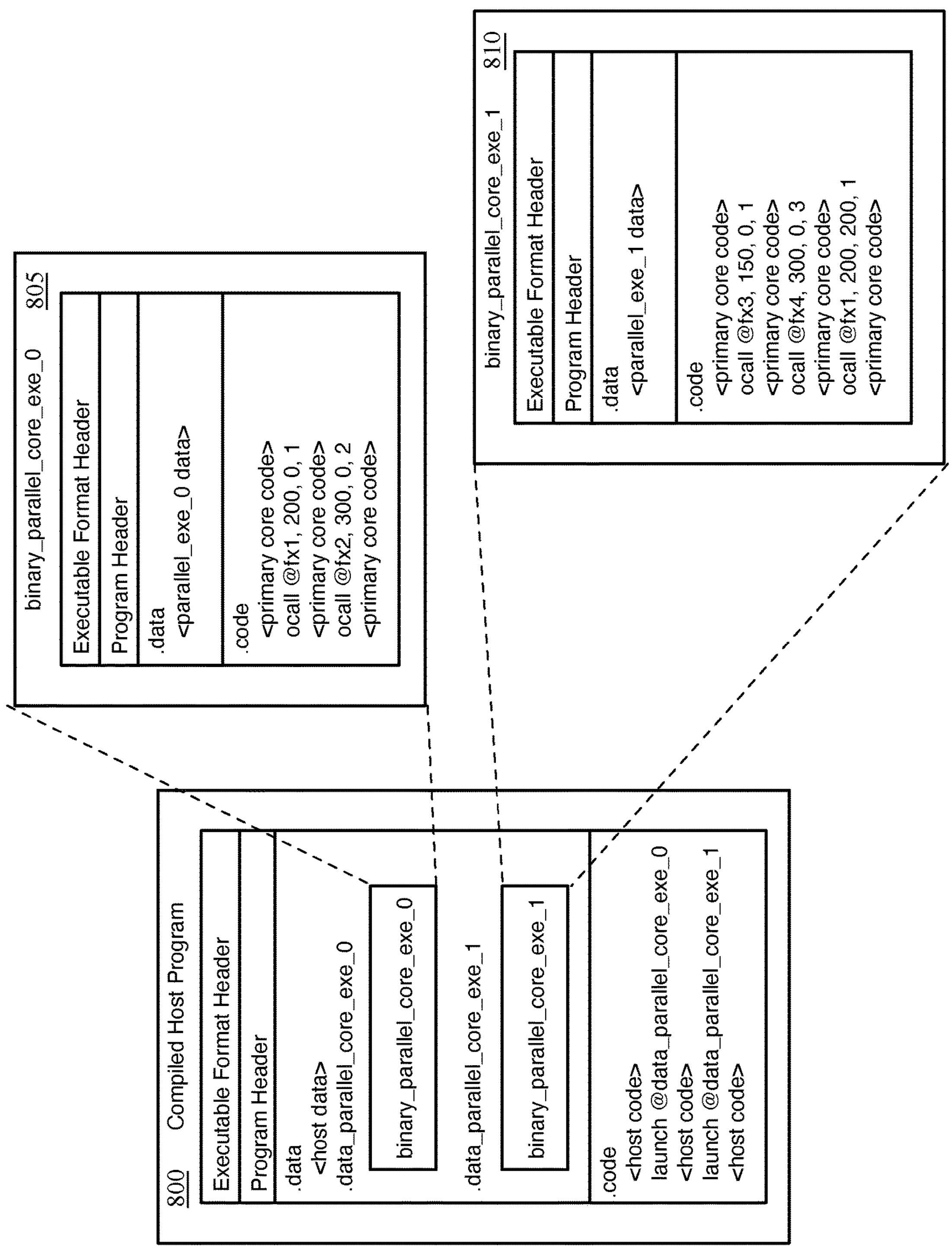
FIG. 8 conceptually illustrates the structure of a compiled primary (host) program according to some embodiments.

FIG. 8, as mentioned, conceptually illustrates the structure of such a compiled primary (host) program 800 according to some embodiments. As shown, the compiled program 800 includes an executable format header and a program header as well as data and code segments. For instance, if the compiled program 800 is an ELF64 formatted binary (e.g., for Linux or Unix operating systems), then the executable format header describes the main characteristics of the object file (indicating where the various parts of the binary can be found, specifying that the file is an executable, the size of various portions of the file, etc.) while the program header sets forth the segments of the program (e.g., the data and code segments) and their attributes so that when the file is loaded these segments can be properly mapped into memory of the host (or the leader core if the program is executed directly on the leader core).

The process 700 loads (at 710) the received binary into memory (of the host). This operation may be performed by a loader operating within the host OS in some embodiments. In some embodiments, this loading process involves parsing the executable format and program headers of the executable file and then using the information in the program header to map the different segments to memory. As shown in FIG. 8, in some embodiments the data segment of the executable program stores (1) data for use at the host and (2) additional binaries (e.g., executable sub-programs) for the host to launch on the core array). The code segment, meanwhile, specifies instructions for the host CPU to execute.

Once the binary is loaded, the process 700 begins executing (at 715) the code at the host (i.e., by the host CPU). In some embodiments, these commands specify operations for which acceleration by the core array is not needed or which involve user interaction (e.g., outputting data to a user, receiving inputs from a user). For instance, if training a neural network, initial commands might receive various training hyperparameters (input batch size, learning rate, etc.) from a user. In addition, the commands could involve formatting data for subsequent accelerator processes as well as a myriad of other types of operations. Other commands that the host may execute in some embodiments include host side Application Programming Interface (API) calls (i.e., API calls received at the host), calls to external devices (e.g., user interactions, display of data, etc.), and calls to libraries that haven't been recompiled for the core array.

During execution, the process 700 determines (at 717) whether a sync point has been reached. As explained below, sync points are inserted in the program for each sub-program that is (asynchronously) enqueued for the core array. If a sync point has not been reached (which will be the case until at least one sub-program has been enqueued for the core array), the process 700 also determines (at 720) whether the code specifies to launch a sub-program binary to the core array (or other accelerator device). If the code does not specify to launch a sub-program binary to the core array, the process 700 determines (at 725) whether the code is finished. If the code has not finished, the process 700 returns to 715 to continue executing the code.

It should be understood that the process 700 is a conceptual process and that, in some embodiments, the host does not perform a specific check for each command that it executes as to whether that command specifies a sync point or to launch a sub-program to the core array. Rather, the host executes the program commands in order until arriving at such a sync point or launch command. Similarly, the host does not specifically check after each instruction whether the code has completed but rather eventually arrives at the end of the code.

When the code specifies to launch a sub-program binary to the core array, the process 700 enqueues (at 730) this sub-program for the core array via a queue interface (e.g., in the sub-program queue shown in FIG. 3). As shown in FIG. 2 and described above, the queue interface of some embodiments is responsible for handling communications between the host CPU and the accelerator core array by enqueuing sub-programs into the sub-program queue.

In some embodiments, the sub-programs to be launched to the core array are encoded as data associated with the host program. In FIG. 8, the data segment of the host program 800 includes two sub-programs "data_parallel_core_exe_0" 805 and "data_parallel_core_exe_1" 810. These sub-programs, in some embodiments, have the same format as the primary program. In the example, both sub-programs 805 and 810 include an executable format header, a program header, and then data and code segments. However, the data of these sub-programs 805 and 810 does not itself include any sub-programs.

In some embodiments, the compiler that generates the host program 800 analyzes the source code to identify the sections of code that should be executed by the accelerator core array. For instance, in some embodiments, certain types of loops (e.g., for loops) and sections of code that primary involve mathematical computations (especially vector and/or matrix computations) are isolated for accelerated execution. In addition, some embodiments identify certain library calls that will automatically be launched to the accelerator core array (e.g., Basic Linear Algebra Subprogram (BLAS) routines). Furthermore, some embodiments identify any code requiring extensions (e.g., tensor and vector extensions) of a standard ISA (e.g., RISC-V) for the accelerator core array.

The code of the host program 800 includes various commands for execution on the host that are interspersed with launch commands, first for the sub-program "data_parallel_core_exe_0" 805 and later for the sub-program "data_parallel_core_exe_1" 810. Upon arriving at the first of these launch commands, the host CPU enqueues the first sub-program 805 for the core array using the queue interface.

Returning to the process 700, after enqueuing the binary for the core array, the process inserts (at 732) a sync point in the code for syncing the results of the enqueued sub-program. In some embodiments, the sub-program is enqueued asynchronously, such that execution at the host continues after the launch until a sync (wait) point for the sub-program is reached. In some cases, a sub-program may be enqueued synchronously be inserting the sync point prior to the next command in the primary program.

After inserting the sync point in the code, the process 700 returns to 715 to continue executing the code. Once a sync point is reached in the code (at 717), the process determines (at 735) whether a completion signal has been received from the core array (i.e., to indicate completion of the sub-program launched to the core array). At this point, if the completion signal indicating that the core array has completed execution of the sub-program and provided any results has not yet been received, the process waits (i.e., remains at 735).

Once the completion signal is received (whether the sub-program is launched asynchronously or synchronously), the process 700 determines (at 725) whether the code is finished and, if not, continues executing code at 715. As noted previously, the host does not necessarily make a specific determination as to whether the code has finished, but rather returns to executing the code until reaching a completion point. Once the completion point is reached, the process 700 ends.

While the first level of execution (and, in some cases, compilation) occurs at the host (except in the case that the primary program is executed directly at the leader core of the core array), the parallelization of specific commands occurs at the multi-core array in some embodiments and is handled during execution of the sub-programs by the leader core of the core array.

Figure 9:
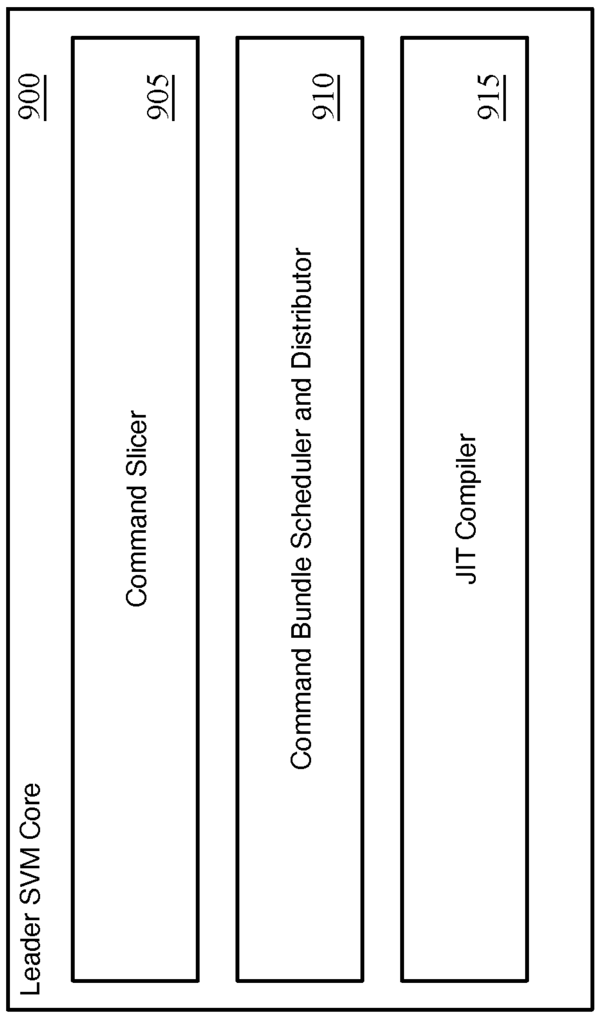
FIG. 9 conceptually illustrates a leader SVM core of some embodiments with the software that executes on the leader SVM core in order for the core to perform its leader core operations.

As previously noted, in some embodiments the leader SVM core of an array of SVM cores has the same hardware structure as the other SVM cores in the array but executes additional software in order to act as a leader core. FIG. 9 conceptually illustrates a leader SVM core 900 of some embodiments with the software that executes on the leader SVM core in order for the core to perform its leader core operations.

As shown, the leader SVM core 900 includes a command slicer 905, a command bundle scheduler and distributor 910, and a JIT compiler 915. The command slicer 905, in some embodiments, converts at least a subset of the commands in a sub-program received at the leader core from the virtual command set (e.g., vISA) to the physical command set (e.g., pISA), during execution of the sub-program. Specifically, in some embodiments the command slicer 905 takes in particular types of commands (e.g., commands for vector and/or matrix operations) and divides these into multiple command bundles based on the capacity of the underlying hardware (e.g., the individual SVM cores). The command slicer 905 of some embodiments analyzes the commands and the data used by the commands in order to determine an optimal slicing method and number of slices for each command. The slicing of various tensor (i.e., vector and/or matrix) operations will be discussed in further detail below.

The command bundle scheduler and distributor 910, in some embodiments, handles the generation of a specified number of command bundles (work items) for a parallelizable function call. In some embodiments, the parallelizable function call is specified in the received commands as a function call that indicates the number of work items to generate (and the indices for these command bundles). In some embodiments, the command bundle scheduler and distributor 910 is also responsible for generating command bundles for each of the slices of an instruction divided into multiple slices by the command slicer 905.

The command bundle scheduler and distributor 910 of some embodiments also handles the distribution of the generated command bundles (for either sliced commands or parallelizable function calls) to the worker cores (which may include the leader core in some cases). Different embodiments use a push distribution mechanism or a pull distribution mechanism for this distribution. In the push distribution case, the command bundle scheduler and distributor 910 of some embodiments assigns command bundles to different worker cores of the core array. For an accelerator system with multiple core arrays, the command bundle scheduler and distributor 915 may assign command bundles directly to individual worker cores of the other core arrays as well or to leader cores of each core array. In the latter case, these leader cores then assign their command bundles to the individual worker cores of their respective core arrays.

In the pull distribution case, the command bundle scheduler and distributor 915 adds the command bundles to a queue (e.g., located in memory shared between the cores). In some such embodiments, the leader core also signals the worker cores to retrieve the work items from the queue and the worker cores retrieve and execute command bundles based on availability. For the case with multiple core arrays, in some embodiments the command bundle queue is accessible to all of the worker cores at all of the core arrays. In other such embodiments, leader cores for each core array either retrieve command bundles from the primary command bundle queue or request command bundles from the primary leader core and then either make these available via separate command bundle queues for their respective core arrays or assign the command bundles to their respective worker cores via a push mechanism.

The JIT compiler 915, in some embodiments, re-compiles portions of the sub-programs executed at the leader core by tracking and optimizing the command streams of the sub-programs executed at the leader core. In some embodiments, this compiler 915 is a trace-based JIT compiler that tracks command counts and, when a particular command or sequence of commands has been executed a threshold number of times, optimizes that command sequence. In some embodiments, the optimization occurs in parallel to the execution of the commands (i.e., does not slow down the execution of the sub-program). When the sequence of commands is encountered again, the JIT compiler 915 replaces the instructions with the optimized version for faster execution, enabling certain optimizations not available at the initial (first-level) compilation of the sub-program.

It should be understood that, in some embodiments, these operations may be combined into single modules. For instance, in some embodiments the command slicer 905 and command bundle scheduler and distributor 910 operate together to translate certain commands (1) from single parallelizable commands (or sets of commands) into multiple command bundles (command set instances) for distribution and (2) from hardware-agnostic instructions specified according to the virtual command set into instructions specific to the SVM core hardware according to the physical command set. In some embodiments, some or all of these modules 905-915 are part of a runtime scheduler program executing on the leader core to manage the accelerated execution of sets of commands provided to the leader core.

Figure 10:
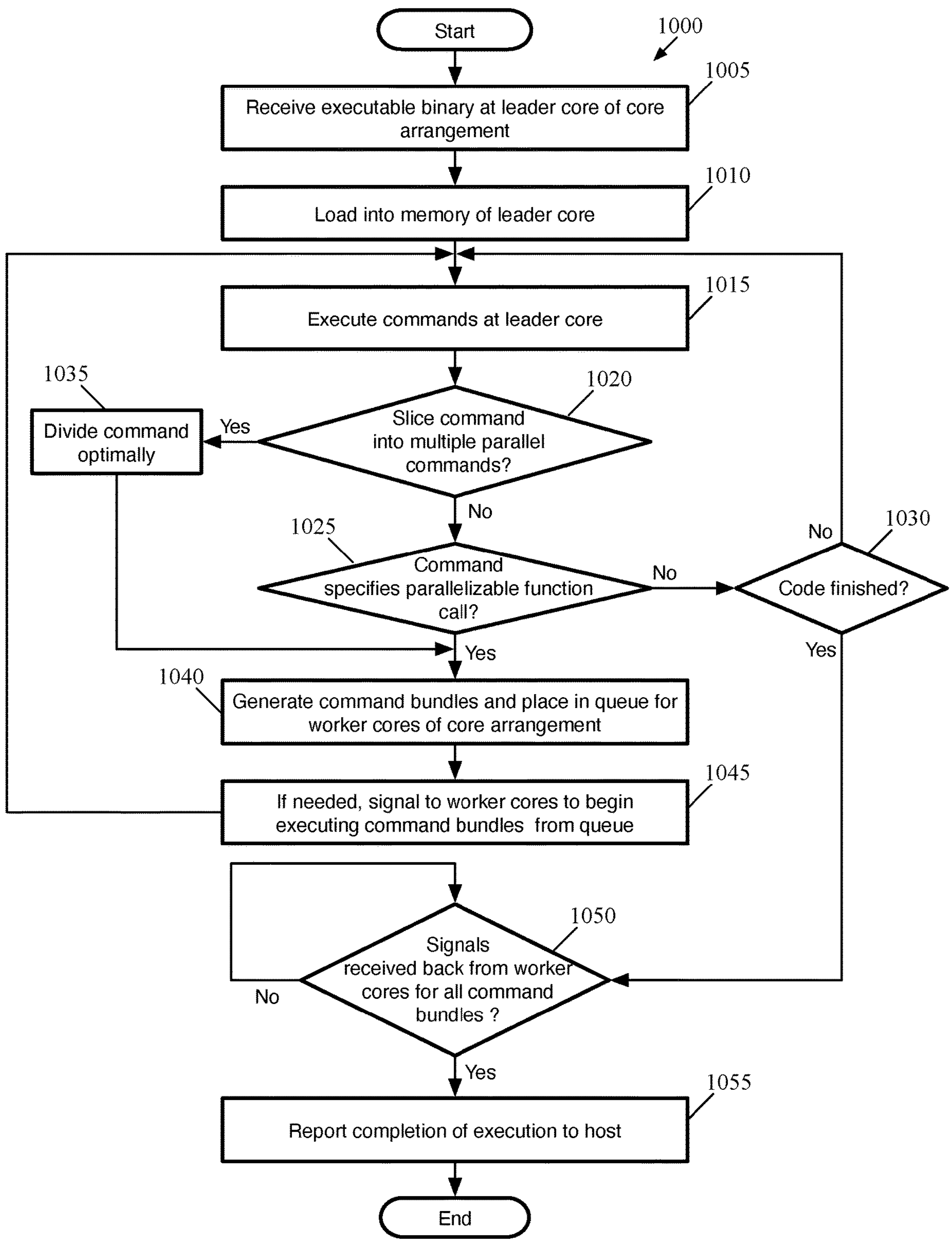
FIG. 10 conceptually illustrates a process of some embodiments performed to execute a program at the leader core of an accelerator core arrangement (e.g., a core array or arrangement of core arrays).

FIG. 10 conceptually illustrates a process 1000 of some embodiments performed to execute a program at the leader core of an accelerator core arrangement (e.g., a core array or arrangement of core arrays). Specifically, the process 1000 relates to the execution of the program with the generation and distribution of parallelizable command bundle instances for acceleration. The process 1000 does not describe the JIT compilation operations to optimize instruction sequences within the program, which is performed in parallel to the execution of the program in some embodiments. The process 1000 will be described in part by reference to FIGS. 11-14, which conceptually illustrate command bundles generated for a parallelized function call and the slicing of subsequent tensor operations.

As shown, the process 1000 begins by receiving (at 1005) an executable binary at the leader core of a core arrangement. As further described below, in some embodiments each of multiple core arrays in an accelerator device (i.e., a core arrangement or group of core arrangements) may have its own leader core, but these leader cores interact prior to the execution of any programs by the accelerator device (e.g., at bootup time) to determine a primary leader core that is the single point of interaction with the host for the accelerator device. The executable binary, as previously described, is launched from the host to the leader core of the core array by the queue interface at the host enqueuing the executable binary in the sub-program queue in some embodiments. As shown in FIG. 8, in some embodiments this executable binary sub-program has the same format as the executable binary program at the host that instructs the host to launch the sub-program to the core array.

The process 1000 loads (at 1010) the received binary into memory of the leader core. This operation may be performed by a loader executing (e.g., as a separate thread) on the scalar sub-core of the leader core in some embodiments. In some embodiments, this loading process involves parsing the executable format and program headers of the executable file and then using the information in the program header to map the different segments to memory. As shown in FIG. 8, in some embodiments the data segment of the sub-program executable files store data for use at the core array but do not store additional binaries (unlike the host program). In some embodiments, the binary is loaded into a cache associated with the leader core (e.g., an L2 cache associated with the leader core) or with the core array (e.g., an L3 cache associated with the core array) or into local memory of the leader core. The different storages (e.g., caches, local and global memory) available on the core arrays of some embodiments are described further below.

The process 1000 then executes (at 1015) commands at the leader core (i.e., begins executing the commands of the loaded program). In some embodiments, these commands specify operations that are not parallelized (e.g., because they are not parallelizable or not large enough to require parallelization). For instance, in some embodiments commands to rearrange data (e.g., the input channels of a neural network) do not need parallelization when all of the cores of the core array have access to the same memories. As another example, at inference of a classifier neural network, selecting a category based on likelihoods calculated for a set of categories is generally not an operation that requires parallelization, but may be handled at the leader core (typically after a last set of parallelizable calculations).

During execution, the process 1000 determines (at 1020) whether a command should be sliced into multiple parallel instructions. For commands for which this is not the case, the process 1000 also determines (at 1025) whether the command specifies a parallelizable function call. If the command does not specify a parallelizable set of operations (i.e., because the command neither is the type to be sliced into multiple parallel operations nor does the command explicitly call a parallelized function), the process 1000 determines (at 1030) whether the code is finished. If the code has not finished, the process 1000 returns to 1015 to continue executing the code. It should be understood that, like the process 700 described above by reference to FIG. 7, the process 1000 is a conceptual process. In some embodiments, the leader core does not perform a specific check for each command that it executes as to whether that command is parallelizable. Rather, the leader core executes the program commands in order until arriving at such a command. Similarly, the leader core does not specifically check after each command whether the code has completed but rather eventually arrives at the end of the code (e.g., a return operation).

When the command should be sliced into multiple parallel command bundles, the process divides (at 1035) the command optimally. In some embodiments, specific types of commands are identified for slicing. Specifically, the leader core automatically provides certain matrix and/or vector (tensor) commands to the command slicer module (e.g., of the runtime scheduler). In some embodiments, these commands are virtual commands (e.g., virtual ISA commands) that specify a particular tensor operation (e.g., tensor addition, tensor multiplication, etc.). The leader core, in some embodiments, provides to the command slicer (1) the specified operation and (2) a description of the tensors on which the operation is to be performed (e.g., the dimensionality and size of the tensors, the memory locations of the tensors). The command slicer then partitions the operation into multiple operations for execution by the cores of the core array (or other execution units, depending on the underlying hardware).

Different embodiments may use different strategies to slice the operations. In some embodiments, the goal of the partitioning strategy is to partition the operation into smaller, manageable sub-computations to be executed in parallel. The partitioning strategy may be based on the available hardware resources, such as a combination of the number of execution units (e.g., SVM cores), the memory capacity of the accelerator system, and the computational power of each execution unit or group of execution units. The partitioning strategy may also be based on the characteristics of the operation (e.g., data dependencies, the data access pattern, and the data layout). It should be noted that, while the partitioning described herein is performed dynamically (i.e., at runtime by the leader core), other embodiments perform similar partitioning of these tensor operations statically (i.e., by the compiler). In the latter case, the command slicer does not need to perform its operations during execution of the program, as the slicing is specified in the commands (similar to the parallelizable function calls described below).

For the actual partitioning, some embodiments use one or more of input-based partitioning, execution-based partitioning, and output-based partitioning. For input-based partitioning, input tensors are divided into smaller tensors, which can then be processed independently on different cores. This technique may be useful when the input data is too large to fit into the memory or computational resources of a single core (e.g., the registers of a single core are not large enough to hold all of the data of the input tensor(s)). Some embodiments base the indexing computation for the partitions on the location of the input domain from which data is read. If the output indexing is data dependent, some embodiments require partitioning based on the input so that sequential blocks of memory are read by neighboring work items. For instance, the tensor scatter operation (a PyTorch operation that scatters values of an input tensor into an output tensor that is typically larger in at least one dimension) is optimally partitioned based on the input.

For execution-based partitioning, the computation itself is divided into smaller partitions or sub-computations, which can then be executed independently on different cores. This technique may be useful when the computation is too complex or computationally intensive to be executed on a single device, even if the input or output tensors are themselves not especially large relative to the core. Some embodiments base the indexing computation on the location in the execution domain. For instance, convolutional operations (e.g., the convolutional layer of a neural network) are optimally partitioned using execution-based partitioning in some embodiments. The convolutional operations may be partitioned such that, e.g., each filter (corresponding to an output channel) is handled by a separate core, or even with each filter handled by multiple cores.

For output-based partitioning, the output data (e.g., the output tensor) is divided into smaller tensors, which are computed and assembled independently on different cores. Some embodiments base the indexing computation on the location of the output domain to which the data is written. If the input indexing is data dependent, some embodiments require output-based partitioning so that sequential blocks of memory are written by neighboring work items. For instance, the tensor gather operation (a PyTorch operation that gathers some of the values of an input tensor into an output tensor that is typically smaller in at least one dimension) is optimally partitioned based on the output.

The most efficient method of partitioning can depend on the operation being partitioned. In some embodiments, the command slicer decides on the most efficient partitioning method before performing its slicing. For pointwise operations, the most simplistic case, all three of these partitioning modes are equal in performance as they all produce the same data ranges. In addition, for a single operation, the differences between partitioning techniques are not as meaningful, but when a command involves multiple sequential operations (e.g., a convolutional layer that involves dot products, post-processing of the dot products, and activation functions, or a matrix multiplication that involves both multiplication and addition operations), then the selected partitioning technique determines how the data flows through the accelerator system.

In some embodiments, the command slicer on the leader core performs partitioning (and, in some cases, associated core assignment) based in part on the segmentation pattern and the number of cores available to execute the segmented instructions. In an optimal partition, the number of slices for a sequence of commands is equal to the number of cores available, but simply slicing based on the number of cores would not account for the capabilities of the cores, register pressure (i.e., ensuring that the tensor size required for an operation slice fits within the registers of a core), or page sizes. Thus, some embodiments take all of these factors into account in order to minimize resource usage while increasing performance. In some embodiments, the command slicer performs a multi-dimensional pareto optimization algorithm.

The following provides an example of such an algorithm that determines the start, stop, and size of each slice of an N-dimensional tensor, when partitioning the tensor into K segments for an accelerator with M cores. This algorithm assumes that the slicing pattern has been determined (i.e., by the optimization algorithm). For these computations, the tensor start and stop indices are based in part on the pattern variable. In some embodiments, this variable is based on dimensions associated with the virtual command set (e.g., the size of the input and/or output tensor) as well as the physical command set capacity (e.g., the number of tensor elements each core can handle).

First, the following pseudocode presents the formula for determining the start of each slice of the tensor:

```
for j: entries
  for i: rank (V_orig)
    V_start[i][j]=floor((volume(pattern)!=1?j:
      0)*V_orig[i]/pattern[i % rank(pattern)])
```

In this algorithm, i represents the index of the tensor in the current slice, j represents the index of the core to which the slice may be assigned, V_orig[i] is the original size of the tensor, and pattern[i % rank (pattern)] is the size of the tensor in the current slice. In order to support broadcasting across the given dimension, the condition volume(pattern) !=1?j: 0 determines whether to use the core index j or 0 based on the total volume of the pattern. Flooring this result ensures that the starting index is an integer value. In addition, if volume(pattern)==1, then the algorithm sets the starting index to 0 for all slices (i.e., not actually slicing the tensor), while if pattern[i % rank (pattern)]==0, the division operation either returns 0 or handles the error resulting from the divide by zero case.

Next, the following pseudocode presents the formula for determining the endpoint (stopping index) of each slice of the tensor:

```
for j: entries
  for i: rank (V_orig)
    V_stop[i][j]=min (V_orig[i], floor ((volume (pattern)!=1?j+1:0)*V_orig [i]/pattern[i % rank (pattern)]))
```

In this formula, the condition volume (pattern)!=1?j+1:0 determines whether to use the core index j+1 or 0, based on the total volume of the pattern, to support broadcasting across the entire dimension. Flooring this result ensures that the starting index is an integer value. The min function is also used to clamp the stopping index to the original tensor size (i.e., ensuring that the last slice along a dimension does not exceed the tensor boundaries). In addition, if volume (pattern)==1, then the algorithm sets the stopping index to the original tensor size for all slices (i.e., not actually slicing the tensor), while if pattern[i % rank (pattern)]==0, the division operation either returns 0 or handles the error resulting from the divide by zero case.

Finally, the size for each slice, in each dimension, is simply the difference between the stop and start indices for the slice in that dimension. If the start and stop indices are equal, then the slice size is 0 (i.e., the slice is skipped). If the start index is greater than the stop index (i.e., an error has been made in the computations), then the slice size is either set to 0 or the instruction slicer handles the error.

Returning to FIG. 10, if either (i) the command specifies a parallelizable function call or (ii) the command has been sliced into multiple parallel commands, the process generates (at 1040) command bundles and places these work items in a queue for the worker cores of the core arrangement. In some embodiments, the commands specifying a parallelizable set of operations use a specific command (e.g., that is part of the virtual and/or physical command set) that specifies to define parallel command instances for a function call or other set of operations. For instance, the two sub-programs 805 and 810 shown in FIG. 8 include "ocall" instructions that are explicit instructions for parallelization.

Each of the "ocall" instructions shown in FIG. 8 indicates a function, a number of instances, a starting index for the instances, and a stride for the indices. Thus, the first ocall instruction in the first sub-program 805 ("ocall @fx1, 200, 0, 1") specifies to generate 200 instances of the function fx1, with the instances having indices ranging from 0-199. The second ocall instruction in the first sub-program 805 ("ocall @fx2, 300, 0, 2") specifies to generate 300 instances of the function fx2, with the instances having even integer indices ranging from 0-598. That is, the notation in these examples specifies a "ocall" instruction ("ocall @fx, K, i_0, s") with the following five items:

- ocall: the instruction name (e.g., in the virtual ISA) for the parallelizable function call
- @fx: the address of the function to call
- K: the number of instances of the function to call in parallel
- i_0: the base offset to start the indexing for each parallel call
- s: the stride increment for each subsequent call In some embodiments, the indexing may have multiple dimensions (e.g., to divide up a matrix into rectangular blocks), in which case a base offset and stride is provided for each of the dimensions. Thus, where a first subset of commands requires the command slicer to determine an optimal manner to divide the command, a second subset explicitly specifies how to generate multiple instances of the same set of commands (i.e., the same function).

The following presents a simple example of a parallelizable function call in a single dimension, to implement a copy loop (i.e., that copies K values of an array of values B into an array A). This copy loop can typically be written as:

```
for (int i=0; i<K; ++i)
    A[i]=B[i]
```

To execute this as a parallelizable function call, some embodiments require that A and B follow the constraints that (1) the memory that A points to is not accessible by B when indexed in the range [0, K) and (2) the memory that B points to is not accessible by A when indexed in the range [0, K). Assuming that those constraints hold, then an equivalent parallelizable call is:

```
void tmp_func( )
    i=get_index( )
    A[i]=B[i]
OCALL @tmp_func, K, 0, 1
```

This parallelizable call enables all of the copies (or, for other functions, more complex vector or matrix operations) to be performed in parallel by multiple cores of an accelerator core arrangement rather than serially as in the case of a simple for loop.

Figure 11:
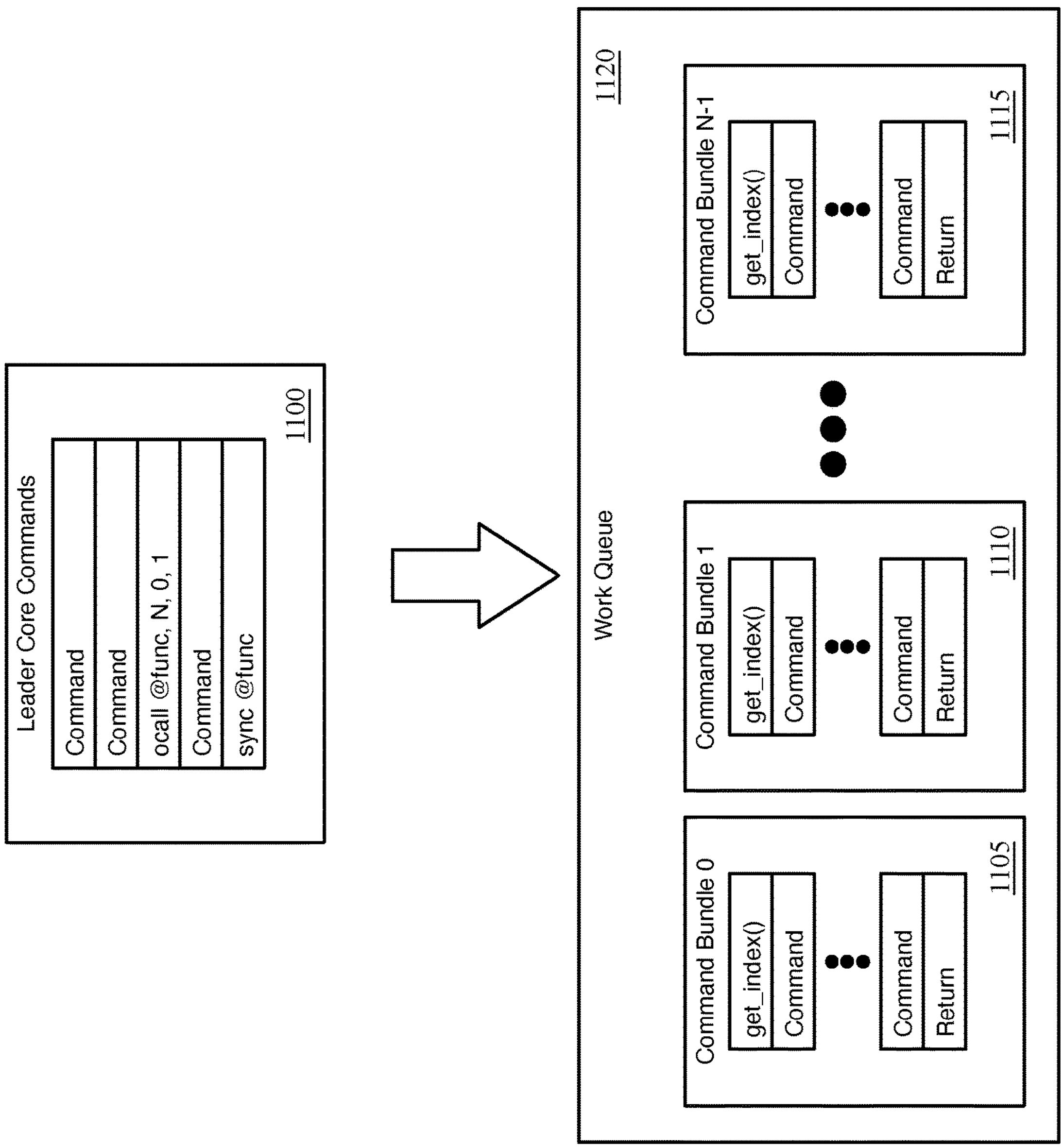
FIG. 11 conceptually illustrates the generation of work items for a parallelizable function call of some embodiments.

FIG. 11 conceptually illustrates the generation of command bundles for a parallelizable function call of some embodiments. As shown in this figure, the parallelizable function call a command within a set of commands 1100 (e.g., a program, a process, a thread, etc.) for execution at the leader core, which can also include non-parallelizable commands. Following the "ocall" is a sync command for the ocall. In some embodiments, the parallelizable function call is asynchronous, in that the leader core continues executing any instructions in its instruction set until a sync point for the parallelizable call is reached. Thus, additional commands (including additional parallelizable operations, so long as those parallelizable operations do not depend on the results of the first parallelizable operation) could be executed prior to the sync point for a given parallelizable operation.

In this example, the ocall is for a function "func", with the ocall command specifying to generate N command bundles with indices ranging from 0 to N−1 (i.e., starting at 0 with a stride of 1). Based on this, the leader core generates N command bundles 1105-1115 that are added to a queue 1120 of such command bundles. Each of these command bundles includes a set of commands, beginning with a get_index( ) function described below as well as a number of additional commands determined by the function specified by the ocall command. These commands are the same for each command bundle in some embodiments, with different data used based on the indices. In some embodiments, the commands may include scalar, vector, and/or matrix commands, which are executed by different components (e.g., different sub-cores) of the worker cores as described above.

As noted, each of the command bundles 1105-1115 begins with a command get_index( ) that is used in some embodiments as an abstraction to retrieve the identifier (index) of the current parallel instantiation of the function. In some embodiments, this identifier is retrieved from a data structure defined for the command bundle, which is generated by the runtime scheduler on the leader core. This allows each command bundle to be differentiated from other command bundles (i.e., each command bundle has a different index). In addition, the indices may specify the data portions (e.g., of an array or matrix) to be used by each of the command bundles. Additional details regarding the command bundles will also be described further below.

In addition, for sequences of operations (e.g., sequences of sliced operations), some embodiments add operations into the queue in either a depth-first or breadth-first manner. In some embodiments, when slicing a sequence of operations, the command slicer specifies whether the operations should be executed (and thus enqueued) in a depth-first order. The command slicer, in some embodiments, may also specify that groups of operations should be linked together so that these operations are all executed by the same core (e.g., to avoid the computationally expensive transfer of data between cores). Furthermore, in some embodiments, the command slicer has information as to the location of different portions of input data and therefore specifically assigns specific slices of an operation to specific cores.

In both depth-first and breadth-first execution, each operation in a sequence is partitioned into smaller sub-operations to be executed in parallel, but the order of execution is different. In depth-first partitioning, slices of multiple operations that operated on one slice of data are enqueued subsequently (e.g., as a block to be executed by a single core), followed by the next slice for another slice of data, etc. In breadth-first mode, all of the slices of one operation are executed (or at least enqueued) prior to execution of the next operation.

Figure 12:
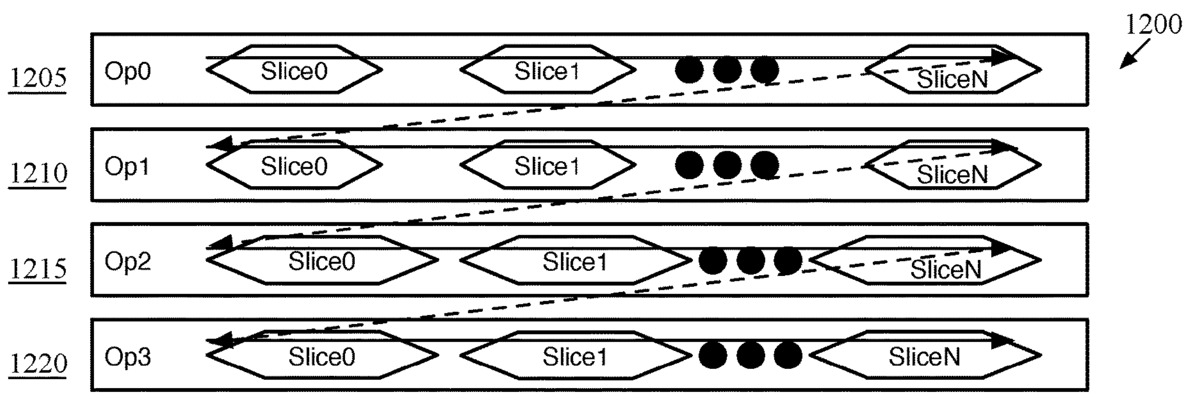
FIG. 12 conceptually illustrates breadth-first partitioning and execution for a sequence of operations.

FIG. 12 conceptually illustrates breadth-first partitioning and execution for a sequence of operations 1200, each of which is sliced into N slices. In this example, the first two operations 1205 and 1210 have a first slicing pattern (e.g., the same size input tensors) while the latter two operations 1215 and 1220 have a second slicing pattern. As shown in this figure, for breadth-first execution, all of the slices of the first operation 1205 are enqueued (and thus likely to be executed) prior to any of the slices of the next operation 1210.

Figure 13:
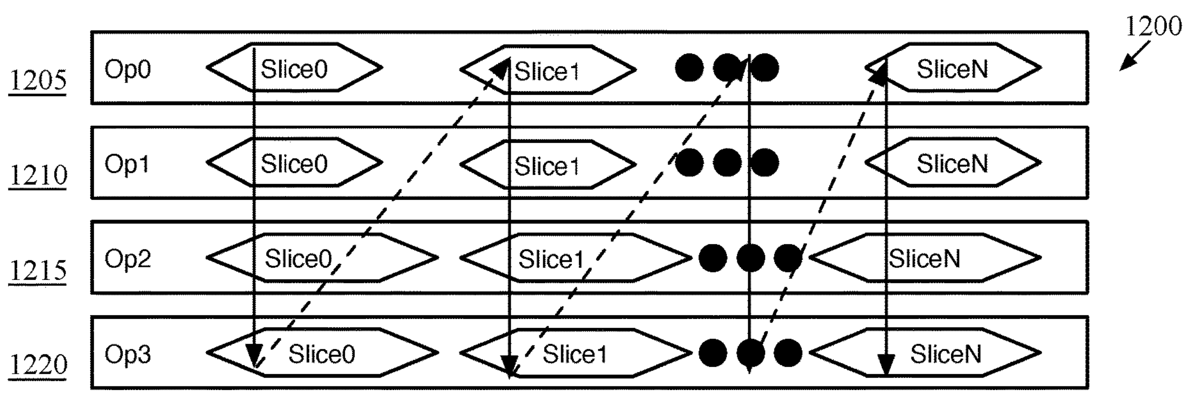
FIG. 13 conceptually illustrates depth-first partitioning and execution for the sequence of operations.

FIG. 13 conceptually illustrates depth-first partitioning and execution for the sequence of operations 1200. As shown in this figure, for depth-first execution, all of the corresponding slices of the sequential operations 1205-1220 are enqueued together (e.g., in blocks), prior to the enqueuing of the next slices of all of the operations. This enables the output of one operation slice to be read immediately by the next operation (optimally at the same core). It should be noted that if the number of slices equals the number of cores, then this same result may be achieved with breadth-first partitioning.

Figure 14:
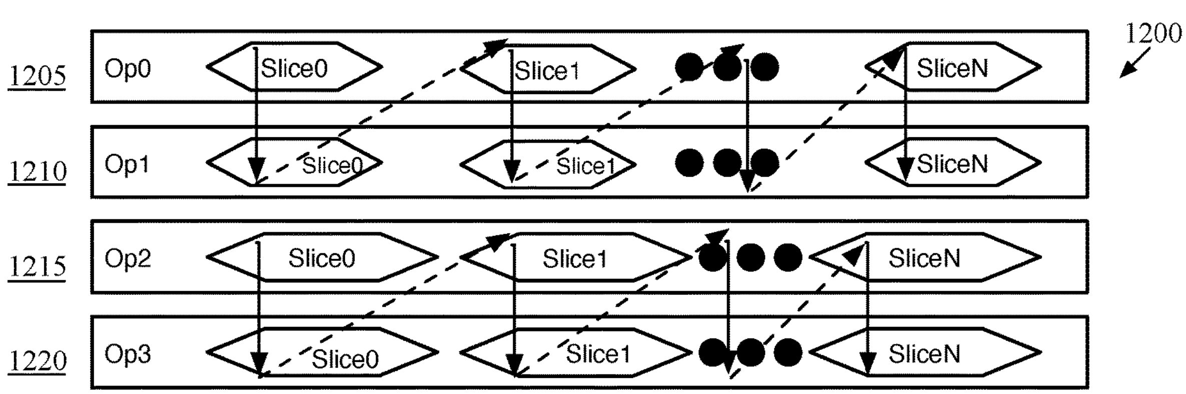
FIG. 14 conceptually illustrates a hybrid partitioning and execution method for the sequence of operations.

FIG. 14 conceptually illustrates a hybrid partitioning and execution method, in which corresponding slices for sequential commands are executed (enqueued) together in a depth-first manner until a break bit is identified (i.e., when sequential operations have different slicing patterns), at which point the next slices for these commands are enqueued. This technique, in some embodiments, mimics the execution of the parallelized function calls (i.e., in this example the first two operations 1205 and 1210 belong to a first parallelized function call and the second two operations 1215 and 1220 belong to a second parallelized function call). In some embodiments, to use either depth-first or hybrid partitioning and execution for a sequence of commands, the command bundle generator treats these like a parallelized function call and inserts the entire instruction sequence into a single command bundle, then enqueues that command bundle.

In some embodiments, when adding command bundles to the queue, the leader core assigns a range of memory to its worker cores that covers the size of the command bundle queue. In some embodiments, this queue is a memory-backed queue that handles commands for the parallelizable command execution, with each such parallelizable call or sliced command reserving an entry in the range of memory. In some embodiments, each range of memory includes counters (e.g., 64-bit counters) for the next command bundle to be executed and the total number of command bundles to execute, as well as the command address, common state address, and base address of per command bundle memory state. Furthermore, along with each memory range in some embodiments are bitmasks that specify whether an exception has triggered, whether execution is happening, and whether the parallelized function call or sliced instruction set is in an error state.

In some embodiments, the leader core places in memory the data structures required for launch of a command bundle in two separate sections. These separate memory sections are (1) a uniform memory section common to all of the worker cores and (2) a per-worker core memory state that is updated and propagated to the worker cores. In the case that multiple core arrays with their own leader cores are used, then in some embodiments these secondary leader cores take the common and per-core state, then finalize the per-core state write to the register of the worker core that will execute a block of data with the state for that block of data along with the addresses for the uniform memory and the per-core memory. Once the memory and registers are set, the command address for the worker core to execute is then stored in a memory location and the worker core is pointed to execute this command. These registers and memory addresses are then added to a structure that is enqueued into the command bundle scheduler for each worker core.

Returning to FIG. 10, after generating the command bundles and placing these command bundles in a queue, the process 1000 signals (at 1045) to the worker cores of the core arrangement (if needed) to begin retrieving and executing command bundles from the queue. In some embodiments, the worker cores are put to sleep (i.e., to save power) when acceleration tasks are not required for a period of time (e.g., after a particular number of clock cycles). If the worker cores have been asleep, then in some embodiments the leader core signals to these cores (e.g., via an interrupt signal) to wake up and begin retrieving command bundles from the queue.

The process 1000 illustrates the use of a pull mechanism for the distribution of the command bundles to the worker cores. As mentioned, some embodiments use a push mechanism instead to distribute command bundles. In this case, rather than placing the command bundles in a queue and signaling to the worker cores, the leader core (e.g., the runtime scheduler executing on the leader core) assigns the command bundles to the different worker cores and notifies those worker cores of the command bundles to retrieve (e.g., from shared cache or memory). In some such embodiments, the runtime scheduler assesses the capabilities (e.g., processing speed) of the different worker cores. For a single core array, this may be the same for all of the cores, but for an arrangement of multiple core arrays, different cores (or different core arrays, if the primary leader core assigns blocks of command bundles to entire core arrays) may have different processing capacities. In some embodiments, the runtime scheduler also assigns command bundles based on the location of the data to be used for those command bundles. For instance, if a particular vector or portion of a vector is stored in memory located near a particular core array of an arrangement of core arrays, then the scheduler can assign the command bundle(s) using that data to that particular core array.

The process 1000 then returns to 1015 to continue executing commands at the leader core. As shown by the leader core commands 1100, in some embodiments the parallelizable set of operations is an asynchronous command, in that the program continues executing before completion of all of the command bundles generated by that command. Though not shown in the process 1000, in some embodiments the continued execution eventually runs into a sync point for the parallelized operation set. In this case of the command set 1100, there is one command to be executed after the parallelized operation set and before the sync point. If the process 1000 arrives at the sync point for a particular parallelized operation set, then in some embodiments the leader core pauses execution of this root command set until receiving signals from the worker cores indicating completion of all of the generated command bundles.

In some embodiments, the sync event for a parallelized command is stored in a register and the sync on this event happens at an execution point in the future. This enables multiple parallelized commands to be executed at once (i.e., the multiple command bundles generated for a single parallelized command as well as command bundles generated for additional parallelized commands) without a need for the synchronization order to be out of order in some embodiments. In addition, in some cases, command bundles can themselves include parallelizable function calls (i.e., recursive parallelizable operation sets), which are enabled by the asynchronous nature of these calls. In some embodiments, when the set of commands that generated command bundles for a parallelizable call arrives at a sync point, execution of that set of commands stops, the process goes to sleep, and the core executing that process (e.g., the leader core process or a command bundle with a recursive parallelizable function call) continues executing the next command bundle from the execution queue. Once execution of all of the command bundles generated by a particular parallelized command set is complete, some embodiments wake up the sleeping process and continue execution from that command.

Once the leader core has completed executing the code (i.e., for a sub-program), the process 1000 determines (at 1050) whether signals have been received back from the worker cores for all command bundles enqueued by the leader core. In some embodiments, if the sync point for all of the parallelized instruction sets are prior to the completion of the code, then this is not necessary as the leader core will only reach the end of the code after having received all of the completion signals from the worker cores.

Once the code has completed and all signals are received, the process 1000 reports (at 1055) completion of execution of the commands (e.g., the sub-program) to the host, then ends. As noted above, if the leader core also acts as the host, then the program is flattened (i.e., no sub-programs need to be launched) and this operation is not necessary. In case the host is separate from the leader core, reporting the completion of the execution of the set of commands enables the host to continue execution of its primary program from the sync point for that sub-program.

Figure 15:
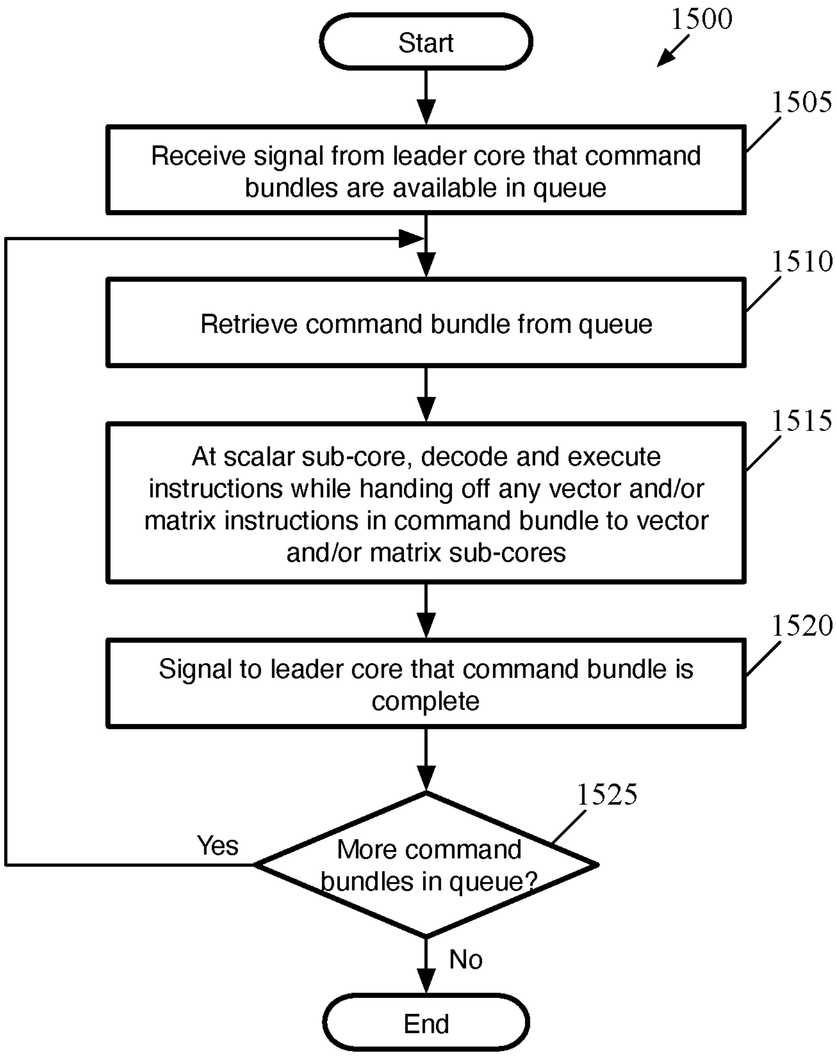
FIG. 15 conceptually illustrates a process of some embodiments for execution of a work item.

The worker cores, as indicated, execute the command bundles to accelerate the execution of parallelizable commands. In some embodiments, when a worker core is not needed (i.e., does not have any command bundles to execute), the worker core is put to sleep. FIG. 15 conceptually illustrates a process 1500 of some embodiments for execution of a command bundle. The process 1500 is performed by a worker core or a leader core operating as a worker core to execute parallelized command bundles (e.g., if the leader core command set is waiting for the completion of a set of command bundles in order to continue, the leader core may operate as a worker core to execute command bundles).

As shown, the process 1500 begins by receiving (at 1505) a signal from a leader core that command bundles are available in the work queue. In some embodiments, this signal is a hardware interrupt initiated by the leader core. As noted above, upon placing command bundles into the queue, the leader core generates these signals to wake any sleeping cores, if needed (i.e., if the cores have been put to sleep).

The process 1500 then retrieves (at 1510) a command bundle from the queue. As described above, in some embodiments, the leader core places in memory the data structures required for launch of a command bundle in two separate sections, (1) a uniform memory section common to all of the worker cores and (2) a per-worker core memory state that is updated and propagated to the worker cores. Once the memory and registers are set, the address of the command (instruction address) for the worker core to execute is then stored in a memory location and the core is pointed to execute this command. These registers and memory addresses are then added to a structure that is enqueued into the command bundle scheduler for each worker core.

When a command bundle is to be executed by a worker core, the next command bundle counter is atomically incremented and the previous value is returned to the worker core to execute. Using this global command bundle identifier, the worker core of some embodiments reads the common state memory and the per-command bundle memory state and uses that to compute the information required for execution by the instance of the parallelizable instruction set.

Next, the process 1500 decodes and executes (at 1515) commands at the scalar sub-core while handing off any vector and/or matrix instructions in the command bundle to the vector and/or matrix sub-cores. Regarding the details of execution, once the necessary information is programmed into the registers of the worker core, the worker core jumps to the command address and starts executing the code for the command bundle in some embodiments. It should be noted that the specific manner of execution shown in this figure assumes a heterogenous core such as that described above by reference to FIG. 6 and that other types of worker cores may execute the commands in a different manner. In some embodiments the scalar sub-core is a RISC-V processor, and the scalar commands are executed by this scalar processor. For explicit tensor commands (e.g., vector and/or matrix commands), the scalar sub-core hands these off for execution (e.g., asynchronously) to the tensor sub-core(s) (i.e., the vector and/or matrix sub-cores). In some embodiments, the slices of tensor commands defined by the leader core are among those handed off to the vector and/or matrix sub-cores. In addition, parallelized function call instances may include both scalar and tensor (vector/matrix) commands within a command bundle.

After finishing execution of the command bundle, the process 1500 signals (at 1520) to the leader core that the command bundle is complete. As described above, the leader core of some embodiments requires that the worker cores signal upon completion of a command bundle so that the leader core can determine when all of the command bundles for a parallelized command are completed.

Though not shown in the figure, in some embodiments, if an exception is triggered on any command in the command bundle, then the worker core sets its corresponding exception bit. If the execution finishes and there are no more command bundles left for the worker core to execute that it has pulled from the queue, then the execution bit for the worker core is flipped to unset and the worker core moves on to the next command bundle in the queue. In addition, in certain cases, a command bundle may itself include parallelizable commands. These recursive parallelized commands are described in more detail below.

Once the execution of the command bundle is complete, the process 1500 determines (at 1525) whether additional command bundles remain in the queue. Though not shown, in some embodiments a worker core may retrieve multiple command bundles at once (e.g., in order to perform depth-first execution of a particular slice of multiple sequential operations). In this case, the worker core executes all of these grouped command bundles before determining whether additional command bundles remain in the queue.

If the command bundle queue is empty, the process 1500 ends. In some embodiments, the worker core is also put to sleep at this point in order to save power. On the other hand, if additional command bundles remain (e.g., because a parallelized command spawned more command bundles than worker cores available, because a parallelized command instance spawned recursive parallelization, or because the leader core process reached another parallelizable command that spawned additional command bundles), the process 1500 returns to 1510 to retrieve another command bundle from the queue (e.g., the next command bundle or block of command bundles in the queue).

Figure 16:
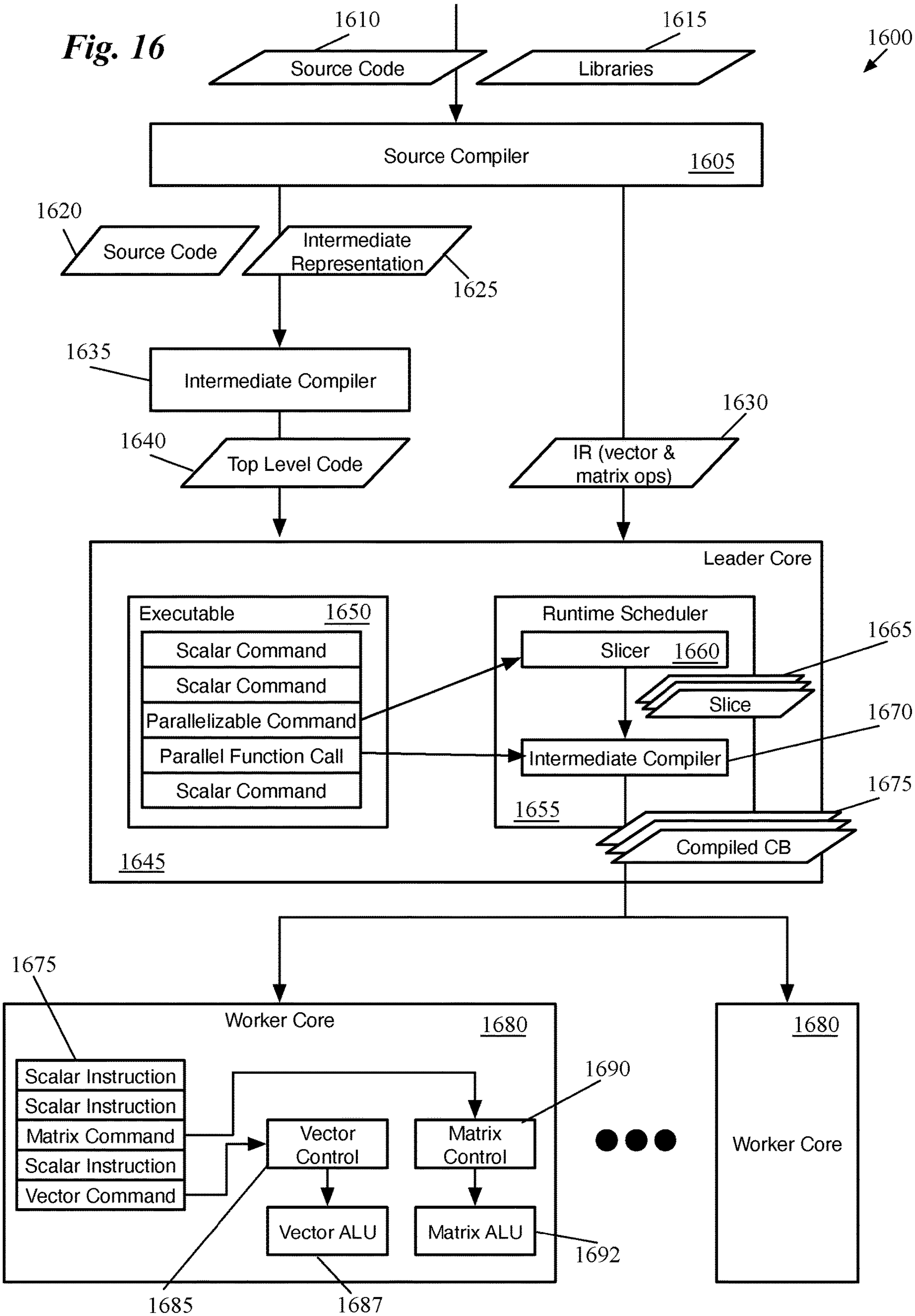
FIG. 16 conceptually illustrates the flow of instructions through a system of some embodiments, from the user-defined source code through to the instruction set executed by a worker core.

With the previous description having described the execution process at the host, leader core, and worker cores within an accelerator system, the flow and compilation of instructions through that system will now be described according to some embodiments. FIG. 16 conceptually illustrates this flow of commands through a system 1600 of some embodiments, from the user-defined source code through to the command bundle executed by a worker core.

As shown, a source compiler 1605 receives source code 1610 and libraries 1615. The source code 1605 is user-defined source code (e.g., Python code) that specifies the operations for the accelerator system 1600 to execute (e.g., machine learning operations, such as neural network training, neural network inference, etc.). The libraries 1615 include, e.g., PyTorch libraries that define a set of functions for use within the source code 1610.

The source compiler 1605, in some embodiments, is a top-level compiler that transforms the source code and libraries. In some embodiments, the source compiler 1605 is a compiler specific to the language in which the source code 1610 is written (e.g., a Python compiler, C++ compiler, etc.). As shown, the top-level compiler 1605 transforms the source code 1610 into (1) source code 1620, (2) a first set of intermediate representations 1625, and (3) a second set of intermediate representations 1630 for vector and matrix operations. In some embodiments, the source code 1620 output by the source compiler 1605 is a subset of the initial source code that does not need to be transformed by the first level of compilation. In some embodiments, the source compiler 1605 integrates called library functions into the source code 1605 to generate at least part of the output source code 1620.

The intermediate representations 1630 for the vector and matrix operations, in some embodiments, are specific types of intermediate representations generated by the source compiler 1605 when the source compiler detects certain types of vector and matrix (or higher-dimensional tensor) operations. These operations can include tensor addition, various types of tensor multiplication (e.g., dot products, matrix multiplication), operations applied to all elements of a tensor (e.g., the application of an activation function to all of the elements of a vector or matrix in a neural network), etc. In some embodiments, the intermediate representations 1630 are the AFFINE and TOSA MLIR dialects. The source compiler 1605 performs its code translation in a manner that is agnostic to the underlying hardware such that these intermediate representations 1630 do not have any sizing limits. For instance, the input, intermediate, and output tensors may have any size rather than being restricted by the resources (e.g., the register sizes) of the accelerator cores.

The first set of intermediate representations 1625, in some embodiments, includes representations for various operations that the source compiler 1605 translates to a representation between the source code and machine code. In some embodiments, these intermediate representations 1625 include references to parallelized function calls. In some embodiments, the user-defined source code 1610 does not itself specify parallelized function calls (as the user does not need to be aware of the parallelization performed by the underlying hardware). However, the source compiler 1605 is capable of analyzing the source code to identify code segments that should be transformed into parallelized function calls. For instance, certain types of loops (e.g., for loops) that apply a function or set of functions to different inputs (e.g., different indices of an array) each time through the loop may be identified for transformation into parallelized function calls. In some embodiments, the source compiler 1605 determines, for such loops, whether subsequent iterations of the loop rely on earlier iterations of the loop, and only transform these loops into parallelized function calls if this reliance is not present. Thus, a loop for performing vector addition that adds the values at each index of two different vectors and outputs a third vector could be parallelized, but a loop that adds each value of a vector at each subsequent index to a total could not be parallelized (or, at the very least, could not be easily parallelized by generating a work item for each index). Furthermore, the intermediate representations 1625 of some embodiments include references to the second set of intermediate representations 1630 so that the intermediate compiler 1635 can account for these operations when generating the top-level code 1640.

In addition, in some embodiments, the source compiler 1605 identifies the blocks of code that should be embedded as a separate binary for distribution to the leader core (and thus also the sections that remain for execution on the host). In some embodiments, the majority of the code gets embedded into blocks for distribution to the leader core (i.e., for acceleration), with only certain types of operations to be executed by the host (e.g., certain flow control operations, interactions with peripheral devices, etc.). In some embodiments, any sections of the code that include tensor operations and/or parallelized function calls are assigned to be launched to the host. The source compiler 1605 generates each of these sections as a separate binary in some embodiments and inserts launch/enqueue instructions in the primary program to be executed by the host.

The intermediate compiler 1635, in some embodiments, generates the machine code to be executed by the host (not shown in this figure) and/or leader core 1645. The top-level code 1640 output by the intermediate compiler 1635 and executed by the host and/or leader core 1645, in some embodiments, includes this machine code as well as the intermediate representations for the tensor and vector operations (which, for certain applications may form a large portion of the overall code to be executed by the accelerator cores). In some embodiments, the intermediate compiler 1635 is an LLVM compiler that takes in a combination of Python code and MLIR intermediate representations (e.g., of the LLVM dialect).

As described previously, in some embodiments the host OS performs a first level of execution (of a primary program) but hands off sub-programs (often the majority of the application) to the leader core of an accelerator core arrangement. As shown in this figure, the leader core receives an executable set of commands 1650 that includes scalar commands (e.g., machine code such as RISC-V instructions) in addition to certain parallelizable commands (e.g., intermediate representations). In some embodiments, this executable 1650 is an output of the intermediate compiler 1635. As shown, the executable 1650 includes scalar commands, a parallelizable command (e.g., a hardware-agnostic tensor operation, which may be represented as an intermediate representation), and a parallel function call.

The leader core 1645 executes the individual scalar commands (e.g., on a RISC-V scalar core), but the parallelizable command and the parallel function call are provided to the runtime scheduler 1655 that runs on the leader core 1645. The parallelizable command is sliced by the slicer 1660 in a manner based on the underlying hardware (e.g., the number of worker cores and expected individual capacity of those worker cores), as described in detail above. In some embodiments, these slices 1665 are provided to another intermediate compiler 1670.

This intermediate compiler 1670, in some embodiments, generates command bundles to be distributed to the worker cores 1680. In some embodiments, the slices 1665 are still in an intermediate representation format (e.g., TOSA format, though now tied to the worker core hardware) and the intermediate compiler 1670 (e.g., an LLVM compiler) translates these operations into machine code (e.g., RISC-V extensions). In other embodiments, the physical command set executed by the scalar sub-core of the worker cores is defined to include these physical commands that have not yet been translated to machine code, such that no additional translation by the intermediate compiler 1670 is necessary. In this latter case, the intermediate compiler 1670 only performs the command bundle generation.

The parallel function calls in the executable 1650 do not require any slicing, as the call itself defines how to generate the command bundles. Instead, the intermediate compiler 1670, in some embodiments, generates these command bundles. In addition, in some embodiments, the intermediate compiler 1670 compiles the function defined within the command bundles (i.e., the function being parallelized) into machine code and/or physical commands (which may include tensor operations in some cases), e.g., using a function library stored at the leader core 1645. Furthermore, in some embodiments, the scalar commands (in addition to the tensor and parallelized function call instructions) require translation from virtual commands to physical commands (e.g., to account for the register size available to the scalar sub-core of the worker cores).

These compiled command bundles 1675 are enqueued and provided to the worker cores 1680 of the accelerator, as described in detail above. The worker cores 1680 execute the command bundles 1675 as sets of commands. In some embodiments, these sets of commands include scalar (e.g., RISC-V) hardware instructions as well as matrix and/or vector (or higher-dimensional tensor) commands (which may not yet have been translated to hardware instructions. As described in further detail in the concurrently filed U.S. patent application Ser. No. 18/916,649, entitled "Heterogeneous Cores", which is incorporated by reference above, in some embodiments a scalar sub-core executes the scalar hardware instructions and (asynchronously) hands off the matrix and vector commands to respective matrix and vector sub-cores. In some embodiments, the vector sub-core includes a vector control unit 1685 and vector ALU 1687, while the matrix sub-core includes a matrix control unit 1690 and matrix ALU 1692. In some embodiments, if necessary, the vector control unit 1685 and/or matrix control unit 1690 can further partition the vector and/or matrix commands (e.g., if an operation within a parallelized function call was not partitioned as needed at the leader core) to generate hardware instructions executable by the vector and/or matrix ALUs 1687 and 1692.

In some embodiments, the physical command set (e.g., pISA) for the command executed by the worker core 1680 can include a standard RISC-V 64-bit (RV64) ISA (or 32-bit (RV32) ISA), a set of specially designed RISC-V extensions (e.g., vector and/or matrix extensions), a specific command for parallelizable function calls (as described below, these parallelizable function calls may be recursive), and certain tensor-specific library fragments. The RV64 ISA and RISC-V extensions execute on the worker cores as the native instructions for execution in some embodiments. However, certain cores (e.g., if the system is hardware-agnostic and allows for non-RISC-V hardware (e.g., GPUs) to execute the command bundles) may not natively support the entire RV64 ISA and RISC-V extensions, so in such cases the hardware throws a trap command for software to implement the command before returning execution to the next command. This approach enables (1) the compilers to not need to take the actual underlying hardware into account when generating the machine instructions and (2) each worker core to execute the code irrespective of whether the code is fully supported or not by the hardware of that core.

For parallelizable function calls, in some embodiments, the ISA includes a specific call instruction that parallelizes the function within the launch domain. Lastly, the tensor-specific library fragments are optimized code segments that are written optimally with the parallelizable function calls in mind. In some embodiments, the tensor call library is exposed to the compiler, which uses the library fragments to implement the rest of the code segments. In some embodiments, the tensor-specific library fragments provide the following guarantees:

- the library fragments read from registers and return the results in registers, enabling them to be inlined in any function call
- the library fragments guarantee the number, ID, and type of registers they use, allowing the caller to properly save and restore register state
- the library fragments do not allocate memory, allowing them to be used in performance critical loops
- the library fragments do not access memory, which requires the caller to properly setup the registers but guarantees that code can be used anywhere
- the library fragments do not execute synchronization, which allows the code to be pushed into a library but requires synchronization at the higher level algorithm The following provides additional detail regarding the specification of command bundles in some embodiments. In some embodiments, a command bundle may be defined as a child instruction set (e.g., child thread), of either a root instruction set (i.e., the instruction set executed by the leader core) or another work-item, that specifies a sequence of instructions for execution on a worker core and returns control back to the parent instruction set when it encounters either a fatal exception or an end of sequence instruction (i.e., often a return instruction).

Some embodiments require that a command bundle be well-formed. For a command bundle to be considered well-formed, some embodiments require that a set of constraints be met. The following provides an example set of constraints for command bundles according to some embodiments:

- executes a finite number of instructions
- does not assume an execution order between itself and other command bundles
- uses explicit synchronization, or atomics, when reading memory of data written by another command bundle
- explicitly returns execution control to its parent instruction set
- uses mechanisms provided by the architecture to determine its coordinates in the multi-dimensional execution domain (e.g., a global ID, a multi-dimensional value, or both)
- does not read from a register before writing to that register
- does not cause any fatal exception to occur
- does not modify the parallelized function call stack (this stack is different than the function call stack)
- does not throw an exception In some embodiments, if any of these constraints is not met by a command bundle, then the command bundle is considered ill-formed and the command bundle generator executing on the leader core will not generate the command bundle. Such an ill-formed command bundle has undefined behavior and the results of such a command bundle are not guaranteed by hardware or software in some embodiments. When an ill-formed command bundle is detected, in some embodiments the leader core managing the execution of the program considers the state of the program invalid, interrupts execution, and returns control back to the host OS.

An ill-formed command bundle ends its execution at the point where the ill-formed state is triggered (i.e., when one of the constraints is violated). As noted, examples of ill-formed state occur when a fatal exception is thrown or when a recursive set of parallelized instructions (described below) hits a depth limit (this depth limit may be set in order to avoid exponential explosion of command bundles in the queue). When an exception is thrown, the command bundle reports the exception to the parent process. In order to properly handle the loop semantics, only the exception with the lowest command bundle identifier from a given parallelized instruction set (e.g., a parallelized function call) is propagated back to the parent process in some embodiments. This ensures that the behavior of exceptions for parallelized calls operates similarly to an exception thrown by a for loop. When such an exception is thrown, all command bundles with a larger identifier need to signal to stop their execution, while command bundles with lower identifiers continue working until a threshold is hit or they hit their own exception.

The above definition of a command bundle specifies that, in some embodiments, the command bundle is a thread. In the context of a parallelizable set of commands, a thread may be a software thread or a hardware thread in some embodiments, with the primary difference between the two being where the state is managed. Because the individual worker cores that the parallelized command targets are not visible to the software stack, the command bundle in the context of a such a parallelized command is a lightweight hardware thread in some embodiments. In some embodiments, the hardware thread tracks the following information in the command bundle context:

- a stack register that holds the address of where the command bundle's stack exists.
- an instruction register that holds the address of the first instruction for the command bundle to execute

Figure 17:
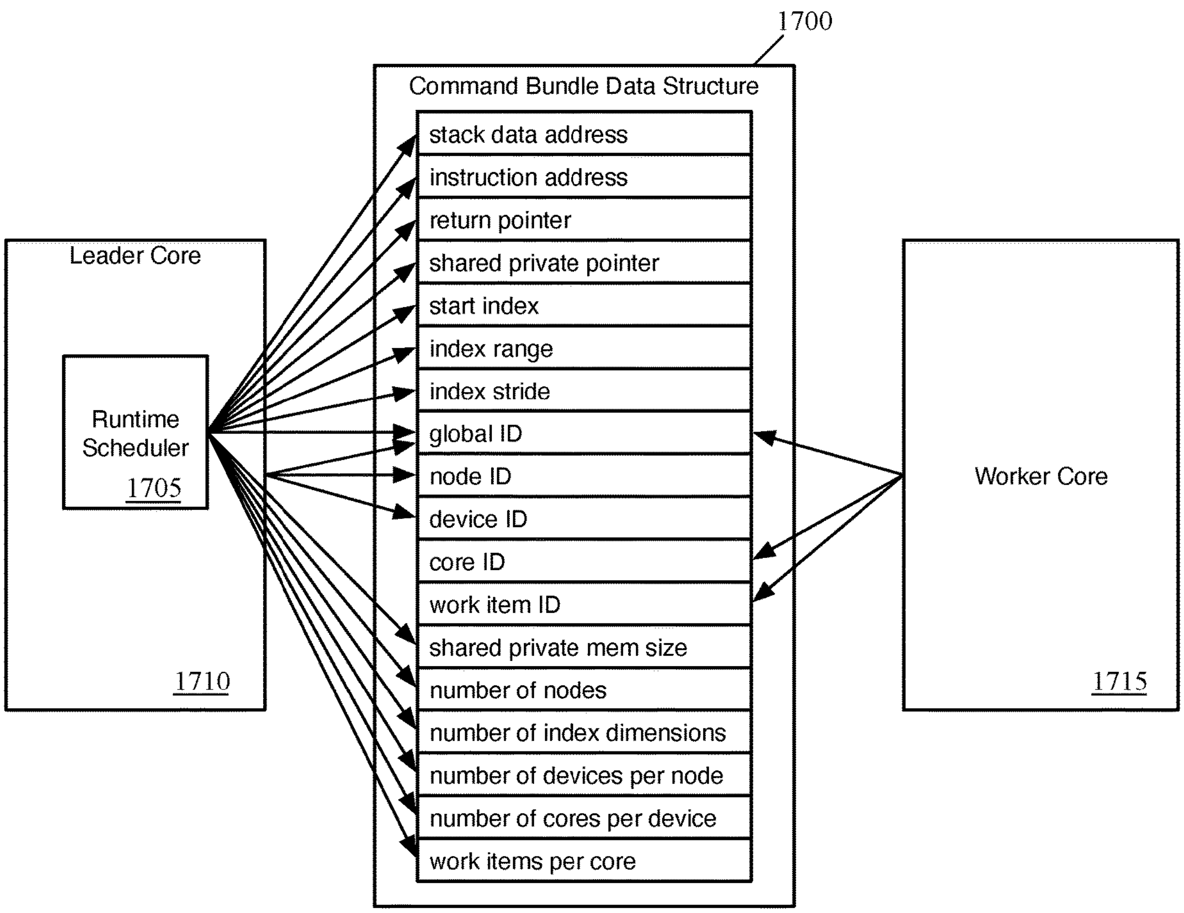
FIG. 17 conceptually illustrates a data structure for a work item according to some embodiments.

- a return register that holds the address of the instruction to which the command bundle will return after completion
- the hardware state to uniquely identify the command bundle in the execution space of the parallelized function call
- the hardware state required to determine the location in the software/hardware hierarchy of the command bundle FIG. 17 conceptually illustrates a data structure 1700 for a command bundle (also referred to as a work item) according to some embodiments. As shown, the data structure includes the following fields:

- stack data address: address from which to get stack data
- instruction address: instruction address of code to execute
- return pointer: address to which the command bundle returns execution after completion
- shared private pointer: address at which private memory that is shared between command bundles for a parallelized function call exists
- start index (per dimension): the starting location for the current command bundle
- index range (per dimension): the size of the dimension of the execution domain
- index stride (per dimension): stride between command bundle indices
- global ID: ID of the command bundle in the execution space
- node ID: ID of the node (e.g., group of core arrays) on which the command bundle is executed
- device ID: ID of the device (e.g., core array) on which the command bundle is executed
- core ID: ID of the core within the device
- work item ID: ID of the command bundle within the core
- shared private memory size: size of the private memory shared per parallelized function call
- number of execution nodes (e.g., groups of core arrays)
- number of index dimensions in execution domain
- number of devices per node (e.g., number of core arrays per group or, if variable, then number of core arrays in the group to which the work item is assigned)
- number of cores per device (may be inclusive of leader core)
- work items per core: number of command bundles that may be assigned to a core As shown, runtime scheduler 1705 executing on the leader core 1710 (which generates the command bundle data structure 1700) also fills in many of the fields of the data structure 1700. Some of the information (e.g., the number of nodes, number of devices per node, number of cores per device, etc.) is hard coded into the layout of the accelerator system, queried at boot time, and/or set at runtime via configuration. Other information (e.g., the stack data address and other information set by the runtime scheduler 1705) is dependent on the parallelizable instruction that generates the work item. Much of the information is global to the parallelizable function call launch (i.e., is not specific to any command bundle) and is thus generated by the runtime scheduler. The leader core hardware 1710 fills in the node and device IDs, in some embodiments, while the specific worker core ID and work item ID depends on where the command bundle executes and thus is generated by the worker core 1715 at execution time in some embodiments. The global ID, in some embodiments, is initially filled in by the runtime scheduler 1705 but also updated by the leader core 1710 and the worker core 1715. This data structure 1700 enables these entities 1705-1715 to pass the necessary arguments to the command bundles. It should also be noted that different embodiments may use variations on this data structure for command bundles, which may include a subset of the fields shown in the figure and/or additional data fields.

In some embodiments, for accelerator systems in which the core (at least the scalar sub-core) is a processor following a particular command set (e.g., RISC-V), the calling convention (i.e., how functions receive parameters from their caller and how they return a result) for a parallelizable function call is defined by that command set (e.g. by the RISC-V ISA). The calling convention for a parallelizable function call may differ in that there is not an efficient method for the root thread to write to multiple SIMD processor's register files in some embodiments. The calling convention is software-defined and is managed in software outside of the instruction pointer, stack pointer, and return pointer in some embodiments.

Within the call stack (i.e., for the execution of the process to which the parallelized command belongs), the parallelized command is the same as a standard call in some embodiments. However, due to the parallel nature of the call, rather than showing a normal function, the call stack shows the range of functions that can be stepped into. The following provides an example showing the call stack for a program with a standard function as compared to the call stack for a program with a parallelizable function call.

```
1 #include <iostream>
2 void function5( ) {
3 std::cout<< "Inside function5"<<std::endl;
4}
5 void function4( ){
6 function5 ( );
7}
8 void function3( ) {
9 function4( );
10}
11 void function2( ) {
12 function3( );
13}
14 void function1( ) {
15 function2( );
16}
17 int main( ) {
18 function1( );
19 return 0;
20}
```

The above simple program gives the following call stack when breaking on line 3.

```
1 #0 function5 ( ) at test.cpp:3
2 #1 0x0000555555555217 in function4 ( ) at test.cpp:6
3 #2 0x0000555555555252 in function3 ( ) at test.cpp:9
4 #3 0x000055555555528d in function2 ( ) at test.cpp:12
5 #4 0x00005555555552c8 in function1 ( ) at test.cpp:15
6 #5 0x0000555555555303 in main ( ) at test.cpp:18
```

However, if the call of function5 (i.e., within function4) is a parallelizable call, then the call stack will have a parallelizable function call entry ("OCALL") included in some embodiments. This is handled recursively in some embodiments, as follows:

```
1 #0 OCALL<void (*) ( )> (func-0x5555555551a9<function5( )>, count=10, start=0, stride=1) at test.cpp:5
2 #1 0x0000555555555205 in function4 ( ) at test.cpp:12
3 #2 0x0000555555555215 in function3 ( ) at test.cpp:15
4 #3 0x0000555555555225 in function2 ( ) at test.cpp:18
5 #4 0x0000555555555235 in function1 ( ) at test.cpp:21
6 #5 0x0000555555555245 in main ( ) at test.cpp:24
```

Problems can be created when the breakpoint is within an instance of the parallelizable call in some embodiments, as shown in the following:

1 #0 function5 ( ) at test.cpp:9
2 #1 0x5555555552e2 in OCALL<void (*) ( )> (func=0x5555555551a9 <function5( ), arg1=10, arg2=0, arg3=1) at test.cpp:6
3 #2 0x0000555555555205 in function4 ( ) at test.cpp:12
4 #3 0x0000555555555215 in function3( ) at test.cpp:15
5 #4 0x0000555555555225 in function2 ( ) at test.cpp:18
6 #5 0x0000555555555235 in function1 ( ) at test.cpp:21
7 #6 0x0000555555555245 in main ( ) at test.cpp:24

Because multiple versions of function5 may be executed, this information should be included in the call stack in some embodiments. In some embodiments, the information already exists in the work item data structure and thus can be emitted in the stack information. The function can be prefixed with the global ID, given the ability to differentiate between the different instances of the call stack. In this case, the signature for function5 on work item 42 would be function5[ID=42] ( ) at test.cpp:9. This approach can handle recursive parallelizable instructions as the data structure for each parallelizable call is stored in memory and can be read back by the worker core. In some embodiments, the information is encoded in the call stack of the parallelizable instruction as it passes exceptions, debug, or profiling information to the leader core process.

Rather than specifying each of potentially a very large number of command bundles individually in the call stack, some embodiments collectively specify the command bundles in the call stack using a single line. For instance, in the case where all command bundles (i.e., a continuous range of indices) trigger, the ID can specify the range rather than an individual index. An example of such a call stack entry is function5[ID-0-99]( ) at test.cpp:9. This states that there are 100 different ID's that triggered this backtrace from 0 to 99. If the indices of the command bundles are not contiguous but are instead strided, the representation requires more information in order to convey all of the indices. Some embodiments handle this by appending a: <stride>. For instance, to represent 50 items with a stride of 3, some embodiments use the representation function5[ID-0-146:3]( ) at test.cpp:9, which indicates that the indices triggered at this backtrace run from ID's 0 to 146 but with only a (multiple of 3)-1 being valid ID's. In the case where only some command bundles (but not a consistent range or strided range) trigger the backtrace, some embodiments specify multiple sequences separated by a comma or other character. In some embodiments, within the call stack, some of the information is hidden due to length, with only the first and last sequences actually specified and a number be used to represent the number of hidden sequences. As an example, the representation function5[ID-0-4:1, . . . 7,90-94:2]( ) at test.cpp:9 specifies that there are 9 sequences that trigger the breakpoint, with the first sequence having 5 command bundles (indices 0-4), the final sequence having 3 command bundles (indices 90-94 strided by 2), and 7 intermediate sequences hidden.

The above discussion mentioned recursive parallelized commands, in which a command bundle executed by a worker core generates additional command bundles that are added to the command bundle queue. In some embodiments, the worker cores do not execute all of the same software as the leader core (or do not have that software turned off), and do not have the capability to further divide a vector or tensor command into multiple command bundles for execution by different worker cores. However, the worker cores are able to generate command bundles for explicitly parallelizable function calls (i.e., calls that specify the number of command bundles to generate and provide the starting index and stride information).

Figure 18:
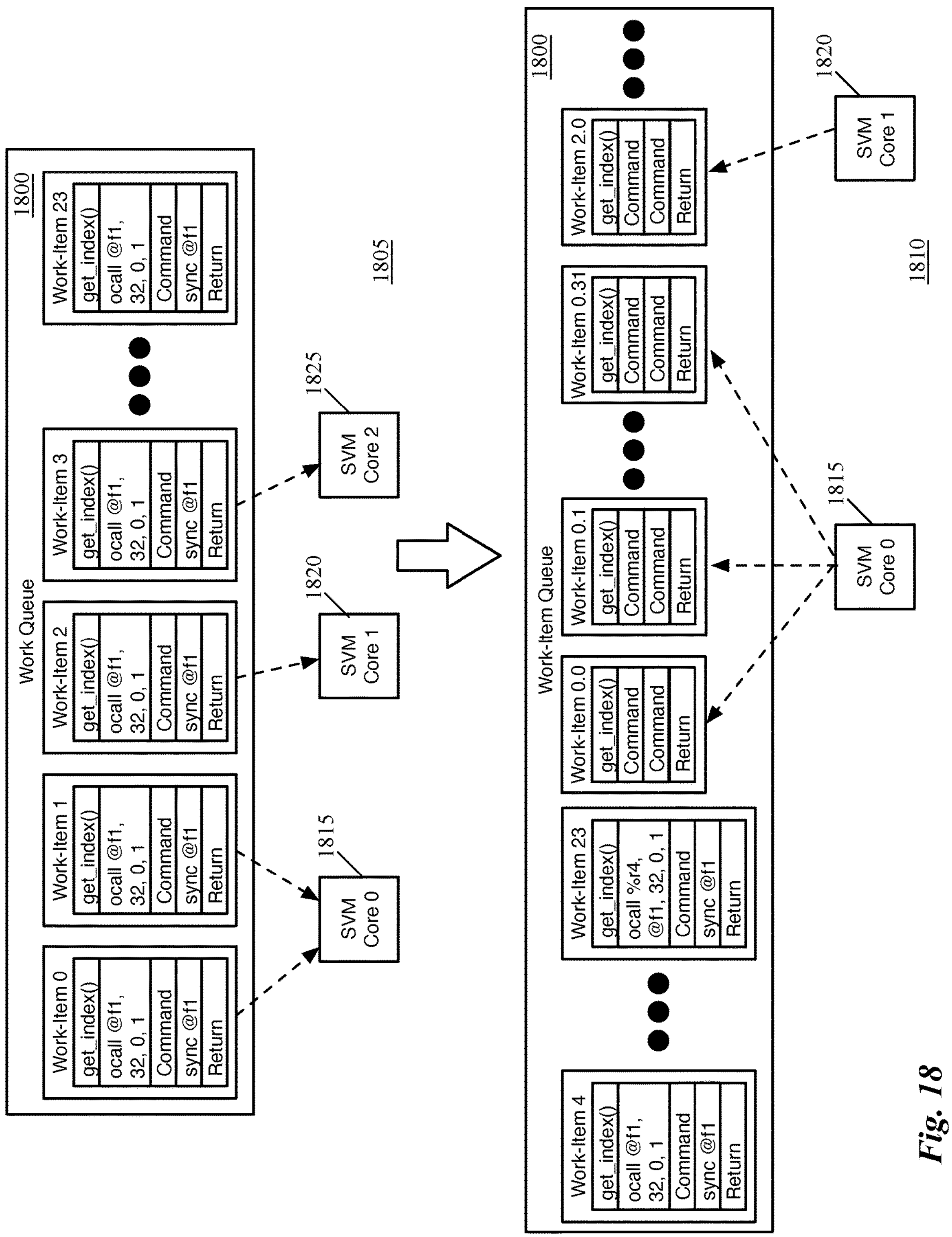
FIG. 18 conceptually illustrates a work item queue over two stages.

FIG. 18 conceptually illustrates a work queue 1800 over two stages 1805 and 1810. The first stage 1805 illustrates the work queue 1800 after the leader core has generated 24 command bundles for a root parallelizable call (i.e., a parallelizable function call specified in the leader core instruction set) and added these command bundles to the queue 1800. As shown, each of these command bundles includes a parallelizable function call, an additional instruction, and a sync point for the parallelizable call.

At the first stage 1805, three worker cores 1815-1825 retrieve command bundles from the queue 1800. The first worker core 1815 retrieves command bundles 0 and 1, while the second and third worker cores 1820 and 1825 each retrieve a single command bundle (command bundles 2 and 3). This first worker core 1815 might have more current processing capacity than the other worker cores 1820 and 1825 (e.g., because the other worker cores are currently processing other command bundles) and thus retrieves multiple command bundles from the queue 1800.

These worker cores 1815-1825 begin executing their command bundles, which as noted include parallelizable function calls. As such, once a worker core begins executing its command bundle, the worker core generates and adds 32 command bundles to the queue 1800. As shown in the second stage 1810, the first worker core 1815 adds command bundles 0.0-0.31 to the work queue 1800, while the second worker core 1820 adds command bundles 2.0-2.31 to the work queue 1800. If the third worker core 1825 also begins executing its command bundle 3, then the 32 new command bundles spawned by that command bundle will also be added to the queue.

In some embodiments, the second-level command bundles (i.e., the groups of 32 command bundles in this example) are added to the work queue 1800 after the last first-level command bundle (i.e., the 24 command bundles generated by the root parallelizable call). As such, the worker cores only begin executing these second-level command bundles once all of the first-level command bundles have been retrieved from the queue. It should be noted that, while this example shows only three worker cores (e.g., in a 2×2 array that includes a leader core), a typical accelerator core arrangement will include significantly more than four total cores. In some embodiments, when a worker core hits a sync point for a recursive parallelized function call within a command bundle, the worker core pauses execution of that command bundle until all of the command bundles spawned by the parallelized call are complete and retrieves the next command bundle (or group of command bundles) from the work queue. In some embodiments, the command bundles spawned by a recursive parallelized call are affinitized to the worker core on which the parent command bundle is executed or nearby worker cores in order to minimize the transfer of data between distant cores (and especially between core arrays if multiple core arrays are in use).

As noted, in some embodiments the worker cores are only capable of generating command bundles for explicitly parallelizable function calls, and do not perform slicing of tensor or vector commands into command bundles. For top-level commands, the leader core will ideally have sliced these tensor instructions to fit the hardware of the worker cores, so no more segmentation is needed. However, as described further in the concurrently filed U.S. patent application Ser. No. 18/916,649, entitled "Heterogeneous Cores", which is incorporated by reference above, in some embodiments the control units for the vector and matrix sub-cores are capable of further segmenting the vector and matrix commands as needed. For instance, if a vector or matrix command is found within a parallelized function, then in some embodiments this command will not be separately sliced by the command slicer at the leader core. In this case, the command may need segmentation at the worker core in order to fit the sub-core hardware.

The recursive parallelizable function calls within a command bundle are only one type of function call allowed within a command bundle. Non-parallelizable functions within a command bundle can be considered a special case of a parallelizable call but with an element size of 1, immediately followed by a sync from the resulting event. In some embodiments, the program state transfers to the embedded function call command sequence, executes that command sequence, and then returns control to the command bundle. In some embodiments, however, command bundles are not added to the queue for these non-parallelized function calls, which are simply executed at the same core as the command bundle from which they are called.

In addition, some of the function calls within a command bundle require interaction with the host OS (e.g., because the function calls require output to a peripheral device, user input, etc.). However, the leader core is the only path for the worker cores to interact with the host. Some embodiments provide a technique for enabling the worker cores to execute these function calls in conjunction with the leader core.

Figure 19:
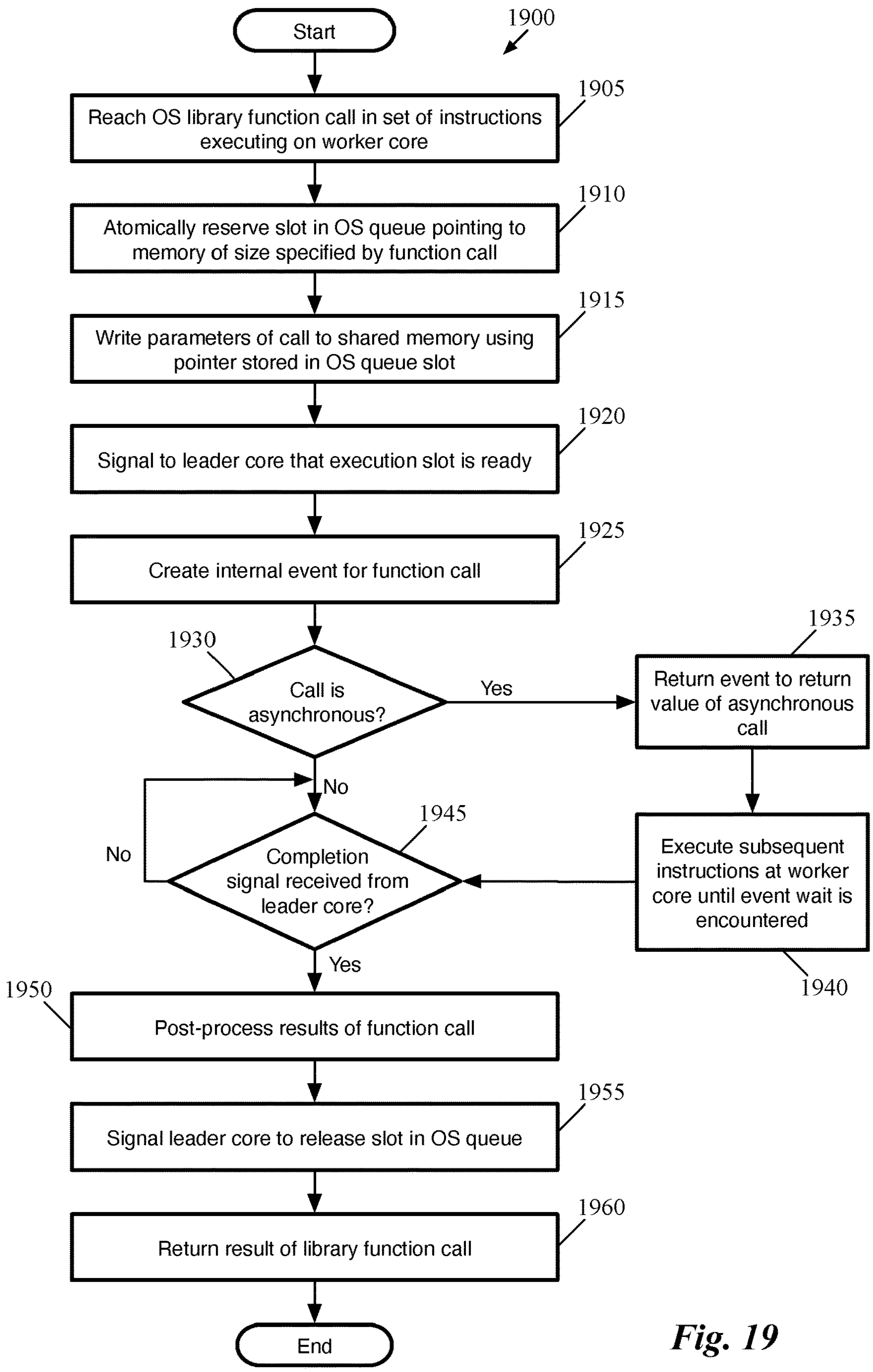
FIG. 19 conceptually illustrates a process of some embodiments for executing an OS function call at a worker core.

FIG. 19 conceptually illustrates a process 1900 of some embodiments for executing an OS function call at a worker core. In some embodiments, these are function calls found within a work item, and may be parallelizable or not. The process 1900 assumes a non-parallelized function call, but it should be understood that this process can be generalized to a parallelized call, in which case the operations are performed for each instance of the call (e.g., each recursively generated command bundle). The process 1900 will be described in part by reference to FIGS. 20 and 21, which illustrate example operations of the worker and leader cores to execute these functions.

Figure 20:
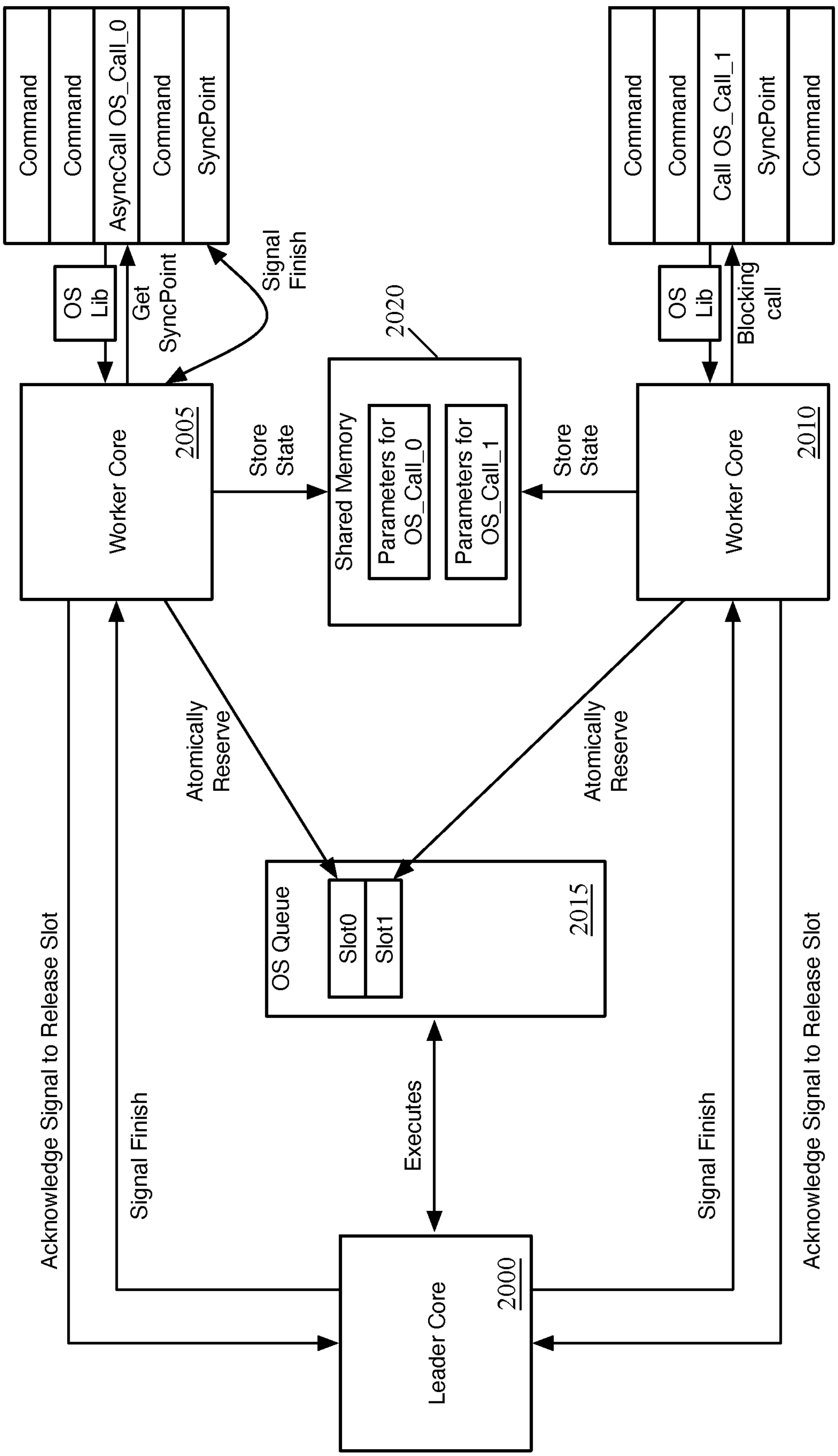
FIG. 20 conceptually illustrates examples of the operation of both asynchronous and synchronous function calls during execution on worker cores according to some embodiments.

As shown, the process 1900 begins by reaching (at 1905) an OS library function call in the set of commands (e.g., a command bundle) executing on a worker core. In some embodiments, there is an OS library available on each worker core in order to handle such function calls. When executing a command bundle on the worker cores, function calls in general (including OS library calls) may be asynchronous or synchronous in some embodiments. FIG. 20 conceptually illustrates examples of the operation of both asynchronous and synchronous function calls during execution on worker cores 2005 and 2010 according to some embodiments.

Specifically, FIG. 20 conceptually illustrates the interactions between a leader core 2000 and two worker cores 2005 and 2010. The first worker core 2005 executes an asynchronous OS library function call while the second worker core 2010 executes a synchronous OS library function call. Each of the worker cores 2005 and 2010 stores the OS library in case the call goes to this library. As shown in the figure, the first worker core 2005 executes multiple commands (e.g., scalar, vector, and/or matrix commands) in its command bundle before arriving at an asynchronous call of the function OS_Call_0. The second worker core 2010 executes multiple commands (e.g., scalar, vector, and/or matrix commands) in its own command bundle before arriving at a synchronous call of the function OS_Call_1.

Upon reaching the OS library call, the process 1900 atomically reserves (at 1910) a slot in an OS queue that points to memory of a specified size (e.g., a size specified by the function call). As shown in FIG. 20, the first worker core 2005 reserves slot0 in an OS queue 2015 while the worker core 2010 reserves slot1 in the OS queue 2015, both pointing to locations in a memory 2020. The OS queue 2015, in some embodiments, is a queue of functions to be executed by the leader core 2000.

Next, using the pointer stored in the OS queue slot, the process 1900 writes (at 1915) parameters of the function call to shared memory. In the example, both of the worker cores 2005 and 2010 write their respective function call parameters to the memory 2020 (i.e., to the locations pointed to by the respective OS queue slots). This shared memory 2020, in some embodiments, is locations in a global memory that is shared between the cores. The use of global and local memories within a set of cores is described further below.

With the information needed by the leader core to execute the function now set up, the process 1900 signals (at 1920) to the leader core that the execution slot is ready so that the leader core can execute the function. As shown in FIG. 20, the worker cores 2005 and 2010 signal to the leader core 2000 that their respective execution slots are ready. It should be noted that, while described with respect to this figure as occurring together, one worker core processing an asynchronous function call and another worker core processing a synchronous function call need not occur together (i.e., these operations could occur at two completely different times).

The process 1900 then creates (at 1925) an internal event for the function call. At this point, the execution process differs depending on whether the function call is synchronous or asynchronous. The process 1900 determines (at 1930) whether the function call is asynchronous. It should be understood that, in some embodiments, the worker core does not make such a specific determination, but rather proceeds in one manner for synchronous calls and another manner for asynchronous calls.

If the function call is asynchronous, the process 1900 returns (at 1935) an event to the return value of the asynchronous call. As shown in FIG. 20, the worker core 2005 inserts a sync point for the function call into the set of commands as specified by the asynchronous function call (in this case, after another command to be executed by the worker core). In addition, the process 1900 executes (at 1940) any subsequent commands as normal until the event wait is encountered. Thus, the worker core 2005 executes this subsequent command in its work item until arriving at the sync point. It should be noted that in some embodiments all of the function calls are asynchronous, but synchronous function calls can be effectively implemented by inserting the sync point immediately after the function call (i.e., prior to the execution of any subsequent commands in the command bundle).

Irrespective of whether the function call is synchronous or asynchronous (but if asynchronous, only after executing up to the sync point), the process 1900 determines (at 1945) whether a completion signal has been received from the leader core. That is, the worker core waits (possibly switching to execute other command bundles in the queue) for the receipt of such a completion signal from the leader core. Just as the worker cores signal to the leader core after completion of a command bundle, the leader core signals to the worker core that added a function call to the OS queue after completing the execution of that function so that the worker core can continue its execution of the command bundle after reaching the sync point.

Once this completion signal is received, the process 1900 post-processes (at 1950) the results of the function call, signals (at 1955) to the leader core to release the slot in the OS queue, and returns (at 1960) the result of the OS call. The process 1900 then ends. The worker core also can then continue any additional execution of the work item that spawned the OS call. In some embodiments, the leader core provides any data resulting from the function call to the worker core via the shared memory. In FIG. 20, both of the worker cores 2005 and 2010 receive completion signals from the leader core 2000 and thus each of these worker cores signal the leader core 2000 to release their respective slots in the OS queue 2015.

In some embodiments (e.g., for functions such as printf/scanf), the leader core needs to interact with the host OS in order to properly complete the execution of such an OS call.

Figure 21:
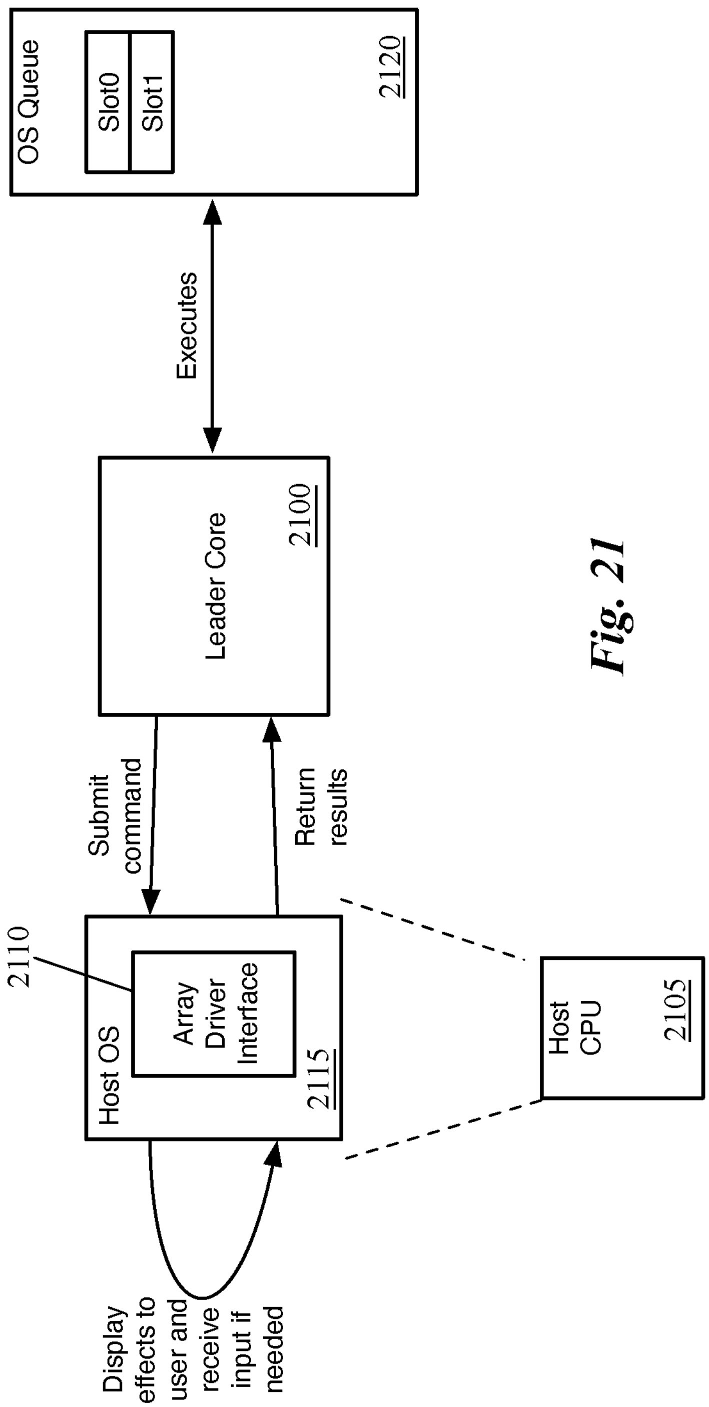
FIG. 21 conceptually illustrates a leader core interacting with a host to execute an OS call according to some embodiments.

FIG. 21 conceptually illustrates a leader core 2100 interacting with a host 2105 to execute such an OS call according to some embodiments. As shown, the leader core 2100 submits the results of the OS command to the array-driver interface 2110 at the host. Through interaction with the host OS 2115, the array-driver interface 2110 emits a required output to a user or retrieves a required input from the user (e.g., displaying data, printing, receiving user input, etc.). The result of this action is returned to the leader core 2100, which then updates the OS operation queue 2120. The host OS 2115 only interacts with the leader core 2100 via the array-driver interface 2110 in some embodiments and has no interaction with any of the worker cores.

In some embodiments, even when the scalar sub-core is a RISC-V (or other RISC ISA) core, the worker cores can nevertheless execute other proprietary code (e.g., CUDA code). For instance, in some embodiments, CUDA Code is executed from using a library call to C or C++ code on the worker core, such as the following:

CUDA_CALL(1024,1,1,ptx_code,arg0,arg1,arg2, . . . )

Different embodiments may execute this CUDA code (1) on the scalar sub-core, (2) on the scalar sub-core using its native vector commands (e.g., over multiple clock cycles), or (3) by dispatching instructions to the vector sub-core. The third option provides a benefit of faster execution for vector instructions by the vector sub-core, but requires additional scatter load/store operations.

The majority of the discussion above relates to the situation in which a single leader core governs a single array of cores or group of core arrays. However, the accelerator system is flexible in some embodiments, so that core arrays or groups thereof can be added and subtracted as needed. In some embodiments, one leader core provides work to all of the cores in the core arrangement, while in other embodiments there is one primary leader core that provides work items to the worker cores of its own core array (and possibly worker cores of other closely-linked core arrays) and also to other leader cores in other core arrays that provide the work items to their own worker cores.

Figure 22:
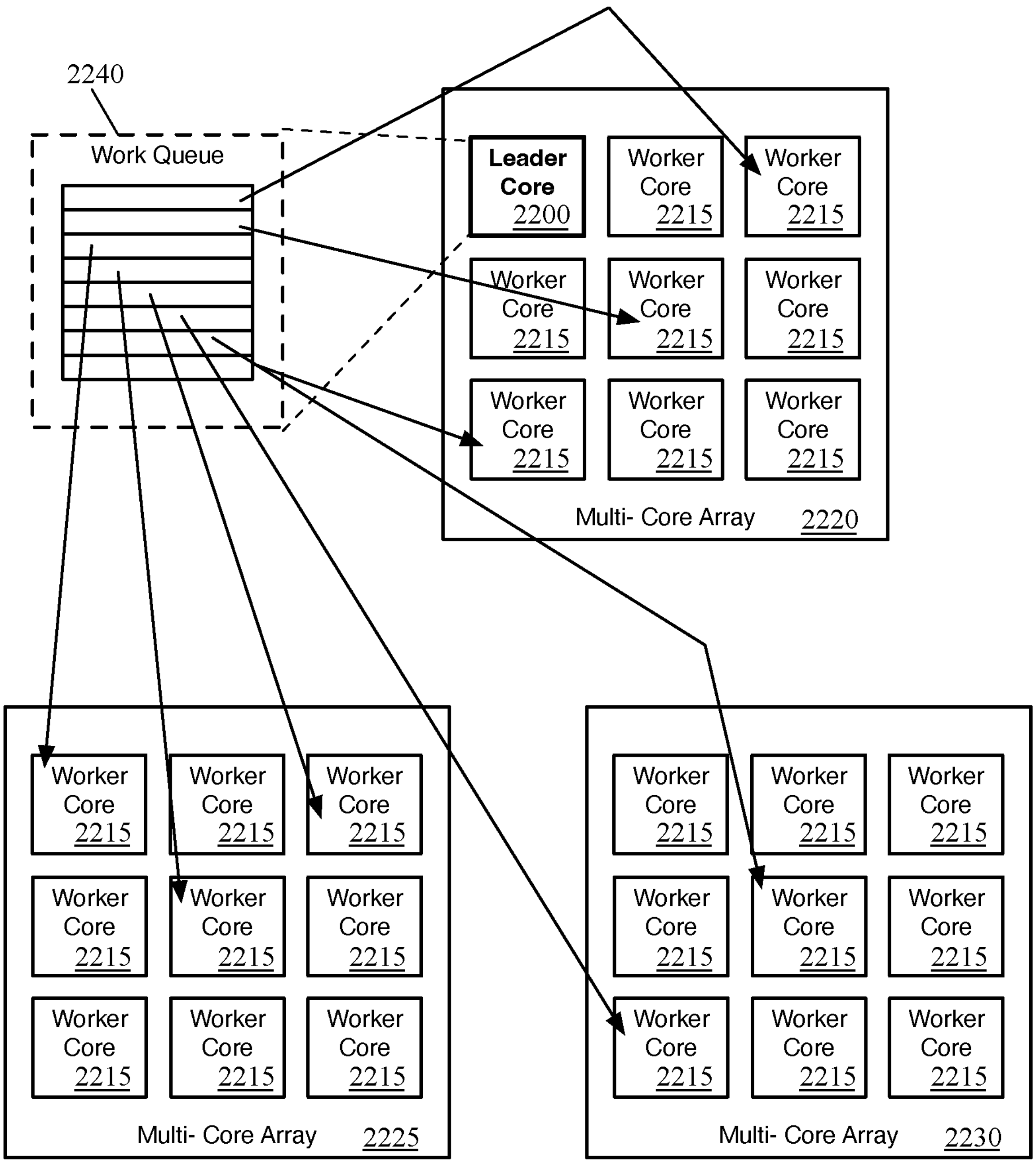
FIG. 22 conceptually illustrates a leader core of some embodiments that provides work items to worker cores in multiple multi-core arrays.

FIG. 22 conceptually illustrates a leader core 2200 of some embodiments that provides command bundles to worker cores in multiple multi-core arrays 2220, 2225, and 2230. As shown, the leader core 2200 is one of several cores in a first multi-core array 2220, which also includes a number of worker cores 2215. This multi-core array is part of an accelerator core arrangement along with two other multi-core arrays 2225 and 2230, each of which include their own respective set of worker cores 2215.

In this situation, the leader core 2200 communicates with the host (not shown) and executes the sets of instructions launched from the host to the accelerator. In addition, the leader core 2200 runs a runtime scheduler (e.g., with an instruction slicer, command bundle generator, and/or JIT compiler). The leader core 2200 generates command bundles for the worker cores 2215 to execute and places these command bundles in a queue 2240. In some embodiments, this work queue 2240 is stored in a unified memory that is shared between all of the cores 2210 and 2215 in the multiple core arrays 2220-2230. All of these worker cores 2215 (and, in some cases, the leader core 2210 as well) can retrieve command bundles from the queue 2240 and execute these command bundles, as shown in the figure.

Figure 23:
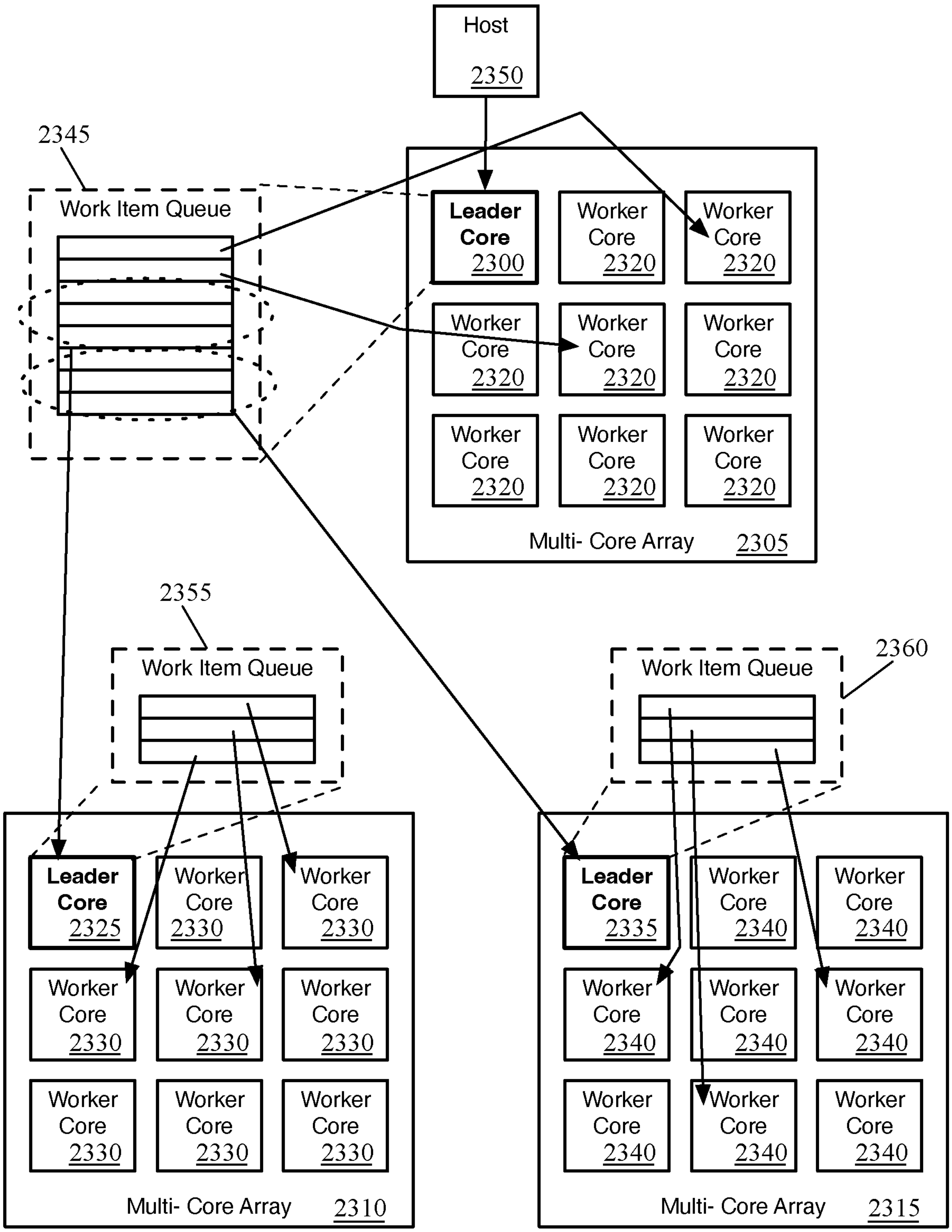
FIG. 23 conceptually illustrates a leader core of some embodiments (a primary leader core) that provides work items to worker cores in its own multi-core array and to secondary leader cores in other multi-core arrays.

FIG. 23, on the other hand, conceptually illustrates a leader core 2300 (a primary leader core) that provides command bundles to worker cores in its own multi-core array and to secondary leader cores in other multi-core arrays. As shown, the leader core 2300 is one of several cores in a first multi-core array 2305, which also includes a number of worker cores 2320. This multi-core array 2305 is part of an accelerator core arrangement along with two other multi-core arrays 2310 and 2315. The multi-core arrays 2310 and 2315 include respective secondary leader cores 2325 and 2335 and respective groups of worker cores 2330 and 2340.

In this arrangement, the primary leader core 2300 communicates with the host 2350 and executes the sets of instructions launched from the host to the accelerator. In addition, the leader core 2300 runs a runtime scheduler (e.g., with an instruction slicer, command bundle generator, and/or JIT compiler). The leader core 2300 generates command bundles for the worker cores 2320, 2330, and 2340 to execute and places these command bundles in a queue 2345.

However, unlike the previous example, only the worker cores 2320 are signaled to retrieve items from this queue, even if the queue is stored in unified memory shared between all of the cores in the core arrays 2305-2315. In this case, the worker cores 2320 of the first multi-core array 2305 retrieve command bundles from the primary queue 2345. In addition, the secondary leader cores 2325 and 2335 retrieve groups of command bundles from the primary queue 2345 for distribution to their respective worker cores 2330 and 2340.

This distribution may be entirely pull-based, as shown in this figure, in which the secondary leader cores 2325 and 2335 pull groups of command bundles and place these command bundles in their own respective queues 2355 and 2360 for their respective worker cores 2330 and 2340 to retrieve. In some embodiments, the work queues 2355 and 2360 are stored in memory (or cache) local to their respective core arrays. In other embodiments, the primary leader core 2300 assigns groups of command bundles to the respective secondary leader cores 2325 and 2335. Similarly, in either case, the secondary leader cores 2325 and 2335 distribute command bundles to their leader cores either via the work queues 2355 and 2360 or via a push-based assignment. In some such embodiments, the primary leader core 2300 assigns the command bundles proportionately based on the number and processing speed of the worker cores at each core array.

As the worker cores 2330 or 2340 complete their command bundles, these worker cores request additional command bundles from their respective leader cores 2325 or 2335 or pull additional items from their respective work queues 2355 or 2360. If the cores of one of the core arrays finish all of the command bundles from their respective work queue (or assigned by the primary leader core 2300), then the respective leader core 2325 or 2335 can request additional command bundles from the primary leader core in some embodiments, or retrieve additional items from the primary queue 2345. This pull model allows the secondary leader cores to power down, manage resources, and/or help execute the current workload (the leader core itself being capable of executing the command bundles), all while the worker cores are executing the bulk of the work.

In addition, this figure illustrates one leader core per multi-core array. Some embodiments group core arrays into nodes, with one leader core per node. The leader core, in some embodiments, has the same hardware structure as the leader cores but is designated to act as a leader core. In some embodiments, each leader core runs a runtime scheduler, even if the runtime schedulers in the secondary leader cores do not perform the compilation or re-compilation operations (e.g., instruction slicing, command bundle generation, code optimization) that the primary leader core performs.

In some embodiments, the runtime scheduler in each leader core is also responsible for detecting, registering, and building the hierarchy of all the other leader cores in the system (e.g., one leader core for each node). One of the nodes (e.g., the first device added to the system) is designated as the primary (root) node in some embodiments, with the other nodes designated as secondary (branch) nodes. The runtime scheduler for the root node organizes the branch nodes in a hierarchy that depends on the number of nodes in the system, in some embodiments.

When an accelerator system with a multi-core array boots up, the leader core (e.g., the runtime scheduler program on that leader core) of each node sends a signal across its connected port (e.g., via PCIe, a network, or some other mechanism), to inform the other nodes in the system of its presence. For instance, if the node connects via a network using ethernet, each runtime scheduler could send a broadcast on 192.168.255.255 with the network address of its node and a random port to which send registration information. When a corresponding node receives the broadcast, that runtime scheduler of that node responds to the first runtime scheduler with its node IP and all known nodes to the correct IP and port. The designated primary runtime scheduler takes the union of all sets sent to it to determine the list of nodes in the system and sends a registration confirmation signal to the runtime scheduler at each node in the list. If all nodes confirm that the registration has finished, then the runtime scheduler closes the port, and the detection phase is complete. If any runtime scheduler does not respond within a set period of time, then the node on which that runtime scheduler runs is considered invalid and is removed from the list of confirmed nodes. At this point, the invalid node address is broadcast so that other nodes can verify if the target node is down and remove the invalid node address from their own lists of valid nodes.

When a system has multiple multi-core nodes, in some embodiments at bootup the host OS assigns each such node an identifier. The node with the lowest identifier (or, e.g., the highest identifier) is designated as the primary node and all other nodes are designated as secondary nodes. In some embodiments, so long as the primary node is part of the system, only its leader core performs many of the tasks described herein (e.g., execution of binary code received from the host OS, slicing of commands, generation of command bundles, etc.). In some embodiments, groups of multi-core nodes each designate a primary node. In this case, different embodiments may use bootup order, IP address, name, or manual assignment via an API call to the runtime scheduler to identify a primary node for the system. Other methods could select the primary node for a group with the largest list of nodes.

As noted above, in some embodiments the accelerator core arrangement uses a unified memory system. While each core array has its own local memory and/or cache, the use of a unified memory system means that any core has the ability to access (i.e., read from and/or write to) all of the memory in the system. Some embodiments use a global memory address space to access this unified memory.

Figure 24:
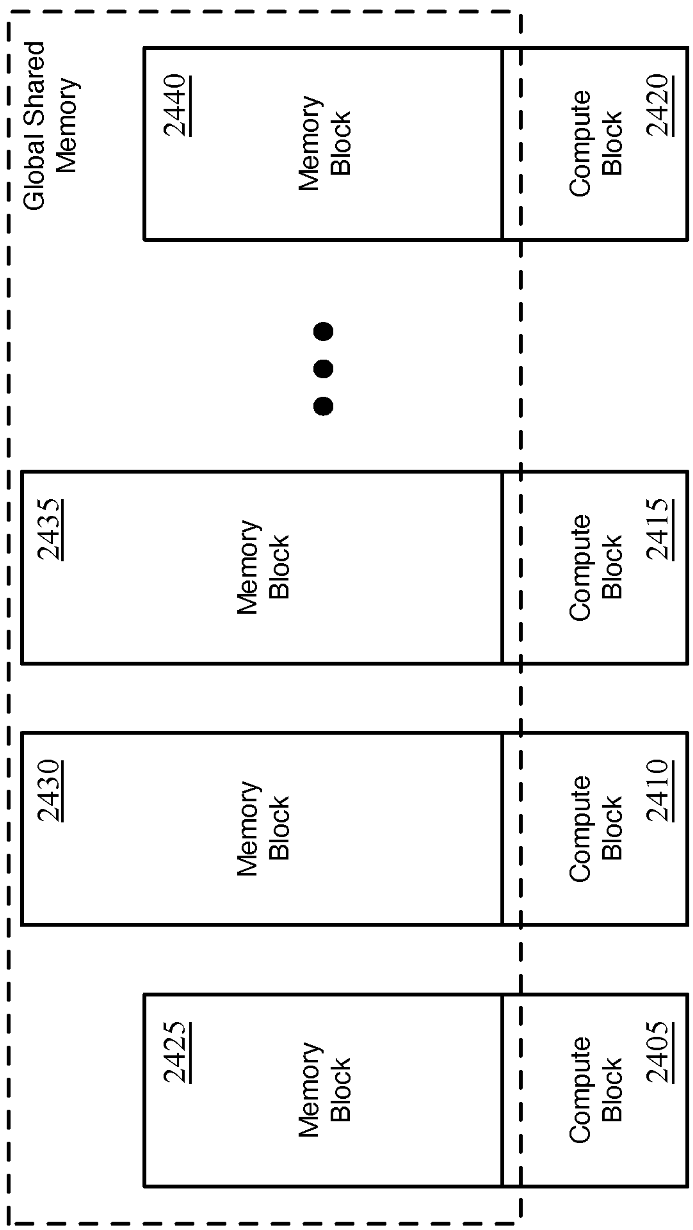
FIG. 24 conceptually illustrates the unified memory of a core arrangement of some embodiments.

FIG. 24 conceptually illustrates the unified memory of a core arrangement of some embodiments. As shown in this figure, each compute block 2405-2420 has a set of physically adjacent (physically local) memory blocks 2425-2440. In different embodiments, the compute blocks 2405-2420 may be individual cores, individual core arrays, or groups of core arrays (e.g., nodes of core arrays that share a single leader core).

The memory blocks 2425-2440 are physically adjacent to their respective compute blocks 2405-2420. These memory blocks 2425-2440 may be stacked (e.g., in a 3D arrangement) with their respective compute blocks 2405-2420 and/or placed next to their respective compute blocks 2405-2420 on the same chiplet or die (e.g., in a 2D or 2.5D arrangement). Furthermore, though not shown in this figure, depending on how the compute blocks 2405-2420 and memory blocks 2425-2440 are interspersed, some memory blocks may be physically adjacent to multiple different compute blocks.

The memory resources of an accelerator core arrangement (e.g., the memory blocks 2425-2440) are unified in some embodiments in the sense that any core in any of the compute blocks 2405-2420 can access (i.e., read from and/or write to) any of the memories in any of the memory blocks 2425-2440. For instance, not only can the cores of the first compute block 2405 access their locally adjacent memory block 2425, but they can also access any of the memories in any of the memory blocks 2430-2440. Thus, although scheduling compute operations in cores that are physically adjacent to the memory blocks storing the data needed for those operations may be optimal, any core in the accelerator system can perform any compute operations. As an example, the weights for a particular convolutional layer of a neural network may be stored in one memory block but be needed by cores of multiple different compute blocks that execute the convolutions using those weights.

In some embodiments, it should be noted, at least a subset of the memories in the accelerator system are only accessible to a subset of the cores rather than every core having access to every memory in the system. For instance, in some embodiments, a subset of the cores of a compute block may only have access to locally adjacent memory resources and/or a subset of memory resources are only accessible to cores of their locally adjacent compute blocks.

In some embodiments, the memory resources in the memory blocks 2425-2440 are accessible using a shared global memory addressing system. That is, in some embodiments the compute block 2405 uses the same memory address to access a particular memory location (e.g., a particular RAM work) within its adjacent memory block 2425 as do the other compute blocks 2410-2420.

However, some embodiments use a partitioned global address space (PGAS), in which at least a subset of each compute block's physically adjacent memory block is designated as local memory for the compute block. In some embodiments, the cores of a compute block and/or the processes executing on those cores therefore have an affinity for their local memory and have faster access to their local memory (e.g., due to the local proximity and/or differences in memory addressing). In some such embodiments, the memory addressing for each compute block's local memory is different than the global memory addressing (e.g., using fewer bits). In this case, for instance, a core in the first compute block 2405 may use a different local memory address to access a particular location in adjacent memory block 2425 than the global memory address used by the cores of the other compute blocks 2410-2420. Furthermore, in some embodiments, a subset of local memory may only be accessible to the physically adjacent compute block (i.e., this subset is not accessible as part of the global shared memory).

The use of a global memory system means that, as mentioned, different cores can access both local and remote memory blocks. In some embodiments, this concept applies from the sub-core level through the compute block (core array) level. Within a core, different sub-cores can access not only various local caches but also local and remote memory blocks.

Figure 25:
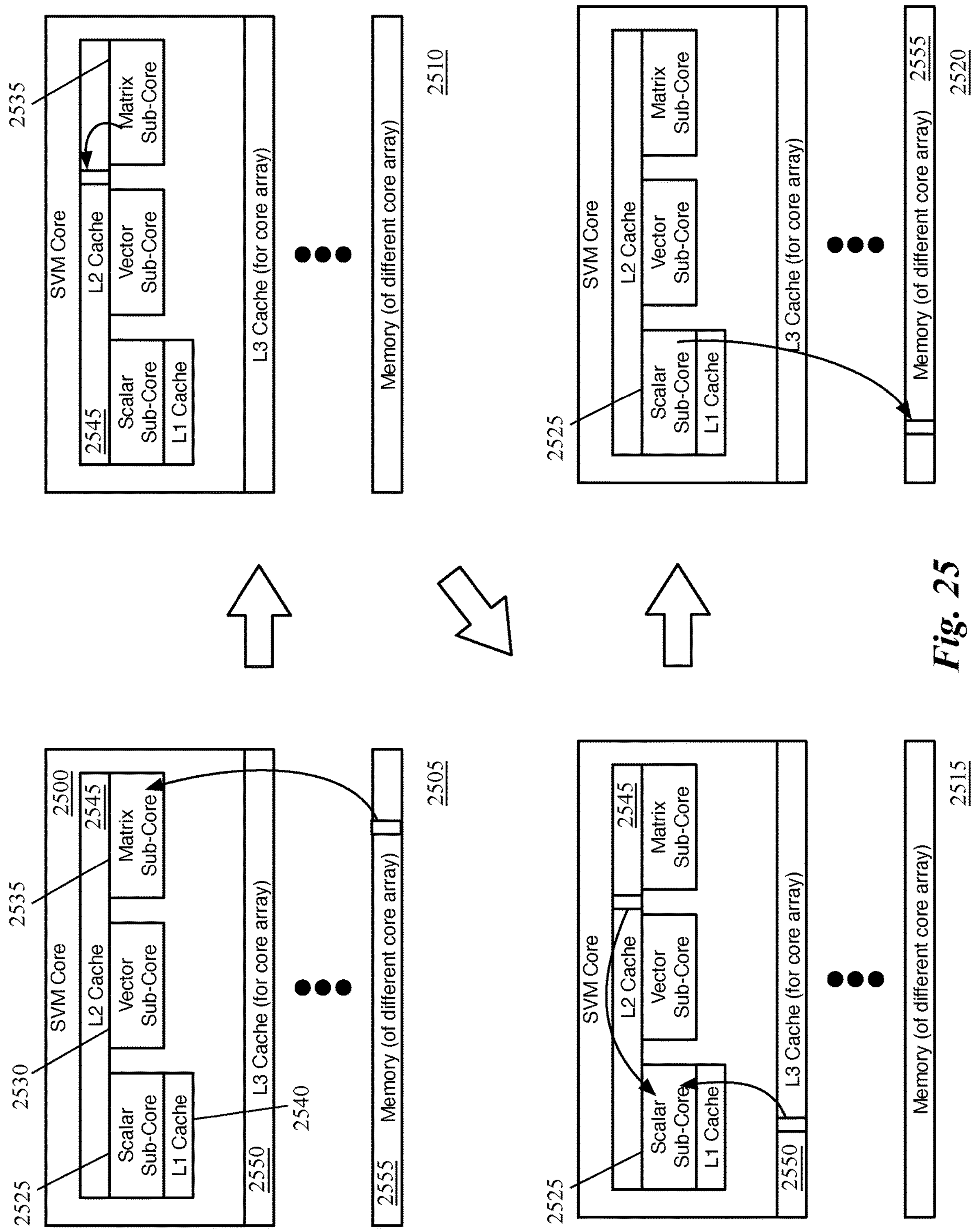
FIG. 25 conceptually illustrates the sub-cores of a single SVM core reading and writing data as these sub-cores perform operations.

FIG. 25 conceptually illustrates the sub-cores of a single SVM core 2500 (e.g., a worker core of a core array) reading and writing data as these sub-cores perform operations over four stages 2505-2520. As shown in the first stage 2505, the SVM core 2500 includes a scalar sub-core 2525, a vector sub-core 2530, and a matrix sub-core 2535. Details of the operations of these different sub-cores are described in detail above and in the above-incorporated concurrently filed U.S. patent application Ser. No. 18/916,649, entitled "Heterogeneous Cores". In some embodiments, the scalar sub-core 2525 has its own L1 cache 2540, while the three sub-cores 2525-2535 share an L2 cache 2545. In addition, the SVM core 2500 belongs to a core array and shares an L3 cache 2550 with the other cores in that core array. The figure further illustrates a memory block 2555 that is associated with another core array.

In the first stage 2505, the matrix sub-core 2535 reads data from the remote memory block 2555 in order to perform a matrix operation. This data may be, for instance, a portion of a tensor that is stored in the memory block 2555 and is used by multiple matrix sub-cores of multiple different cores (in the same core array as the core 2500 and/or in different core arrays) to perform parallel computations on the tensor. The details of how the matrix sub-core 2535 (and the other sub-cores) accesses this data (e.g., how the data is read into a streaming queue to which the matrix sub-core has access) is described in the above-incorporated concurrently filed U.S. Provisional patent application Ser. No. 18/916,649, entitled "Heterogeneous Cores".

The matrix sub-core 2535 performs its computation on this data and, in the second stage 2510, writes output data to the L2 cache 2545 shared between the three sub-cores 2525-2535. In the third stage (some number of clock cycles later) 2515, the scalar sub-core 2525 reads this data from the L2 cache 2545 as well as additional data from the L3 cache 2550 shared between the core 2500 and other cores in its core array, in order to perform another operation. The fourth stage 2520 illustrates that the scalar sub-core 2525 writes the output from this operation to the memory 2555 (e.g., so that the output can be used by another core for subsequent operations).

Figure 26:
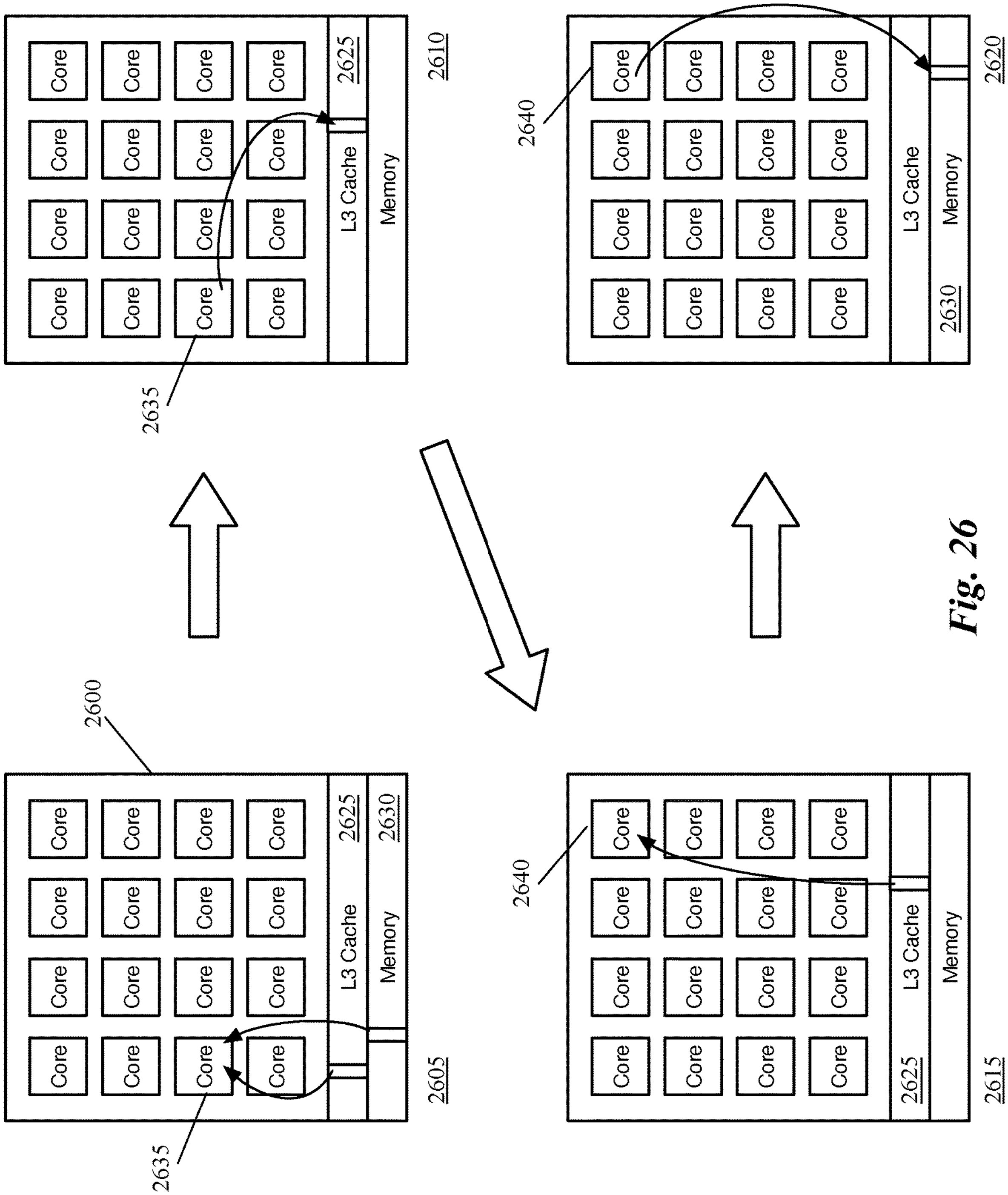
FIG. 26 conceptually illustrates the cores of a core array reading and writing data as these cores perform operations.

The global accessibility of data in the accelerator system of some embodiments also applies at the core array level. FIG. 26 conceptually illustrates the cores of a core array 2600 reading and writing data as these cores perform operations over four stages 2605-2620. As shown in the first stage 2605, the core array 2600 includes a number of worker cores (one of which may be a leader core in some cases). The worker cores of the core array 2600 share an L3 cache 2625. Furthermore, the core array accesses a memory block 2630, which may be a physically local memory block or a remote memory block.

As shown in the first stage 2605, a first core 2635 accesses data from both the L3 cache 2625 and the memory block 2630. The core 2635 may read this data for the purposes of performing an operation or set of subsequent operations (e.g., for several different commands in a command bundle assigned to the core). In addition, the two sets of data may be used by the same sub-core of the core 2635 or by different sub-cores, depending on whether the data is needed for one type of command (i.e., scalar, vector, or matrix commands) or multiple types of commands executed by multiple different sub-cores.

In the second stage 2610, the first core 2635 has completed its operations (e.g., completed the execution of a command bundle) and writes data (e.g., the output of its command bundle) to the L3 cache 2625 shared between the cores of the core array 2600. Next, at the third stage 2625, some number of cycles later, a second core 2640 accesses this data from the L3 cache 2625 in order to perform an operation (e.g., for a different command bundle belonging to a subsequent parallelized process). After performing this operation, at the fourth stage 2620, the second core 2640 writes its output to the memory block 2630 (e.g., so that the data can be used by a core of a different core array for subsequent operations).

Figure 27:
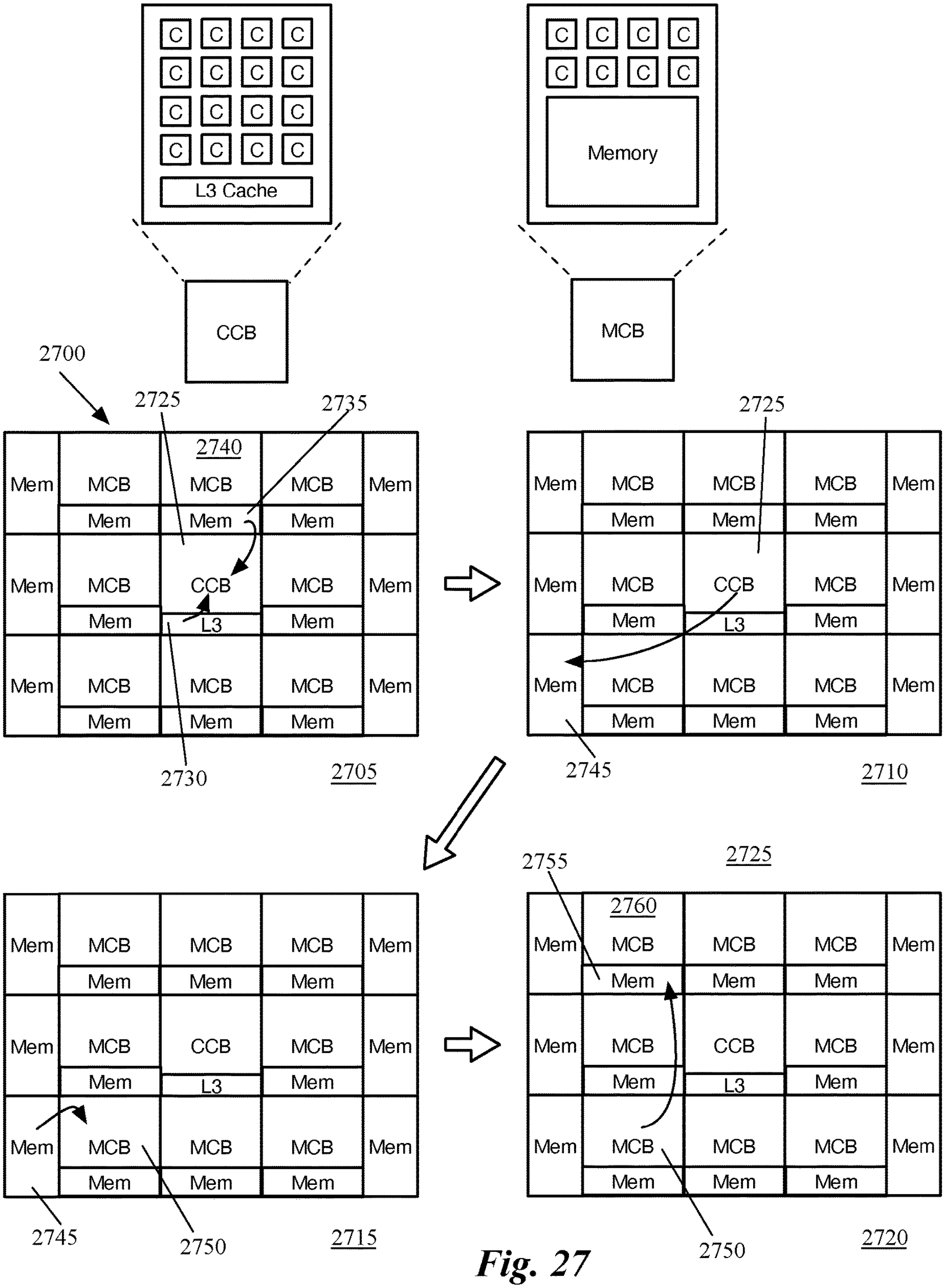
FIG. 27 conceptually illustrates compute blocks of a core arrangement reading and writing data as the cores of these compute blocks perform operations.

FIG. 27 conceptually illustrates compute blocks of a core arrangement 2700 reading and writing data as the cores of these compute blocks perform operations over four stages 2705-2720. This figure shows that the core arrangement 2700 includes two different types of compute blocks—cache compute blocks (CCBs) and memory compute blocks (MCBs). Further details of these different types of compute blocks are described in the above-incorporated concurrently filed U.S. Provisional Patent Application 18/916,649, entitled "Heterogeneous Cores", but as shown in FIG. 27 the CCBs include a greater number of individual worker cores compared to the MCBs. In addition, each CCB includes an L3 cache that is shared between the worker cores of the CCB, while each MCB includes a memory block that is local to the cores in that MCB. The core arrangement 2700, which is one of many possible core arrangements using these CCBs and MCBs, includes one CCB 2725 surrounded by eight MCBs. Furthermore, the sides of the core arrangement 2700 are bounded by additional memory blocks. Depending on the structure of the core arrangement 2700, each of these additional memory blocks may be considered physically adjacent (local) to one of the MCBs.

As shown in the first stage 2705, the CCB 2725 accesses data from both its L3 cache 2730 and the memory block 2735 of a neighboring MCB 2740. While the L3 cache 2730 is local to the CCB, the memory block 2735 is not (though accessing the memory block 2735 may be faster than the more remote additional memory blocks of the core arrangement 2700). This data may be accessed by one core of the CCB 2730 for the purposes of performing an operation or set of operations (e.g., for several different commands in a command bundle assigned to the core) or by two different cores of the CCB 2730 (e.g., for executing different command bundles assigned to those cores). In some embodiments, multiple cores of the CCB 2730 access the same data (e.g., weight data for a convolution that is sliced across multiple command bundles for parallel execution), which may be broadcast to all or a subset of the cores.

In the second stage 2710, the CCB 2730 has completed at least some of its operations (e.g., one or more of the cores of that CCB has completed the execution of its command bundle) and writes data (e.g., the output of at least one of these command bundles) to the additional memory block 2745. Next, at the third stage 2715, some number of cycles later, another MCB 2750 accesses this data from the additional memory block 2745 (i.e., the additional memory block adjacent to that MCB) in order to perform an operation (e.g., for a different command bundle belonging to a subsequent parallelized process). After performing this operation, at the fourth stage 2720, the MCB 2750 writes its output to the memory block 2755 associated with a third MCB 2760.

In some embodiments, the global shared memory is not only accessible to cores within the same core arrangement (e.g., as shown in the examples above), but may be accessed via networks between chips. To access the global shared memory, in some embodiments each core array has at least two different interfaces to the memory. First, each core array (e.g., each of the cores in the core array) has a local memory interface to its physically adjacent memory resources. Second, each core array (compute block) also has an interface to interconnect fabric in order to access global memory (e.g., memory that is physically adjacent to other compute blocks on the same chip, or compute block array, as that compute block). Third, in some embodiments, each compute block has an interface to memories of compute blocks in other chips. These chips may be part of the same node (physically proximate groupings of chips) or other physical devices (e.g., other groupings of chips, other host devices, etc.) through a network. In some embodiments, each of these three interfaces is separately accessible by a core in a compute block—that is, to access global memory in the same compute block array a core uses a different interface than for accessing local memory or for accessing global memory in other compute block arrays. In other embodiments, at least two of the interfaces are serially accessible. For instance, in some embodiments the global memory interfaces for a core are only accessible via the local memory interface. In other embodiments, the local memory interface is separate from the global memory interfaces, while the network interface to access global memory on other chips is only accessible via the global memory interface for other core arrays within the same chip.

Figure 28:
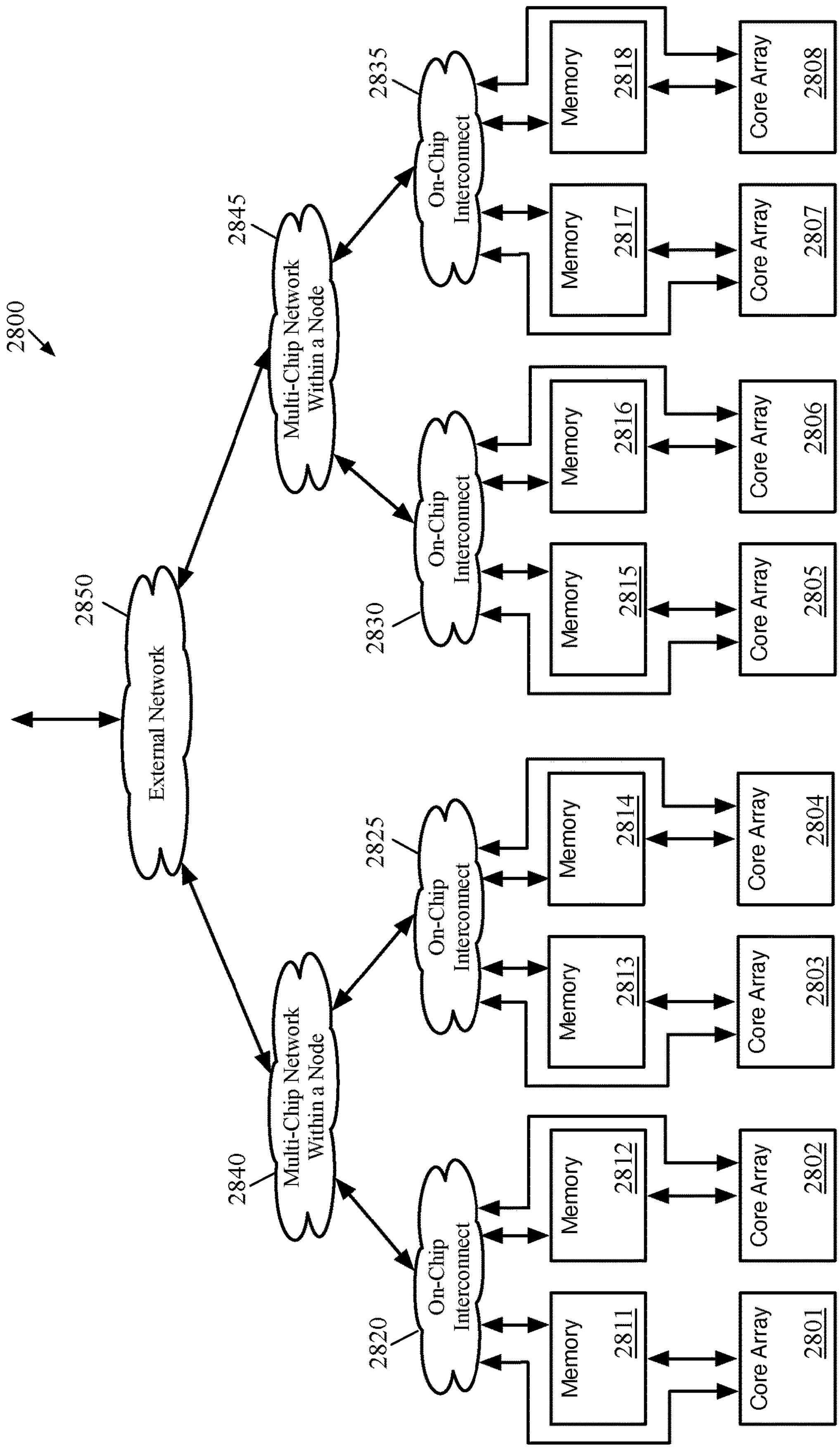
FIG. 28 conceptually illustrates a memory and memory access hierarchy of some embodiments.

FIG. 28 conceptually illustrates a memory and memory access hierarchy 2800 of some embodiments. The hierarchy 2800 includes a set of core arrays (compute blocks) 2801-2808, each of which has a corresponding local memory 2811-2818. As shown, each of the core arrays 2801-2808 has a local memory interface via which that core array accesses (e.g., read from and/or writes to) its own respective local memory 2811-2818.

In addition, each core array has a separate interface to its respective on-chip interconnect 2820-2835 (i.e., the interconnect fabric of the chip). In this example, only two core arrays are shown for each chip (compute block array), but it should be understood that compute block arrays may each include numerous core arrays in various physical different arrangements. Through these on-chip interconnects 2820-2835, each core array can access the global shared memory that is local to any of the other core arrays in its chip. For instance, the first core array 2801 may access the memory 2812 that is local to the second core array 2802 via the on-chip interconnect 2820.

Furthermore, each core array can access global memory of the core arrays in other compute block arrays within the same node, or physical grouping of compute block arrays, through a multi-chip network 2840 or 2845 within that node. In some embodiments, these multi-chip networks 2840 and 2845 are accessible via a core array's on-chip (fabric) interconnect. That is, a core array's interface to that core array's on-chip network is accessible via the interface to the on-chip interconnect. Thus, for instance, the first core array 2801 accesses the memory 2813 (local to the core array 2803) via the interface to the on-chip interconnect 2820, through which the first core array accesses the multi-chip network 2840, which in turn provides access to the on-chip interconnect 2825 to access the memory 2813.

Finally, each core array can even access global memory of core arrays in other nodes via an external network 2850. In some embodiments, the interface to the external network 2850 is the same as the interface to the multi-chip network 2840 or 2845, with the external network accessible via that multi-chip network. Thus, to access the memory 2815, the first core array 2801 uses its interface to the on-chip interconnect 2820, which in turn provides access to the interface to the multi-chip network 2840. This multi-chip network 2840 enables access to the external network 2850 via which the core array 2801 is able to access the multi-chip network 2845, the on-chip interconnect 2830 of a remote compute block array, and thus the memory resources 2815.

Figure 29:
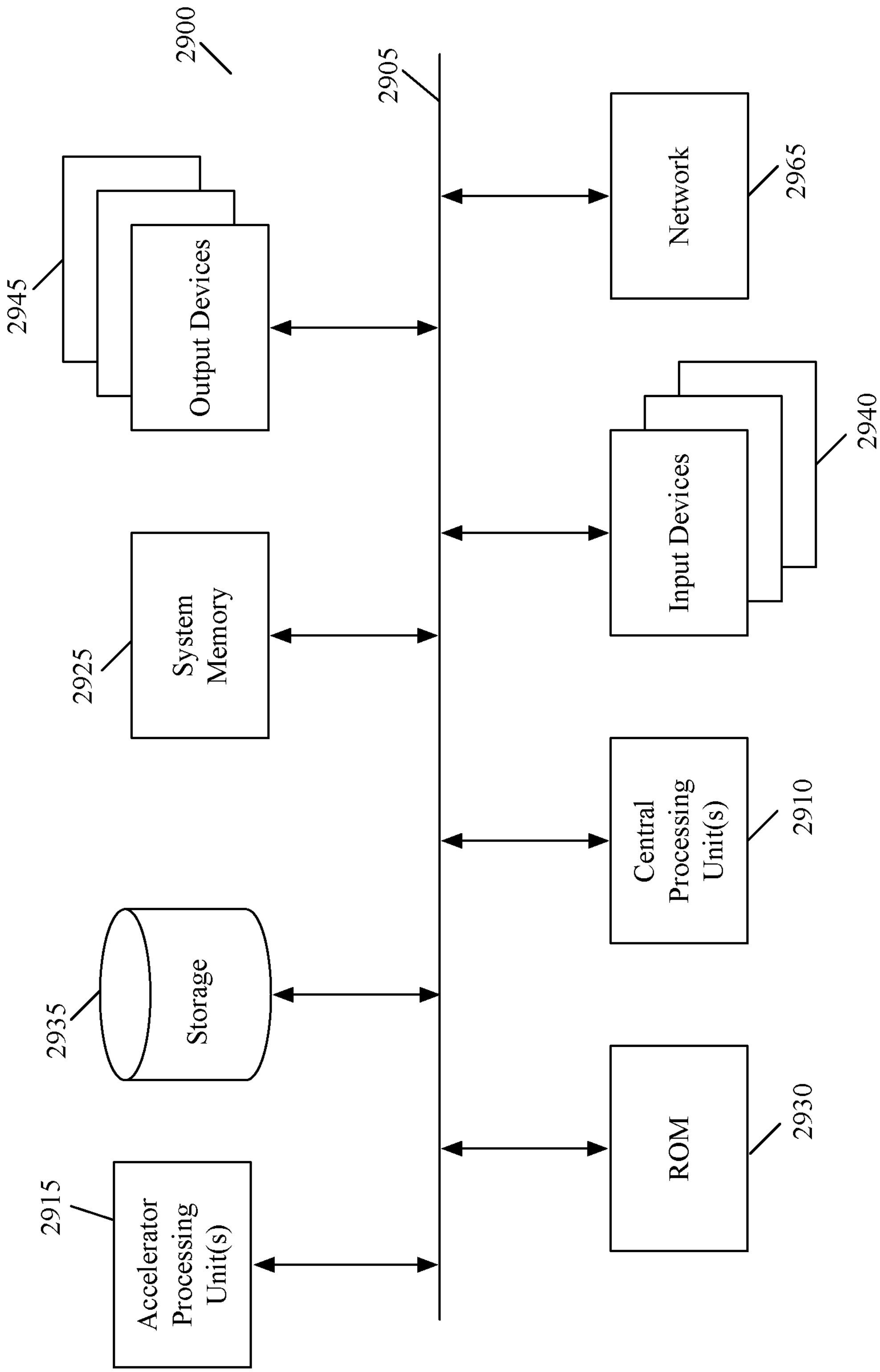
FIG. 29 conceptually illustrates a computer system within which some embodiments of the invention are implemented.

FIG. 29 conceptually illustrates a computer system 2900 within which some embodiments of the invention are implemented. The computer system 2900 can be used to implement any of the above-described computers and servers. As such, it can be used to execute any of the above described processes. This computer system includes various types of non-transitory machine readable media and interfaces for various other types of machine readable media. Computer system 2900 includes a bus 2905, central processing unit(s) 2910, accelerator processing unit(s) 2915, a system memory 2925, a read-only memory 2930, a permanent storage device 2935, input devices 2940, and output devices 2945.

The bus 2905 collectively represents all system, peripheral, and chipset buses that communicatively connect the numerous internal devices of the computer system 2900. For instance, the bus 2905 communicatively connects the central processing unit(s) 2910 with the accelerator processing unit(s) 2915, the read-only memory 2930, the system memory 2925, and the permanent storage device 2935.

From these various memory units, the central processing unit(s) 2910 retrieve instructions to execute and data to process in order to execute the processes of the invention. The processing unit(s) may be a single processor or a multi-core processor in different embodiments. The accelerator processing unit(s) 2915, in some embodiments, may include the various core arrangements described in this application, to which the central processing unit(s) 2910 may dispatch instruction sets for acceleration.

The read-only-memory (ROM) 2930 stores static data and instructions that are needed by the processing unit(s) 2910 and other modules of the computer system. The permanent storage device 2935, on the other hand, is a read-and-write memory device. This device is a non-volatile memory unit that stores instructions and data even when the computer system 2900 is off. Some embodiments of the invention use a mass-storage device (such as a magnetic or optical disk and its corresponding disk drive) as the permanent storage device 2935.

Other embodiments use a removable storage device (such as a flash drive, etc.) as the permanent storage device. Like the permanent storage device 2935, the system memory 2925 is a read-and-write memory device. However, unlike storage device 2935, the system memory is a volatile read-and-write memory, such a random access memory. The system memory stores some of the instructions and data that the processor needs at runtime. In some embodiments, the invention's processes are stored in the system memory 2925, the permanent storage device 2935, and/or the read-only memory 2930. From these various memory units, the processing unit(s) 2910 retrieve instructions to execute and data to process in order to execute the processes of some embodiments.

The bus 2905 also connects to the input and output devices 2940 and 2945. The input devices enable the user to communicate information and select commands to the computer system. The input devices 2940 include alphanumeric keyboards and pointing devices (also called "cursor control devices"). The output devices 2945 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 29, bus 2905 also couples computer system 2900 to a network 2965 through a network adapter (not shown). In this manner, the computer can be a part of a network of computers (such as a local area network ("LAN"), a wide area network ("WAN"), or an Intranet, or a network of networks, such as the Internet. Any or all components of computer system 2900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method comprising:

at a first worker processor core of a multi-core arrangement, the multi-core arrangement comprising a set of processor cores, wherein one of the processor cores other than the first worker processor core is designated as a leader processor core that executes a scheduler program for executing programs dispatched to the multi-core arrangement:

from a queue of command bundles for execution by the plurality of processor cores, retrieving a first instance of a first command bundle to execute at the first processor core, wherein (i) the leader processor core places a plurality of instances of the first command bundle in the queue, (ii) each instance of the first command bundle specifies a same first set of commands to be performed on different sets of data, and (iii) a plurality of worker processor cores of the multi-core arrangement also retrieve from the queue other instances of the first command bundle to execute;

executing a first command of the first instance of the first command bundle at the first worker processor core; and based on a second command of the first instance of the first command bundle, adding a plurality of instances of a second command bundle to the queue for execution by the plurality of worker processor cores, each instance of the second command bundle specifying a same second set of commands to be performed on different sets of data, wherein the worker processor cores that are not designated as the leader processor core (i) are capable of generating pluralities of instances of command bundles and adding the plurality of instances of command bundles to the queue for explicitly parallelizable function calls that specify a number of instances of a specific function to be called and (ii) are not capable of generating pluralities of instances of command bundles for tensor computation commands, wherein the second command is an explicitly parallelizable function call.

2. The method of claim 1, wherein a second worker processor core of the multi-core arrangement that executes a second instance of the first command bundle adds a plurality of instances of a third command bundle to the queue based on a particular command of the second instance of the first command bundle, each instance of the third command bundle specifying a same third set of commands to be performed on different sets of data.

3. The method of claim 2, wherein the second worker processor core adds the plurality of instances of the third command bundle to the queue based on a command of the third command bundle that corresponds to the second command of the first command bundle.

4. The method of claim 1, wherein retrieving the first instance of the first command bundle comprises:

receiving a notification from the leader processor core that data specifying a plurality of instances of the first command bundle have been placed in the queue by the leader processor core; and retrieving data specifying the first instance of the first command bundle.

5. The method of claim 4, wherein the queue is located in a storage shared with the set of processor cores of the multi-core arrangement.

6. The method of claim 5 further comprising retrieving data for executing the first instance of the first command bundle from the storage shared with the set of processor cores, wherein the retrieved data is used for executing the first instance of the first command bundle.

7. The method of claim 6, wherein other processor cores of the multi-core arrangement that execute respective instances of the first command bundle retrieve other data from the storage for executing the respective instances of the first command bundle.

8. The method of claim 4, wherein receiving the notification comprises receiving an assignment of the first instance of the first command bundle to the first worker processor core.

9. The method of claim 8, wherein receiving the assignment of the first instance of the first command bundle comprises receiving assignment of a group of instances of the first command bundle, said group including the first instance of the first command bundle.

10. The method of claim 8, wherein receiving the assignment of the first instance of the first command bundle comprises receiving a global identifier specifying the first instance of the first command bundle, said global identifier used to retrieve the data used for executing the first instance of the first command bundle.

11. The method of claim 10 further comprising using the global identifier to read from memory (i) a first memory state common to all of the processor cores of the plurality of worker processor cores and (ii) a second memory state specific to the first worker processor core.

12. The method of claim 11, wherein each respective worker processor core in the plurality of worker processor cores that executes a respective instance of the first command bundle reads the first memory state from memory while retrieving data for executing the instance of the particular command bundle assigned to the respective worker processor core.

13. The method of claim 1 further comprising, at the first worker processor core, after executing the first command bundle instance, notifying the leader processor core of the multi-core arrangement of the completion of the first command bundle instance.

14. The method of claim 1, wherein the first command bundle comprises a set of commands, said set of commands comprising at least one scalar command and at least one of (i) a vector command and (ii) a matrix command.

15. The method of claim 14, wherein executing the first instance of the first command bundle comprises decoding the commands of the first instance of the first command bundle at a scalar processor of the first worker processor core.

16. The method of claim 15, wherein the scalar processor executes the at least one scalar command and distributes (i) any vector instructions to a vector processor of the first worker processor core and (ii) any matrix instructions to a matrix processor of the first worker processor core.

17. The method of claim 1 further comprising, at the first worker processor core:

executing additional commands of the first instance of the first command bundle until a synchronization point for the second command is reached; and upon reaching the synchronization point, retrieving an additional command bundle instance from the queue of command bundles and executing commands of the additional command bundle instance.

18. The method of claim 17 further comprising, after receiving notification that all of the instances of the second command bundle added to the queue based on the second command have been executed, continuing to execute commands of the first instance of the first command bundle.

* * * * *